US008824779B1

(12) United States Patent
Smyth

(10) Patent No.: US 8,824,779 B1
(45) Date of Patent: Sep. 2, 2014

(54) APPARATUS AND METHOD FOR DETERMINING EYE GAZE FROM STEREO-OPTIC VIEWS

(76) Inventor: Christopher Charles Smyth, Fallston, MD (US)

( * ) Notice: Subject to any disclaimer, the term of this patent is extended or adjusted under 35 U.S.C. 154(b) by 0 days.

(21) Appl. No.: 13/572,650

(22) Filed: Aug. 11, 2012

Related U.S. Application Data

(63) Continuation-in-part of application No. 13/374,286, filed on Dec. 20, 2011, now abandoned.

(51) Int. Cl.
*G06K 9/00* (2006.01)
(52) U.S. Cl.
USPC ............ 382/154; 382/100; 382/115; 382/117
(58) Field of Classification Search
USPC ........ 382/100, 110, 115, 117, 154; 356/9, 12; 128/922
See application file for complete search history.

(56) References Cited

U.S. PATENT DOCUMENTS

| | | | | |
|---|---|---|---|---|
| 8,315,440 B2 * | 11/2012 | Cambier | | 382/117 |
| 2003/0118217 A1 * | 6/2003 | Kondo et al. | | 382/117 |
| 2010/0266165 A1 * | 10/2010 | Matey et al. | | 382/117 |

* cited by examiner

*Primary Examiner* — Ali Bayat

(57) ABSTRACT

The invention, exemplified as a single lens stereo optics design with a stepped mirror system for tracking the eye, isolates landmark features in the separate images, locates the pupil in the eye, matches landmarks to a template centered on the pupil, mathematically traces refracted rays back from the matched image points through the cornea to the inner structure, and locates these structures from the intersection of the rays for the separate stereo views. Having located in this way structures of the eye in the coordinate system of the optical unit, the invention computes the optical axes and from that the line of sight and the torsion roll in vision. Along with providing a wider field of view, this invention has an additional advantage since the stereo images tend to be offset from each other and for this reason the reconstructed pupil is more accurately aligned and centered.

20 Claims, 44 Drawing Sheets

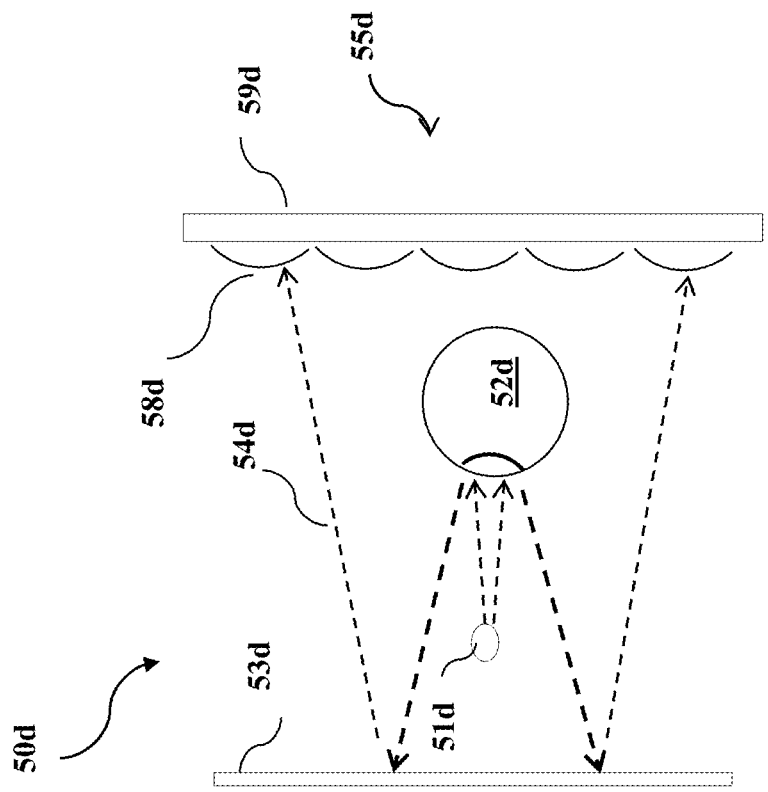
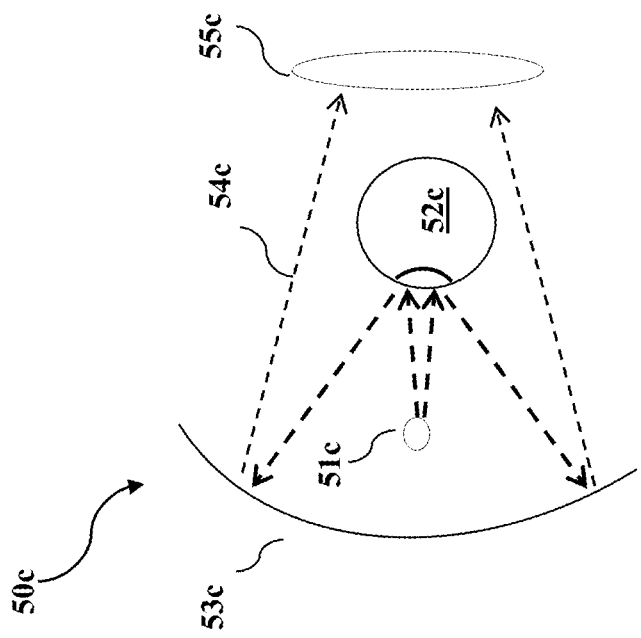
FIG. 4D
FIG. 4C

APPARATUS AND METHOD FOR DETERMINING EYE GAZE FROM STEREO-OPTIC VIEWS

CROSS-REFERENCED TO RELATED APPLICATION

This application claims priority under 35 U.S.C. 120 from U.S. patent application Ser. No. 13/374,286, filed 20 Dec. 2011, naming Christopher C. Smyth as inventor, and entitled: "Apparatus and Method for Determining Eye Gaze from Stereo-Optic Views"; this patent application is incorporated herein for all purposes.

BACKGROUND

1. Technical Field

The invention has application in the field of oculometer design. Oculometers may be used to measure the eye gaze direction, as well as the fixation duration and dual eye binocular convergence point. Such oculometers have many potential applications in the medical, scientific, engineering, manufacturing, military, and entertainment domains. Example applications include use of an oculometer as a tool for the medical diagnosis of ocular functions, as an aid to the paraplegic handicapped, for the measurement of ocular functions and workload in human factors studies, as a measure of subject training, as a tool for fatigue monitoring, as part of an electronic safety net to detect performance degradation due to pilot incapacitation in piloted and tele-operated vehicles, as a component of an electronic intelligent pilot-vehicle interface used for adaptive aiding in piloted and tele-operated vehicles, for task scan analysis including measuring situation awareness, for human operator control of machines and interaction with computer games, and for advertisement and usability analysis. Oculometers may be designed for use with head-mounted video displays such as those that have been developed for virtual reality, stereographic displays, monocular or binocular vision helmet-mounted displays, and night vision goggles. These displays are used in piloted helicopters, vehicles, and control stations for teleoperated robotics.

Oculometers may be used as an eyetracker to control computerized machines from an electronic video display by the ocular gaze point of regard and fixation duration. Examples of machine control by ocular functions are: (1) updating computer generated information displays, (2) selecting panel switches and instruments, (3) controlling the fidelity of computer generated imagery scene inserts in simulations, (4) controlling the viewing direction of remotely located cameras, (5) controlling the movement of teleoperated robotics platforms or vehicles, (6) selecting display subareas for automated scene analysis in aided target recognition, (7) designating targets from direct sight or from a sensor display, and (8) weapon system pointing.

Oculometers may have particular applications to time shared concurrent tasks where the hands are involved in a continual time critical pilotage task and the eyes may be used intermittently to control a discrete task. The use of this invention enables both tasks to share a common visual working area with overlaid visual images. In this way, task interference is reduced by dedicating eye-movements and visual attention to the same working surface. An example of such an application would be single pilot nap-of-earth low-level helicopter flight while updating onboard heads-up displays. A similar application is teleoperations of remote vehicles from video displays with camera control. Another such application is to the operation of completely enclosed armored vehicles with "transparent" or "see through" armor where the operator sees a video projection of the outside scene as recorded by externally mounted cameras and relayed to internal monitors; the operator would use the invention to control displays overlaid on the scene projection while concurrently performing the vehicle pilotage task. Similar comments apply to the piloting of "glass cockpit" designs for completely enclosed high performance aircraft.

2. Description of the Related Art

A common technology for oculometers (i.e., eye-trackers) is videooculography based upon the optical measurement of reflected light from the human eye, commonly near-infrared light for an image of the pupil. In its simplest form, an oculometer contains a single infrared light source which is directed at the eye and the reflected light is imaged onto a charge-injection (CID) or charge-coupled device (CCD) sensor array. The image of the eye is then electronically processed to determine the corneal reflection, the pupil centroid orientation, or both. These parameters are used to determine the angular location of the eye relative to the camera within a fair degree of accuracy. The technology is either head-mounted or mounted in a panel in front of the user.

Many head-mounted oculometers typically comprise a light source that illuminates the eye to be tracked, and a single light sensor that captures rays of light that are reflected from the eye. Although such oculometers provide an indication of eye position and, therefore, gaze direction, the use of a single light sensor presents various potential limitations or drawbacks. For example, a single sensor may not receive the rays reflected off of the cornea or eye interior in cases in which the user's gaze is fixed upon an object positioned at an extreme angle relative to the forward-looking direction (e.g., when the wearer is gazing laterally).

The optics for the panel mounted system are typically mounted in front of the user and directed toward his or her face. The panel mounted system is limited to low ambient light levels and objects that the user may need to work with cannot be readily placed between the face and the optics. For a single sensor system, a servomechanism is used to keep the optics aligned on the user's eye by tracking the image of the eye-orbit in the face, and the servomechanism adjustment is noticeable to users following a head movement. Excessive head movements and interference of the optical path by facial features (such as the user's nose) are not tolerated. More recent developments use multiple high definition camera systems that mounted about the workspace of the user track the face and eye with visual light as well as infrared; the eye is located from the iris or limbus image relative to the face position in the workspace. The determination is commonly made from the best camera view among multiple views.

The oculometer determines the angular location of the eye relative to the sensor array within a fair degree of accuracy. The measurement of head position and orientation for the head-mounted system allows the determination of eye position and orientation in the workspace, and therefore computation of the eye-point of regard. Similarly, determination of the range from the sensor to the eye by either say, ultrasonic or automatic image focusing, enables the computation of eye-point of regard for the panel system; a further method is image sizing of known features such as markers placed on the face or of the face itself in images with the eye orbit including such as the limbus of the eye.

The accuracy of the technology is roughly about +/− one degree in practice and is limited by the processing of the pupil image from which the image centroid and orientation are determined; these parameters are used to estimate the angular location of the eye relative to the camera. In earlier designs, the gaze direction is determined from the glint offset in the camera image alone for a single source placed to the side; the light source is directed to the side of the cornea where the shape is more cylindrical and the glint shifts with eye rotation. In some designs using near infrared, the line-of sight is measured from the offset of the pupil image centriod from the corneal surface glint for a light source collinear with the camera or that for several sources placed about the camera. Because of the nearly spherical shape of the corneal in the region about the visual axis, the glint from a light source directed to that area is fixed in position on the corneal image independent of eye rotation. The pupil image is bright for a collinear source because of the retinal reflection, but dark for a light source positioned to the side. For multiple camera systems mounted about the workspace using visible light, a common method is the offset of the limbus centroid within the eye orbit of the face. Essentially, the technology is based on the offset of a centroid for an ellipsoid in the eye-image from the location of a known feature either a glint point or the face. A more recent development is the location of eye-point of regard by triangulation of glint points in the pupil image for corneal surface reflections (i.e., glint) of light sources that are located in the workspace at known positions.

The technology is most accurate for a front camera view of the eye; however, the accuracy decreases with offset up to 45-degrees. This because much of the present technology is based on pupil (or limbus) image processing using simple perspective computations. However, a problem is the image distortion caused by corneal surface refraction. The accuracy decreases with side-view because of the non-uniform distortions in the pupil image caused by the corneal surface refraction with pupil offset. This non-linearity in distortion causes the centroid computed for the image ellipsoid to be displaced from the centroid for the true image resulting in computational error, a problem the present technology does not correct. Furthermore, the technology estimates only the principal axis of sight and does not account for the effect on sight direction of the torsional roll of the eye with accompanying vertical vergence eye movement that is induced during the tilting of the head a common occurrence during target tracking and user motion. In this application, we disclose stereo-image eye-tracker designs that incorporate novel image processing techniques particular to stereo images including that of pupil image reconstruction, that provide the advantage of tracking with increased accuracy over a wider field of view.

SUMMARY

The invention is an apparatus and method using the benefits of stereo image processing to determine a highly accurate estimate of the gaze direction from the image of the eye. In this process, the invention corrects for the non-uniform distortions in the pupil image caused by the corneal surface refraction with pupil offset that occurs with stereo images. Furthermore, the invention account for the effect on sight direction of the torsional roll that may be induced during the tilting of the head which is a common occurrence with user motion. The invention uses a hierarchical layered approach to computing gaze utilizing the full advantage of the stereo images to ensure error checks on the computational stages. By combining theses approaches, the invention may be used to supports designs of varying complexity depending upon the user's need.

To this purpose, the invention may be a dual camera system with stereo views of the eye, either direct or from a mirror system. Preferably, the invention incorporates a novel single lens stereo design which in one embodiment utilizes dual sensors configured for direct view or from mirrors. In a still different embodiment, the invention incorporates a novel single lens stereo design with an inward-bowed split mirror or perhaps a curved concave mirror system for instantaneous stereo-imaging of the eye with appropriate image processing to separate the dual images in the mirror return. In this embodiment, the concave mirror acting as a converging mirror may be curved in the lateral direction or may be a spherical section or a parabolic mirror perhaps in the form of a Toroidal reflector. In a still further embodiment, the invention incorporates a single lens stereo design with a microlens array or lenticular lens array inserted between the sensor and main lens acting as a plenoptic camera for instantaneous stereo-imaging of the eye.

In another embodiment, the invention incorporates a novel single lens stereo design with stepped mirrors for tracking the eye during which stereo images of the eye are acquired. The mirror system may be a planar parallel plate that is switched between positions about the optical axis of the device. In a further embodiment, the mirror is a segmented mirror with segment elements stepped between positions by micromechanical actuators that are synchronized with the camera action. In some embodiments the microelectro-mechanical mechanisms may be bimorph piezoelectric or piezoelastric devices. In other embodiments, the actuators may be electro-active polymer, in particular dielectric electromer. In a still further embodiment, the mirror segments may be incremented (i.e., stepped) between multiple positions about the optical axis providing multiple stereo views about a baseline, resulting in depth maps of higher accuracy with the large number of extra images captured at multiple plate poses. These depth maps may be used with motion stereo-optics for improved stereo image processing.

The invention may use an array of near-infrared light emitting diodes turned on and off in sequence as a light source illuminating the eye. The light array may be mounted on a headset that is donned by the user, or in another configuration as elements distributed throughout the viewing space separate from the user. The light source elements may be activated in opposing subsets clustered about the camera optical axis to facilitate image processing, for instance activated simultaneously in an instant in time or sequentially over a finite period of time. In cases in which sources are activated simultaneously, different colored light elements may optionally be used to illuminate the eye so that the origin of reflected light can be determined (i.e., from the light's wavelength). Such subsets may be arranged to separately illuminate the interior of the eye (isolated as a 'bright eye'), and the peripheral alone (isolated as a 'dark eye'), and combined without illumination to support cancelling background illumination.

The invention may use an electronic video display array as an accurate and rapid sequence of point light sources. The video imaging system may be active emitter (CRT, thin-film electroluminescence phosphor, plasma panel, light-emitting diodes) or passive (Liquid crystal) including active matrix. In all of these cases, the invention makes use of the initial flare of illumination common all of these sources either due to emission or crystal realignment, that occurs as each display pixel is refreshed in an orderly sequence.

The invention may use a retinal scanning display as an accurate and rapid sequence of point light sources in which the directed light of the imaging system sweeps the retina of the human eye for display effects. In this imaging system a modulated, coherent light sequentially illuminates adjacent point-wise portions of the human retina. The illumination from the retinal scanning display is brighter and more intense than that produced by the phosphorous video displays. This results in a more definite image of the pupil and an image return from the inner structures of the eye including the retina.

The sensor image acquisition and processing used by the invention may vary with the nature of the illumination. For a simple LED light array, the sensor image may be acquired by a charge-injection (CID) or charge-coupled device (CCD) sensor, and the image of the eye electronically processed to determine pertinent eye image features which in one embodiment may be the apparent pupil centroid and orientation, pertinent internal eye structure features, and the corneal light-source reflection glint-points. The sensor array may be mounted on a headset that is donned by the user, or in another configuration distributed within the viewing space separate from the user.

For use of the electronic video display for illuminating the eye, the image processing may use a simple array of phototransistor light sensors and amplifiers directed toward the cornea of the eye. The invention may use this opto-transistor array with a comparator array and an encoder and latch clocked by the raster-scan pulses of the display driver, to construct a pairing table of sequential source corneal reflections to sensor activations over the display field refresh cycle for an accurate model of the cornea to be maintained in the sensor spatial coordinates.

For the retinal scanning display, the invention may use an active-pixel image sensor array on a complementary, metal-oxide semiconductor (CMOS) substrate with integrated circuits in a parallel point array architecture. The design is readily manufactured as a very-large scale integrated (VLSI) circuit array chip made from CMOS field-effect-transistors (FET). The large scale of the design provides a resolution that is fine enough for accurate mapping of the cornea, and an image of the eye suitable for image processing. Furthermore, the CMOS VLSI array can perform at megahertz rates due to the circuit architecture. This is necessary for processing images at the raster-scan illumination rates of the retinal scanning display.

The invention may employ a unique CMOS design to rapidly process the image acquired in the CCD array or RAM cache, at each display field refresh pulse. The image processor is embodied as a stack of very-large-scale-integrated (VLSI) circuit arrays, which controlled by a central processing unit (CPU) is operated en masse along matched array elements. The stack design supports the application of advanced image processing techniques to isolate and enhance portions of the image, and to abstract the image coordinates of key features. These may include the location and principal axes of the apparent pupil centroid, and the image coordinates of the sphincteral pattern of the iris. In addition, the image coordinates of key features of the inner structure of the human eye may be computed such as the cluster points of the retinal capillary network following isolation from the retinal return. The determination of these features provides the basis for a real-time three dimensional modeling of the human eye at the display field refresh rate.

The invention computes the gaze direction in a sequence of steps that making use of the full image features in a hierarchical layered approach, establishes bounds of increasingly more accurate approximations. In the first step, the gaze direction is approximated by triangulation of the distribution of glint points about the image apparent pupil centroid; the accuracy of this approach decreases with viewing offset from the sensor optical axis because of cornea induced distortions in the image. In a further step, the gaze direction is approximated by the image apparent pupil centroid and ellipsoidal axes, with the centroid locating the gaze origin and the ratios of the axes giving the direction; again, the accuracy of this approach decreases with viewing offset from the sensor optical axis.

Finally, in the most accurate step, the principal and orthogonal optical axes of the eye are computed from the spatial locations of the internal structure for stereo mapped features such as the pupil centroid, iris cusps, and the retinal capillary network junction points; the visual axes are computed from such to determine the line of sight, by using a model of the eye based on pupil image reconstruction. Each step provides a check on the next for any case of incorrectly mapped features thereby precluding erroneous gaze predictions.

The invention uses a unique method for pupil image reconstruction to provide a more exact method of locating the pupil and consequently, the optical axis of the eye independent of view. In one embodiment of this process, isolated perimeter points of the pupil image are mathematically traced back through the corneal surface to the pupil plane within the eye, where the traced points must form a circle on the plane by the nature of the iris within the eye. With this restriction, the pupil center and plane normal are determined, thereby locating the optical axis of the eye and consequently the visual line of sight. The cornea is located in the sensor space from the glint points given the locations of the glint sources relative to that of the sensor system. This technique has an advantage with stereo imaging since the stereo images tend to be offset from each other about the line of sight and for this reason the reconstructed pupil plane is more readily aligned and centered, resulting in a more accurate solution.

The invention uses a unique method for locating the internal structure of the eye by mapping the image features for the various images to a common template centered on the pupil where the template in one embodiment may be established in calibration. The image features may be fitted to the template by a best-fit feature vector process with a parameter set for the features that contains the reference frame locations and the feature category. Following parameterization of the corneal surface, the invention in one embodiment computes the three dimensional spatial locations of the matched template features from the stereo images of the eye, by ray tracing back to the inner feature from the location of the apparent feature on the corneal surface using the laws of material refraction; in one embodiment the locations are referenced to the light source array and sensor geometry coordinate system. The manner in which the inner features are located from the back traced refractive ray follows a control strategy based on the success of matching the template across stereo images. The location is computed for stereo non-conjugate features from the intersection point of the back traced ray with a representative feature sphere, a mathematical construct that in one embodiment is derived in an initial calibration process. For stereo conjugate features, the location is derived from the intersection point of stereo matched rays; the computation is used to refine the representative feature sphere. The invention employs a realistic model of the eye, derived from physiologic optics, to accurately determine the optical axes and the corresponding visual line of sight. The computations needed for this derivation follow from the processing of the multiple sequences of specular reflections from the cornea of the illuminating light sources and the associated diffused reflections from the internal structures of the eye.

Of course the invention may be incorporated in various designs. A basic design would be to estimate sight direction from the pupil image offsets. If the design supports matching glint points in the images to the light sources, then the sight may be estimated by glint triangulation. The light sources would be mounted in known locations relation to the sensors, for example, the sources and cameras may be mounted in fixed locations in the workspace separate from the user, or the sources and cameras may be head-mounted on the user, as several possible combinations. Furthermore, a design modeling the corneal from, say, the glint distribution matched to the sources, allows the estimations to be corrected for the effects of corneal refraction on pupil image offset. However, failing modeling of the user, the design may use a standard corneal model to correct for refraction. Furthermore, estimates from triangulation may be corrected. If stereo images are collected, then the design may match isolated features to an eye template centered on the pupil. If ray tracing is used to locate the matched template features, then the design may locate stereo conjugate features by the intersection of back traced rays, and locate non-conjugate features by the intersection of the corresponding back traced ray with the feature spheres; if not, stereo matched features may be located by stereo reconstruction from images reconstructed using offset corrections. The optical and sight directions may then be computed from the template feature locations. While the methods of image pupil offset alone or in conjunction with glint triangulation provide an estimation of the principal optical axis, the template matching method is needed to fully specify the optical axes and therefore the torsional roll of the eye about the principal axis as well as the eye rotations of that axis. Use of stereo images with the methods of image pupil offset alone or glint triangulation enables estimation by weighted averaging of the results for the different images, while use of stereo images with the template matching method enables the refinement of three-dimensional modeling either through stereo reconstruction or ray-tracing. When used with the template matching method, the separate image results for the image pupil offset and glint triangulation methods may be used as bounds on the calculations of the template matching method.

The invention is easily extended to the simultaneous tracking of both eyes allowing the measurement of the optical convergence point in the three dimensional workspace either real or virtual. For this reason, the invention has applications in the field of medicine diagnostics of neurological disorders by ocular functions such as the evaluation by eye movements of the severity of head trauma, and for this purpose may be part of desk mounted fixture or an addition to a computer screen used in diagnostics. The invention has applications to gaze-contingency displays operated by ocular gaze point of regard and fixation duration, such as used for control of computerized machinery from video displays. Here, the invention determines the ocular fixation dwell time; this parameter may be used to pre-select a display icon element. These advantages make the invention particularly attractive for measuring ocular functions with virtual image display overlays such as on helmet mounted displays or night vision goggles. Further, the invention may be incorporated into panel mounted displays and head-free sensor arrays for similar purposes. Continuing, the invention may be incorporated into hand-held electronic devices such as cellular phones and data pads among others to track the user's interest in device video display icons; a device mounted accelerometer may be used to locate the face and consequently the eye orbit in the camera view during hand movements. Scene processing software may be used to determine the user's interest in the tracked icons from facial expressions deduced from automated analysis of isolated facial features.

BRIEF DESCRIPTION OF THE DRAWINGS

The disclosed systems and methods can be better understood with reference to the following drawings. The components in the drawings are not necessarily to scale.

FIG. 4C is a schematic of an optical device incorporating a light source array with a single lens stereo camera utilizing a converging concave mirror as a component of the invention.

FIG. 4D is a schematic of an optical device incorporating a light source array with a single lens stereo camera utilizing a microlens array or lenticular lens array inserted between the sensor and main lens acting as a plenoptic camera as a component of the invention.

DETAILED DESCRIPTION

Disclosed herein are systems and methods for tracking an eye. More particularly, disclosed are an eye-tracking system and method that employ multiple views of the eye that provide image data that is processed to determine at least a gaze direction of an eye.

Figure 1:
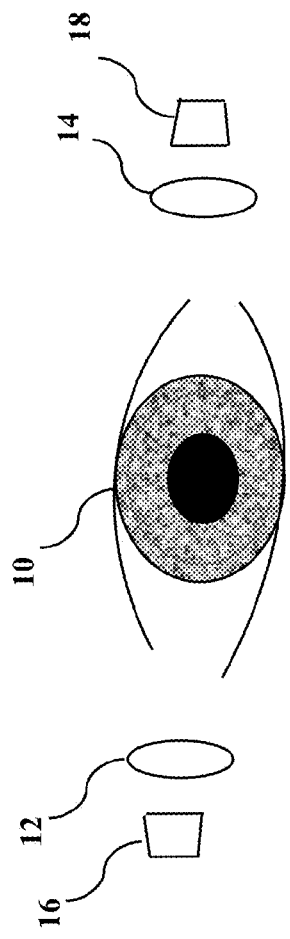
FIG. 1 is a schematic diagram of an eye being tracked by components of a stereo-view eye-tracking system.

Referring now to the drawings, in which like numerals indicate corresponding parts throughout the several views, FIG. 1 illustrates an eye 10 of a user (e.g., a wearer of an eye-tracking mechanism) illuminated by a light source 11. Positioned on opposite sides (e.g., opposed lateral sides) of the eye 10 are optical systems 12, 14 and light sensors 16, 18. The optical systems 12, 14 each comprise one or more lenses and/or mirrors that are used to direct and focus light that reflects off of the eye 10 on their associated light sensors 16, 18. The light sensors 16, 18 receive the reflected light (i.e., light rays), which is used to determine the gaze direction of the eye. More particularly, the light sensors 16, 18 generate multiple images including two-dimensional "stereo" images of the eye 10 that can be used to calculate the optical axis and visual axis of the eye. Although the optical systems 12, 14 and the light sensors 16, 18 are shown and have been described as being positioned on opposite sides of the eye 10, other configurations are possible. One such configuration preferred for use with this invention, consists of sensors with light collecting optics that are positioned on opposite sides of the central axis of sight for the eye. As shall be elaborated, the optical device consists of a light source, optical systems to collect the light reflected from the eye, and sensors matched to the optical systems to convert the light images to electrical outputs. In the preferred embodiment, the light collecting optics for the sensors are positioned so as to collect stereo images (i.e., slightly displaced two-dimensional images) of the eye as much as possible. Moreover, although two light sensors 16, 18 are shown and have been described, a greater number of light sensors could be used, if desired, for example sensors with optics positioned about the sides of the eye to cover the full range of viewing directions.

Figure 2:
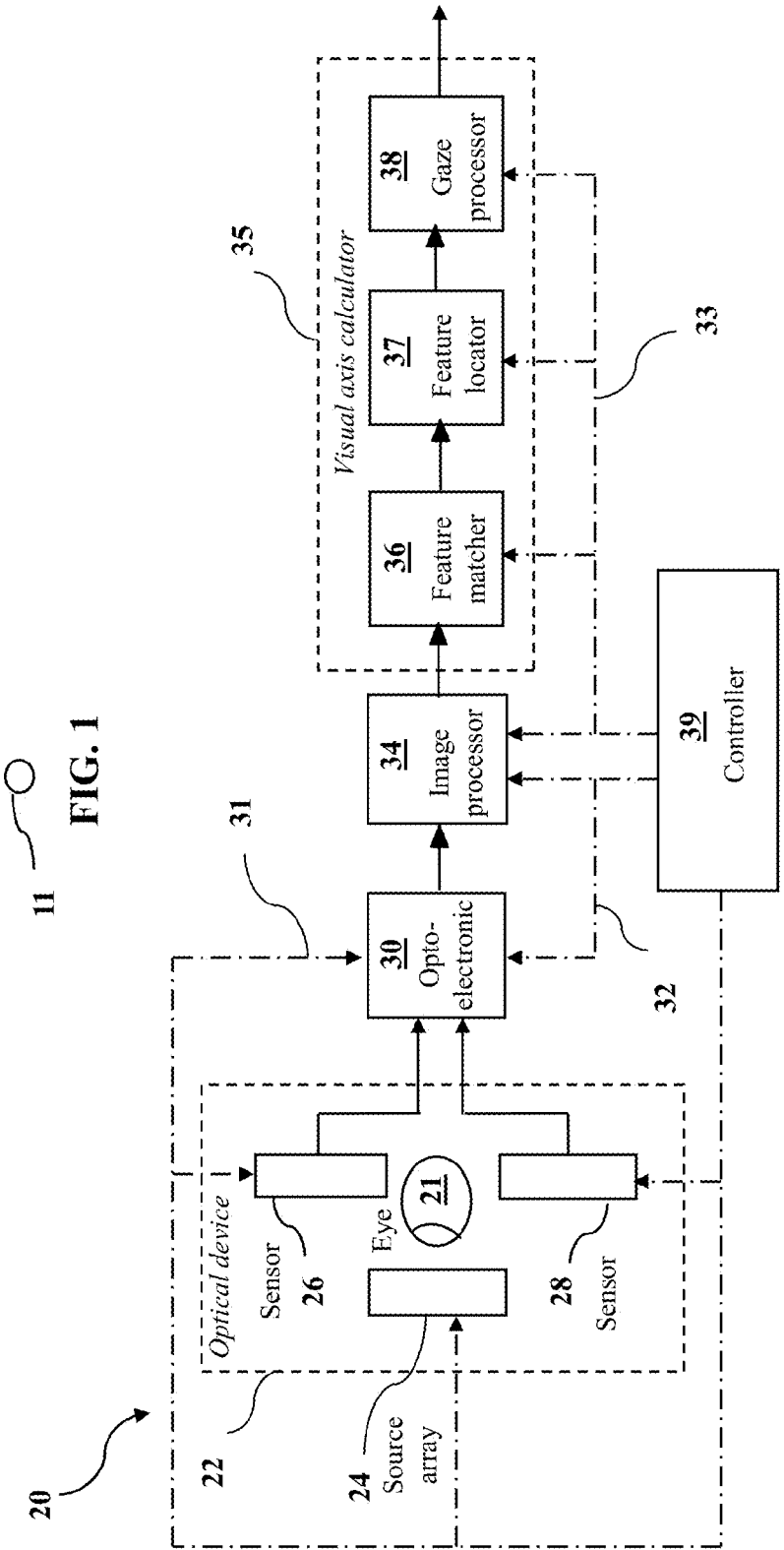
FIG. 2 is a block diagram of an embodiment of the invention as an eye-tracking system.

Referring to FIG. 2, illustrated is an embodiment of the invention as an eye-tracking system 20 that can be used to determine the gaze direction of an eye 21 of a user. The tracking system 20 comprises several components that are similar in configuration and/or function to components disclosed in U.S. Pat. No. 7,747,068 issued 29 Jun. 2010 to Smyth et al., which is hereby incorporated by reference in its entirety into the present disclosure.

As is shown in FIG. 2, the tracking system 20 includes an optical device 22 that may be mounted on a headset that is donned by the user or in the viewing space separate from the user. In addition, the tracking system 20 includes an opto-electronic device 30, an image processor 34, and a visual axis calculation system 35 comprising a feature matcher 36, a feature locator 37, and a gaze-processor 38, all controlled by a controller 39. The optical device 22 (in the manner of FIG. 1), comprises a light source 24 and light sensors 26 and 28, with associated optical systems and opposed light collecting optics. The light source 24 is configured to, under the control of the controller 39, shine light on an eye 21 of the user. By way of example, the light source 24 comprises a display or one or more light-emitting diodes (LEDs). In cases in which the light source 24 comprises multiple light elements (e.g., pixels of a display or individual LEDs in an LED array), the elements of the light source can be sequentially illuminated by a control signal generated by the controller 39 and delivered to the light source via control line 31. The light sensors 26, 27 detect the light reflected from the user's eye via the optical systems from the corresponding light collecting optics, and output analog image signals to the opto-electronic device 30, under control of the controller via control line 31; in turn, the opto-electronic device 30 processes the image signals with digital output to the image processor 34 under control via control line 32. The image processor has digital output to the calculation system 35. The image processor is under control via the control line 33 as are the components of the calculation system 35. Of course other control configurations are possible. Further, the components of the visual axis calculation system may consist of digital processors in the form of computer routines with operating systems comprising dedicated digital computer programs.

Figure 3:
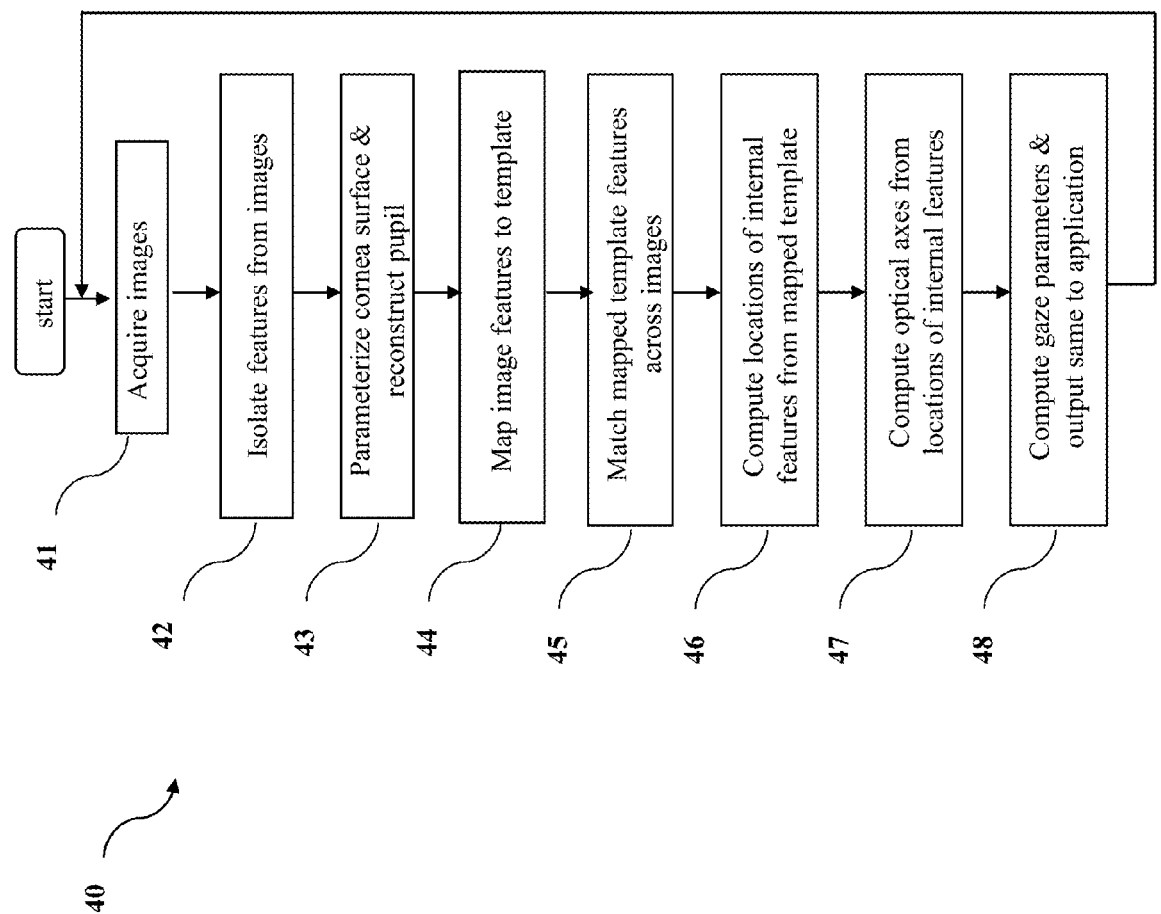
FIG. 3 is a flow chart of functions performed by the components of the invention as embodied in the above figure.

Considering the component functions 40 as listed in the flowchart of FIG. 3, the opto-electronic device 30 acquires the image signals 41 generated by the sensors 26, and in one embodiment isolates specular reflections (i.e., glints) from the cornea anterior surface created by the light elements of the source 24, determines image coordinates of the reflection points on the corneal surface for the light sources, accumulates the image for a stereo view, and outputs signals to the image processor 34. In turn, pertinent image features are isolated 42 by the image processor 34, that correspond to internal features of the eye's anatomy in the stereo images as captured by the sensors 26, 27 and accumulated in the opto-electronic device 30. Next, the feature matcher 36 parameterizes the cornea surface and reconstructing a model of the pupil 43, maps the image features to a template of the eye 44 centered on the pupil, and matches the mapped template features across the images 45. Continuing, the feature locator 37 computes the three dimensional spatial locations of the inner features of the eye from the stereo images 46. Finally, the gaze-processor 38 computes the gaze parameters 47 from the optical axes, which are then the output 48 from the visual axis calculation system 35.

In a preferred embodiment the light source elements are activated in opposing subsets clustered about the optical axis of the source to facilitate image processing, for instance activated simultaneously in an instant in time or sequentially over a finite period of time. In cases in which sources are activated simultaneously, different colored light elements may optionally be used to illuminate the eye so that the origin of reflected light can be determined (i.e., from the light's wavelength). Such subsets may be arranged to separately illuminate the interior of the eye (isolated as a 'bright eye'), and the peripheral alone (isolated as a 'dark eye'), for contrast to emphasize eye features. In those cases in which the sources are activated sequentially say in clusters, the opto-electronic device 30 reads the sensor image as a frame for the source subset, isolates the corresponding glints in the frame, then resetting the frame for the sensor reading after accumulating the frame image for a view image. In one such embodiment, an additional null source frame may be collected without light to collect the image for background illumination; subtracting the null frame image from the accumulated view image for the activated sources allow a correction for background visual noise. Similarly, the sensors may be sampled simultaneously in an instant in time or sequentially over a finite period of time.

The image processor 34 isolates pertinent image features 42 corresponding to internal features of the eye's anatomy in the stereo image captured by the sensors 26, 27 and accumulated by the opto-electronic device 30. By way of example, features of the eye that are isolated by the image processor 32 include the apparent pupil and those of inner structures of the eye including the cusp points of the sphincteral pattern of the iris as defined by the crypts, furrows, ridges, striations, ligaments, and collarette in the image, and including the junctions of the retinal capillary network seen in the ocular fundus area image. The fundus area is the interior surface of the eye, opposite the lens, and includes the retina, optic disc, macula and fovea, and posterior pole, with the microcirculation of the retinal capillary network visible. Light entering the eye passes through the cornea, aqueous humor, lens, and vitreous humor; the transmittance of these structures remains fairly constant over 80% from 500 nm to 1300 nm, well into the near-infrared. Below 500 nm, however, this is not the case. Through the visible range below 500 nm the transmittance quickly drops off since the ocular media acts as a filter, limiting what light reaches the retina. Infrared reflection is stronger from the highly melanin-pigmented brown colored iris than the lighter pigmented blue colored iris. Once the eye features are identified, their locations (i.e., coordinates) within the two-dimensional image are determined by the image processor 34 and those locations and classification (as cusp or retinal) are output as digital signals to the visual axis calculation system 35, along with the image coordinates of the light source glint reflection points.

Generally speaking, the visual axis calculation system 35 receives the data output by the image processor 34 for all views and uses that data to calculate the principal and orthogonal optical axes of the eye, from which the visual axis and the gaze direction may be determined. More particularly, the visual axis calculation system 34 runs several processes or routines that compute the visual line of sight from the principal optical axis and the torsion about that axis. As described in the following, the visual axis calculation system 35 may comprise one or more of a feature matcher 36, feature locator 37, and gaze-processor 38 that are used to determine the visual axis and gaze direction.

Referring to FIG. 3, the feature matcher 36 parameterizes the cornea surface and reconstructs a model of the pupil 43, maps the image features to a template of the eye 44 centered on the pupil, and matches the mapped template features across the images 45. The corneal surface glints are used to construct a parameter model of the corneal surface from the locations of the glint points on the image of the corneal surface from the light source to sensor geometry. The eye image is rotated from that for the sensor offset from the pupil to that for a frontal view of the eye and the isolated features in the image are mapped to a feature template for the frontal view, along with adjustment to the pupil image centroid. This follows locating the apparent image features in a reference frame common to stereo views as defined by the centroid and ellipsoidal axes of the pupil images. In this process, the iris cusp points map directly to the pupil axes since they are in the plane of the pupil; however, the ocular fundus area lies well behind the pupil and the image points are rotated back to alignment with the pupil before mapping. In one embodiment, this mapping is performed by best-fit feature vector process with a parameter set for the features containing the reference frame locations and the feature category, that is, iris cusp or retinal capillary junction point; the process gives the probability of a feature mapping to the template features. In a further embodiment, the apparent image features of the eye: pupil image and those of inner structures of the eye including the sphincteral pattern of the iris and the retinal capillary network in the image are matched across views using the template mapping.

The routine 43 may use a unique method for pupil image reconstruction to provide a more exact method of locating the pupil and consequently, for centering internal features. In this process, isolated perimeter points of the pupil image are mathematically traced back through the corneal surface to the pupil plane within the eye, where the traced points must form a circle on the plane by the nature of the iris within the eye. With this restriction, the pupil center and plane normal are determined, thereby locating the optical axis of the eye. The cornea is located in the camera space from the glint points in the scene given the locations of the glint sources relative to the camera. This technique has an advantage with stereo imaging since the stereo images tend to be offset from each other about the optical axis and for this reason the reconstructed pupil plane is more readily aligned and centered, resulting in a more exact solution.

The feature locator 37 reconstructs the physical locations in the optical device coordinate system of the internal structures of the eye from the template features for the corresponding image features. In one embodiment, the internal features are located by mathematically ray tracing the optically refracted rays from the image locations back through the corneal surface to the internal structure. In this embodiment, the feature locator following parameterization of the corneal surface, computes the three dimensional spatial locations from the stereo images of the inner features within the eye 46, by ray tracing back to the inner feature from the location of the apparent feature on the corneal surface using the laws of material refraction; in one embodiment the locations are referenced to the light source array and sensor geometry coordinate system. The manner in which the inner features are located from the back traced refractive ray follows a control strategy based on the success of matching across stereo images. For non-conjugate (i.e., unmatched) features, the location is computed by the intersection point of the back traced ray with a representative feature sphere, a mathematical construct derived in an initial calibration process. For conjugate (i.e., matched) features, the location is derived from the intersection point of stereo matched rays; the computation is used to refine the representative feature sphere.

The gaze-processor 38 computes the eye gaze parameters 47 which in one embodiment may consist of the instantaneous gaze direction and status: fixation, saccade, pursuit or blink, by first computing the principal and orthogonal optical axes of the eye from the locations of the internal eye features and then the visual axes from such to determine the line of sight, by using a model of the eye which in one embodiment is derived in an initial calibration process. In a further embodiment, the determination is made in a hierarchical layered approach by establishing bounds from a sequence of increasingly more accurate approximations to the gaze direction. In one such embodiment, the gaze direction is approximated by triangulation of the distribution of glint points about the image apparent pupil centroid; the accuracy of this approach decreases with viewing offset from the sensor optical axis. In a further embodiment, the gaze direction is approximated by the image apparent pupil centroid and ellipsoidal axes, with the centroid locating the gaze origin and the ratios of the axes giving the direction. In a still further embodiment, the most accurate, the principal and orthogonal optical axes are computed from the physical locations of the internal structure for the mapped template features for such as the pupil centroid, iris cusps, and the retinal capillary network junction points. Each layer provides a check on the next layer for any case of incorrectly mapped features thereby precluding erroneous gaze predictions.

This information may then be output 48 from the visual axis calculation system 35 and used, for example by an applications digital computer, to determine information as applicable to say, workplace performance status, such as: the workspace line of sight, eye fixation status, gaze points, and the binocular convergence point for a dual-eye system. While this description outlines embodiments of the process for the invention, the apparatus and methods shall be made apparent in the specifications that follow.

Considering the optical device 22 of FIG. 2, the invention uses the light source 24 to illuminate the eye 21 in a controlled manner. By way of example, the light source 24 may comprises an array of one or more light-emitting diodes (LEDs). In a similar manner, the invention may use an array of near-infrared light emitting diodes turned on and off in sequence as an illuminating source 24.

In another embodiment, the invention may use an electronic video display array as an accurate and rapid sequence of point light sources 24. This reduces the components needed for eye-tracking since the light imaging system is used to illuminate the eye in a controlled manner. The video imaging system may be active emitter (CRT, thin-film electroluminescence phosphor, plasma panel) or passive (Liquid crystal) including active matrix. In all of these cases, the invention makes use of the initial flare of illumination common all of these sources either due to emission or crystal realignment, that occurs as each display pixel is refreshed in an orderly sequence. In this embodiment, the invention uses the electronic video display to illuminate the eye in a controlled manner. The sequence of momentary flares in display pixel brightness, generated during the electronic refresh sweep of the display, provides an accurate and rapid sequence of point light sources.

The video imaging system may be active emitter (Cathode ray tube, solid phosphor thin-film electroluminescence, gas discharge plasma panel) or passive (liquid crystal display) including active matrix. Furthermore, the invention may be extended to light emitting diode displays where the display elements are re-drawn sequentially at a video rate. The only requirement is that a momentary increase in brightness occur during electronic refresh of the display pixel element. The momentary flare in brightness is detected by electronic sensors; however, it is not noticed by the human eye which averages out transients in brightness less than 0.10 seconds.

The display refresh luminance conditions depend upon the display medium. The CRT display phosphors generally have an electron beam refresh excitation rise time on the order of several hundred nanoseconds, a fall time on the order of several microseconds, and a decay time on the order of a millisecond. However, more than 90 percent of the luminance energy is emitted within the first few microseconds and each pixel is dark most of the time. The CRT display is point addressable to maintain pixel spatial compactness. Similar comments apply to thin-film electroluminescence phosphor displays. In contrast, the rise and fall times of liquid crystal displays to electrostatic refresh is on the order of several milliseconds. LCDs are generally interspaced matrix line addressable in which all display elements in a row are refreshed as the column lines are set at the appropriate voltages. Whereas most display designs set the column lines on the same refresh clock pulse, they with little difficulty could be set sequentially at a video sweep rate with no display degradation. Finally, light emitting diodes used in display matrixes have an on-rise time and off-fall time on the order of several hundred nanoseconds. Again LED displays could be refreshed on and off in a vertical and horizontal synchronized manner.

In another embodiment, the light source 24 for the invention may be a retinal scanning display used as an imaging system in which the directed light sweeps the retina of the human eye for display effects. In this imaging system a modulated, coherent light sequentially illuminates adjacent point-wise portions of the human retina. In this embodiment, the invention makes use of the shift in illumination of the human eye that occurs as the directed light scans in an orderly sequence. The advantage of the retinal scanning display is that the eye is illuminated in exact, discrete steps. This generates a succession of precise reflection points from the cornea of the eye for processing by the sensor array of the invention. This is in comparison to the phosphorous video displays where successive elements of the display remain illuminated for a short time following activation resulting in relatively blurred reflection points. Furthermore, the illumination from the retinal scanning display is brighter and more intense than that produced by the phosphorous video displays. This results in a more definite image of the pupil and an image return from the inner structures of the eye including the retina.

Figure 4B:
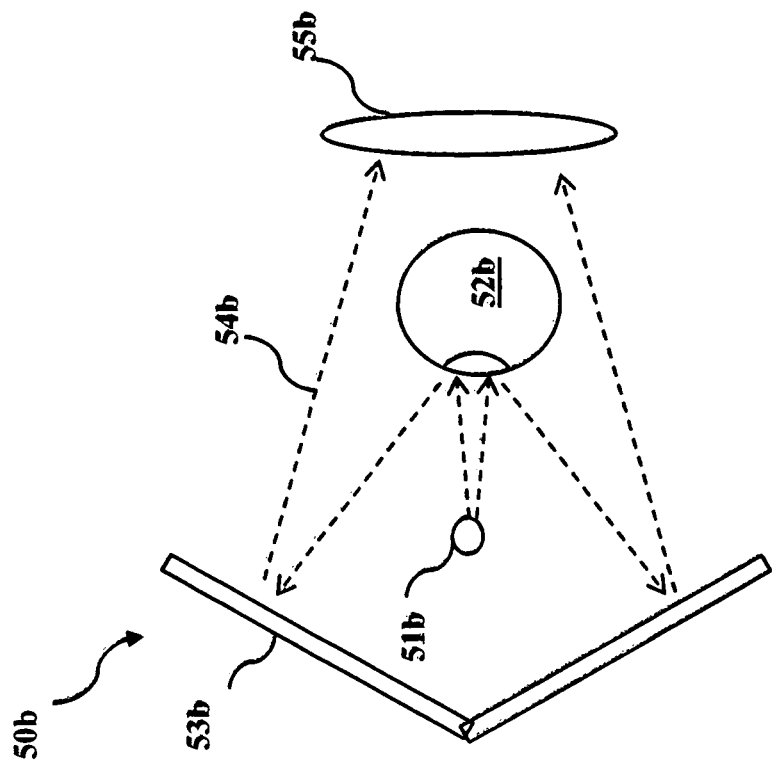
FIG. 4B is a schematic of an optical device incorporating a light source array with a single lens stereo camera utilizing an inward-bowed split mirror as a component of the invention.
Figure 4A:
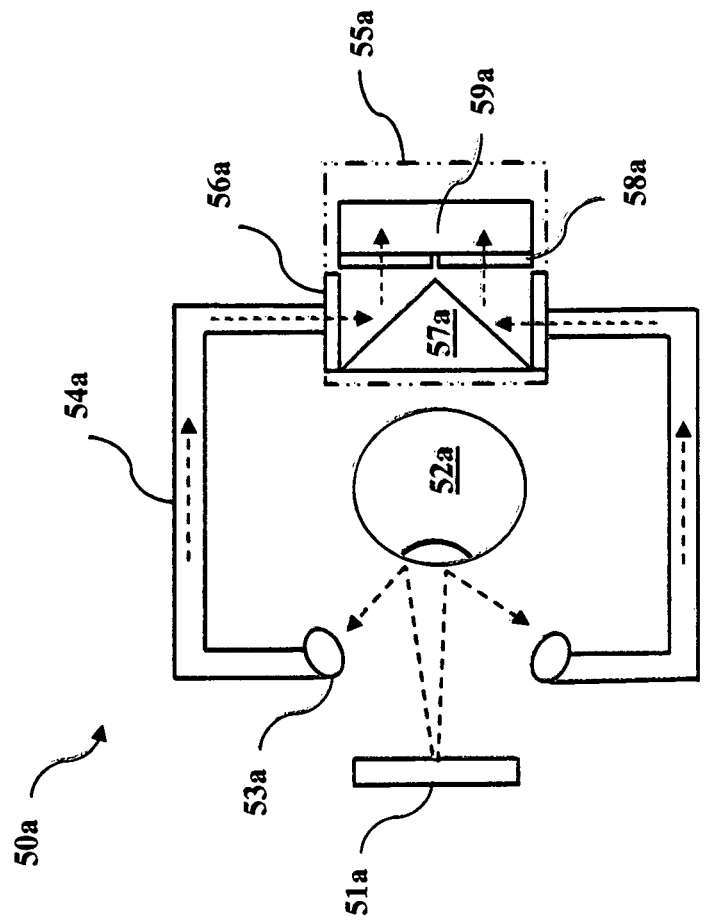
FIG. 4A is a schematic of an optical device incorporating a light source array with a single lens stereo camera utilizing a light-steering mirror system as a component of the invention.

Considering again the optical device 22 of FIG. 2, various configurations are possible depending upon the nature of the light source 24 and the light sensor 26. To this purpose, the invention may be a dual camera system with stereo views of the eye, either direct or from a mirror system. Preferably, the invention incorporates a novel single lens stereo design which in one embodiment utilizes dual sensors configured for direct view or from mirrors. By way of example, FIG. 4A is a schematic of an optical device for a light source array with a single lens stereo camera incorporating a light-steering mirror system that forms the stereo pair on the left and right halves of a single, say, charge-coupled device (CCD) sensor. The invention incorporates the advantage of a two-camera system while having identical intensity response of the stereo pair captured with the same camera to improve the accuracy of the corresponding matching. Here, the optical device is shown as 50*a*, with light source 51*a* illuminating the user's eye 52*a*, with reflected light collected by lens 53*a* and piped by fiber optics bungle probes 54*a* to the sensor system 55*a*, where the light is passed through opposing polarization spectral filters 56*a* to the light-steering mirrors 57*a*, and further reflected to the sensor 59*a* through identical filters 58*a*. In a still different embodiment, the invention incorporates a novel single lens stereo design with an inward-bowed split mirror or perhaps a curved concave mirror system for instantaneous stereo-imaging of the eye with appropriate image processing to separate the dual images in the mirror return. As example, FIG. 4B is a schematic of an optical device incorporating a light source array with a single lens stereo camera utilizing an inward-bowed split mirror as a component of the invention. Here, the optical device is shown as 50*b* with light source 51*b* illuminating the user's eye 52*b*, with reflected light in turn redirected 54*b* by the split mirror system 53*b* to the sensor system 55*b*. As further example, FIG. 4C is a schematic of an optical device incorporating a light source array with a single lens stereo camera utilizing a converging concave mirror as a component of the invention. Here, the optical device is shown as 50*c* with light source 51*c* illuminating the user's eye 52*c*, with reflected light in turn redirected 54*c* by the concave mirror system 53*c* to the sensor system 55*c*. Here, the mirror is shaped such that in one configuration the user's eye may be positioned along the principal axis between the focal point and center of curvature; the eye image is inverted and magnified and is readily located in the camera image plane using standard ray transfer matrix analysis with corrections for small angle paraxial assumptions. In this embodiment, the concave mirror acting as a converging mirror may be curved in a lateral direction or may be a spherical section or a parabolic mirror perhaps in the form of a Toroidal reflector. The position of the eye relative to the mirror is critical for a stable image since the magnification and orientation depends on the distance from the mirror, in particular the location relative to the centering and focal points. Placing the eye behind the centering point can result in stereo images of reduced size limiting image processing particularly as the distance is increased, while the eye in front of the point can result in magnified images increasing so as the focal point is approached. Placing the eye at the focal point can result in an image so magnified as to extend outside the field-of view of the camera. While placing the eye beyond the focal point can result in a single flattened image suitable for stereo processing with image correction, a design with the eye very close to the mirror may be a discomfort to the user. Finally, placing the eye at the centering point can result in a non-magnified image without visual distortion for sight through the mirror. Since the image can change with eye-location, in one embodiment the image processing may be adjusted accordingly following location of the eye cornea. In another embodiment, the mirror may be deformable by actuators to maintain a suitable concave shape for optimal image processing following location of the eye cornea.

In another embodiment (not shown), the mirror system may consist of two adjacent filters of opposite polarization tilted slightly in toward each other to form stereo views of the eye, where the polarization of the light source illuminating the eye is switched sequentially between the filters by a liquid-crystal optical polarization switch, where as a result, the camera receives the light first from one view than the other in conjunction with the switching action. In this further embodiment, the mirrors are active electric-optical switches composed of a twisted nematic liquid crystal polymer material that exhibit a linear-optic effect such that birefringence occurs when an electric field is applied with the induced birefringence proportional to the applied electric field, thereby behaving as a uniaxial crystal. With the switches comprised of a polarizing filter film followed by a polymer coated glass substrate, the device operates as a half-wave plate when voltage is applied to the substrate electrodes thereby blocking transmission and reflecting the image. Placing two such switches as adjacent mirrors slightly tilted in a stereo configuration, the switches may be alternated reflecting the image first from one surface and then from the other to the sensor.

Figure 5:
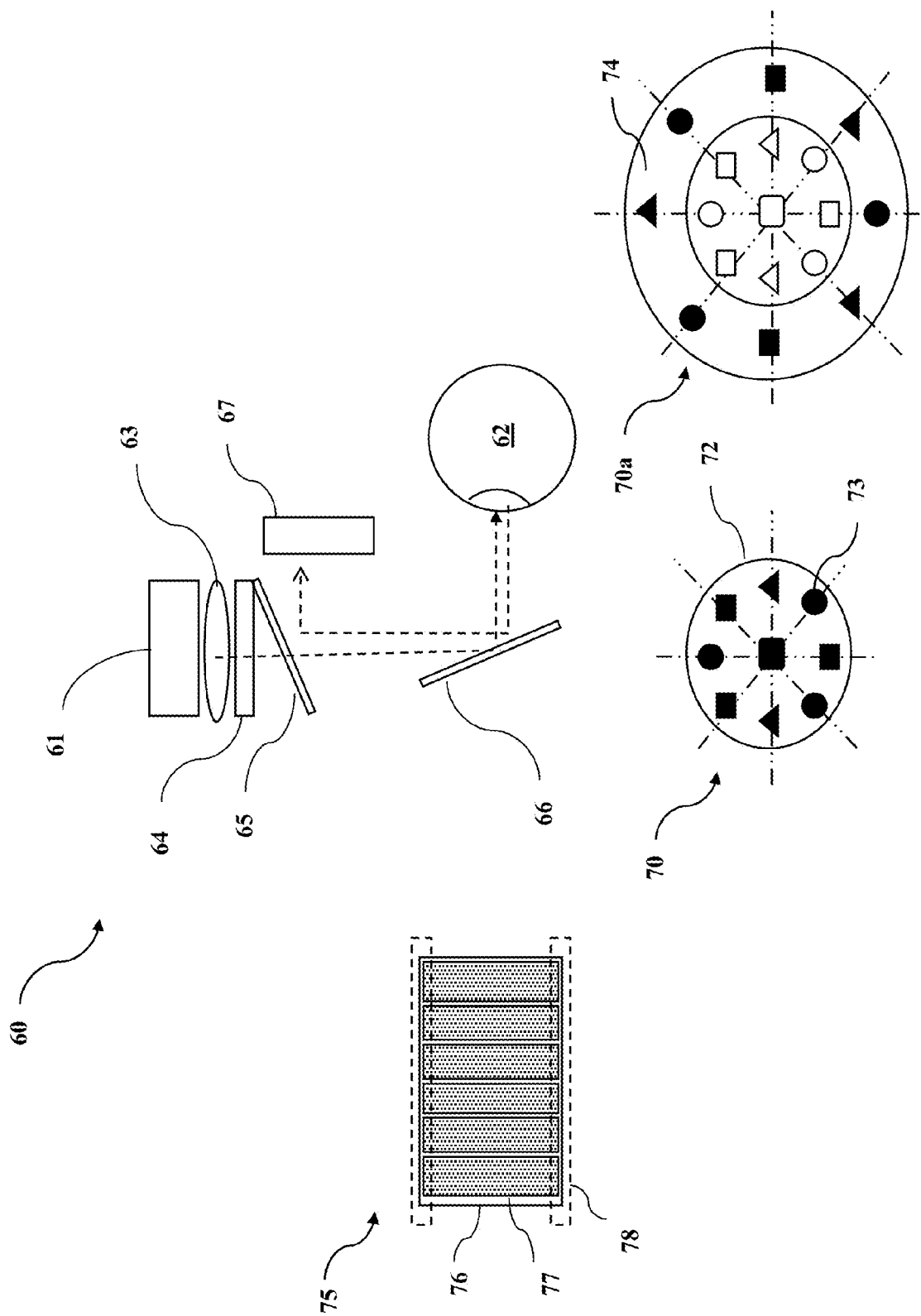
FIG. 5 is a schematic of an optical device incorporating a light source array and a single lens stereo camera with a stepped mirror design as a component of the invention.

In a still further embodiment, the invention incorporates a single lens stereo design with a microlens array or lenticular lens array inserted between the sensor and main lens for instantaneous stereo-imaging of the eye. In this embodiment, the sensor system may constitute a plenoptic system comprising a single-lens camera with a lenticular array possibly composed of spherical lenlets placed at the sensor plane that derives stereo relations from displacement analysis of the parallax between array sub-images collected in the same time frame. In one such embodiment, the system may comprise a large aperture light collecting main lens in front of a field lens placed onto a leticular array of lenlets for a sensor array such as a CCD; the field lens places the aperture at optical infinity from the lenticules. Such single lens stereo systems are well suited for small objects that are relatively close to the camera. FIG. 4D is a schematic of such an optical device shown as 50*d* with light source 51*d* illuminating the user's eye 52*d*, with reflected light in turn redirected 54*d* by the mirror system 53*d* to the sensor system 55*d* composed of the microlens array 58*d* inserted between the sensor 59*d* and main lens By way of further example, FIG. 5 is a schematic of an optical device 60 for a light source array with a single lens stereo camera based on a stepped light mirror system that is sequentially stepped (i.e., indexed) between opposing positions to provide a time sequence of stereo image pairs to the camera. In this embodiment, the light from the source 61 is focused by the lens 63 through the spectral filter 64 and the mirror/splitter 65, to the stepped mirror 66, to illuminating the eye 62; the light from the eye is reflected back to the sensor 67 by the mirror/splitter 65. The light source 61 is shown as source array 70 with LED elements of different configurations 73 in housing 72; for further reference, the light elements are shown as being in opposing clusters. With this configuration of collinear light elements, the pupil image is bright because of the retinal light reflections. In configuration 70*a*, an additional concentric ring of light elements 74 has been added that produce off-axis lighting of the peripheral resulting in a dark pupil image. The light arrays may be sequentially switched to produce both images for analysis; subtracting the dark pupil image from that for the bright pupil enhances the pupil image contour when both array sets produce equivalent luminance. Of course, other sources and configurations are possible, such as being combined without illumination for subtracting background illumination from the images. The mirror system 66 may be a planar parallel plate that is stepped between positions about the optical axis of the device. In a further embodiment, the mirror is shown as a deformable mirror that in one embodiment constitutes segmented mirror 75 in a frame 76 with flat-mirror segment elements 77 stepped between positions by microelectro-mechanical actuators 78 that synchronized with the camera action are embedded in the frame; in another embodiment the actuators may be bimorph piezoelectric, electrostrictive or piezoelastic material devices, and in another embodiment, electroactive polymer material devices, such as dielectric elastromers or ferroelectric polymers. In a further embodiment, the mirror segments may be incremented (i.e., stepped) between multiple positions about the optical axis providing multiple stereo views about a baseline, thereby resulting in depth maps of higher accuracy with the large number of extra images captured at multiple plate poses.

Figure 6:
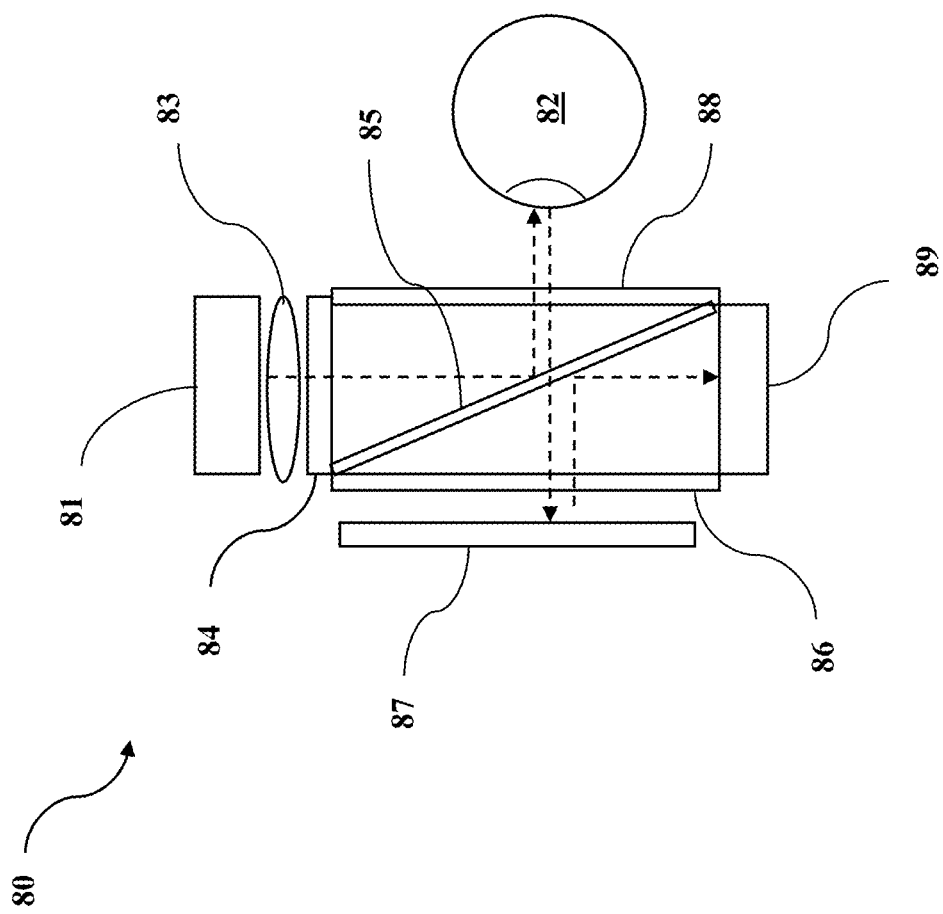
FIG. 6 is a schematic of an optical device incorporating a video display system and a single lens stereo camera with a stepped mirror design as a component of the invention.

In a further embodiment, FIG. 6 is a schematic of an optical device for a head mounted video display system with a single lens stereo camera design based on a stepped mirror design. Here, the optical device 22 (FIG. 2) may be composed of a head mounted display system 80 with a head-mounted video display 81 (with eyepiece optics 83) making up the light source 24 and a periocular array 89 of light sensors 26, all packaged as a complete unit with display optics. The display image light from 81 reflected from the user's eye 82 is directed back to the periocular array of light sensors 89 by the display optics. The geometrical design of the display optics is determined by the locations of the display 81 and the sensor array 89 relative to that of the viewer's eye. The virtual display design shown in FIG. 6 employs an on-axis folded optical geometry.

In this design, the light from the imaging display 81 is focused by the eyepiece lens 83 through a dielectric linear polarizer 84 and folded by a mirror/splitter 85 in the form of a linear polarizer with the plane of polarization rotated 90 degrees. The light then passes through a quarter-wave rotator (wave plate) 88 to the eye 82 circular polarized. The light reflected from the eye 82 passes back with circular polarization reversed through the wave plate 88, and with the light again rotated 90-degrees, passes linearly polarized through the mirror/splitter 85 and then through the wave plate 86. Now circular polarized, the light is reflected from the visor/combiner, 87, and passing back with polarization reversed through the quarter-wave plate 86, is folded by the mirror/splitter 85 onto the periocular array 89 of electronic light sensors. The array of electronic light sensors detects the display generated light reflected back from the cornea and internal components of the eye such as the iris surrounding the pupil and the fundus of the retina. Of course, other designs are possible for the optical device where similar comments apply to the optical geometry. In all such designs, the light reflected from the eye 82 passes back through the wave plate, and is folded by the mirror/splitter 85 onto the periocular array 89 of electronic light sensors.

Figure 7:
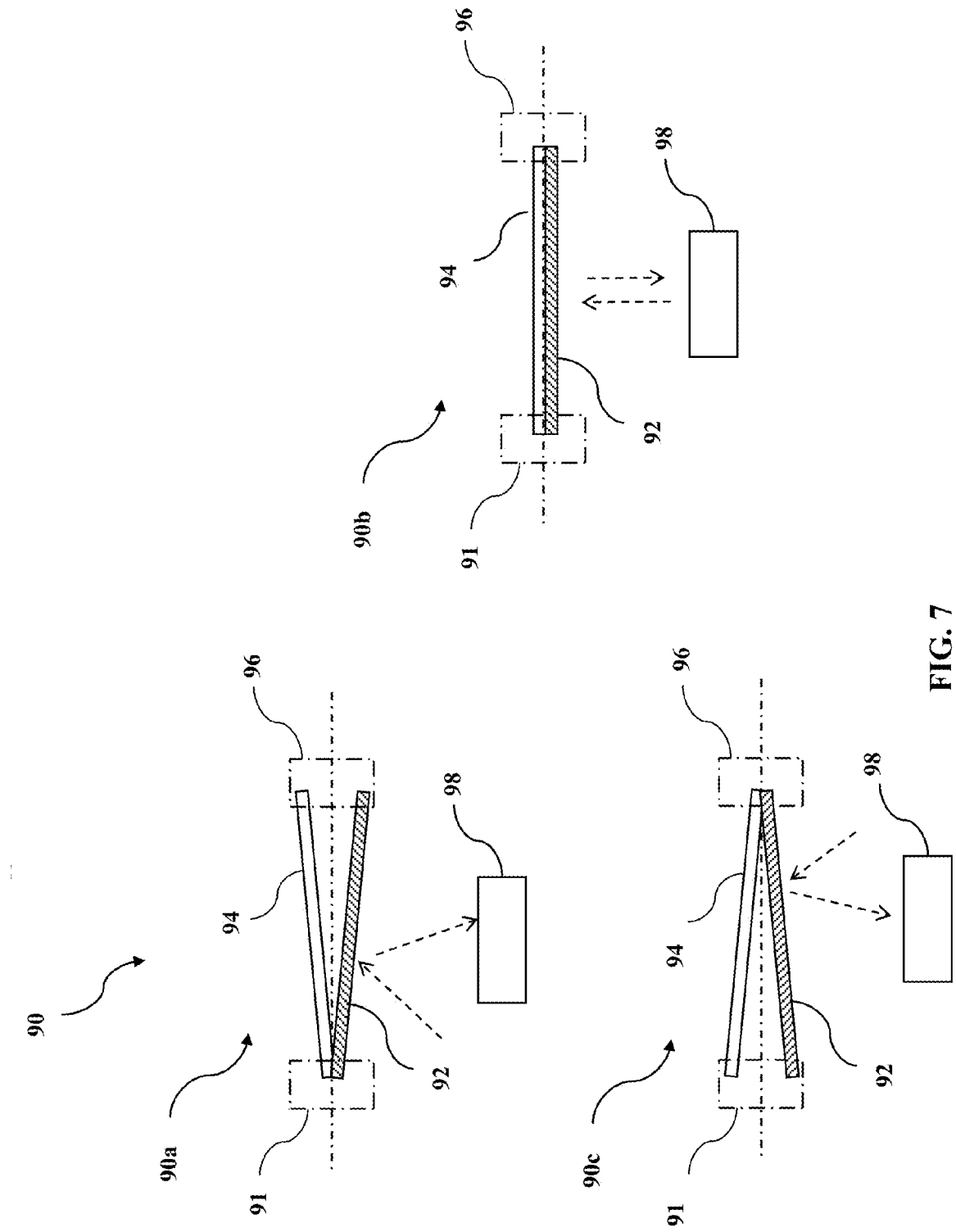
FIG. 7 is a schematic of a stepped mirror based on a parallel plate design in an optical device as a component of the invention.

In one embodiment, the display system 80 of electronic light sensors with the visor/combiner 87, functions as a single lens stereo camera design composed of a near infrared light mirror system indexed sequentially between opposing positions to provide a time sequence of stereo image pairs to the periocular array 89 of electronic light sensors. FIG. 7 shows a top view of one such embodiment of the mirror system as 90 composed of a neutral-density spectral near-infrared filter 92 that acting as a planar parallel plate reflecting light to the periocular array 98, is indexed between opposing positions by microelectro-mechanical actuators 91 and 96 that synchronized with the camera action are embedded in the frame of the display system 80 (FIG. 6). In one embodiment, the actuators may be microelectromechanical bimorph piezoelectric or piezoelastric devices. In FIG. 7 the filter 92 of mirror system 90*a* is oriented in a position to reflect near infrared light from one side view to the array 98, and incrementally later in the opposing position (as mirror system 90*c*) to reflect light from the opposing view to the array 98. In a further embodiment, the planar plate may be rotated in multiple positions providing multi-baseline stereo views for depth maps of higher accuracy; such an incremental index position is shown for mirror system 90*b* with a frontal view. For those applications where the user is viewing the external scene through visual light-transparent visor 87 of the head mounted display system 80 (FIG. 6) with the video display 81 projecting overlaid imagery onto the visor/combiner 87, an equivalent filter 94 is indexed in the opposite position to decrease blurring of the external scene image seen through the visor. This element is not needed for use of the head mounted display system 80 with virtual reality imagery from the video display 81 projected onto the visor/combiner 87 since the visor is opaque.

Figure 8:
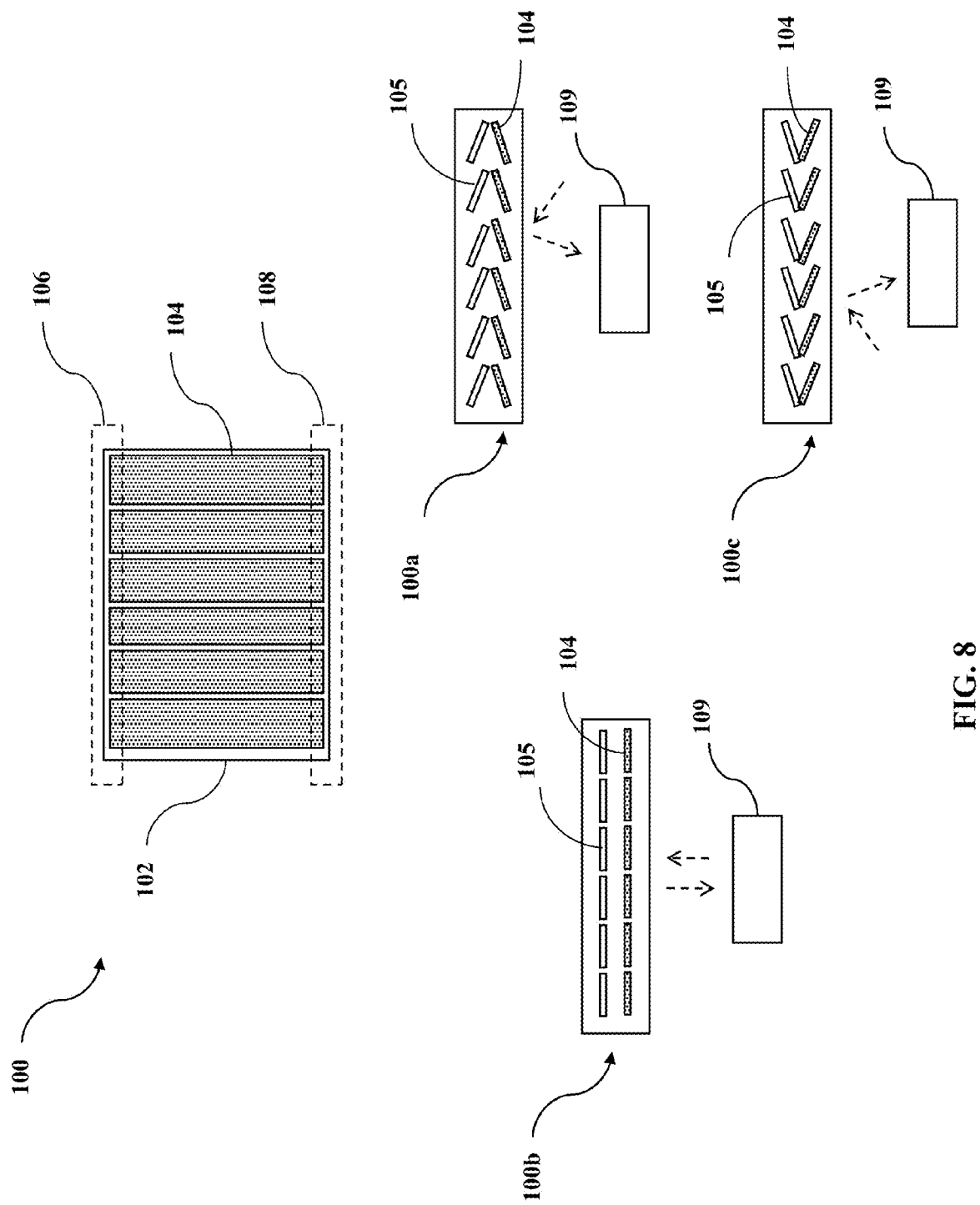
FIG. 8 is a schematic of a stepped mirror based on a segmented mirror design in an optical device as a component of the invention.

FIG. 8 shows a front view of another embodiment of the mirror system as 100 composed of a deformable segmented mirror 102 with mirror segments 104 driven in tip-tilt mirror motion by an array of bimorph actuators 106 and 108 that synchronized with the camera action are embedded in the frame of the display system 80 (FIG. 6). In FIG. 8, the mirror is shown as 100*a* in top view with the segments oriented in a position to reflect near infrared light from one view to the sensor array 109, and incrementally later in the opposing position (as mirror system 100*c*) to reflect light from the opposing view to the array 109. In a further embodiment, the planar plate may be rotated in multiple positions providing multi-baseline stereo views for depth maps of higher accuracy; such an incremental index position is shown for mirror system 100*b* with a frontal view.

In one embodiment, the actuators may be microelectromechanical devices that attach the mirror segments to a substrate platform. In such embodiment, the actuators may be unimorph or preferably bimorph cantilevers with piezoelectric ceramic or electroactive polymers. These actuators are interposed between the frame and mirror and adhered on one side to the frame as a base and other to the mirror, mechanically bonding the two elements together. In one configuration for a flat mirror surface, the actuators may be bonded at the mirror ends so that the mirror is tilted as the actuators bend; in another configuration for a deformable mirror, the actuators may be bonded along the entire edges of the mirror segments so that the mirror may bend as a unit with the actuators. In a further embodiment, the actuators may be piezoelectric bimorph cantilevers each consisting of two thin plates of electroactive material, say piezoelectric ceramic, with conductive coatings on the electroactive plates to provide external voltages with electrical polarization perpendicular to plate surfaces. Application of a suitable voltage produces transverse deformation of the bimorph actuator with one plate expanding and the other contracting. In an embodiment, the piezo-bending actuators provide a rapid switching between mirror positions allowing video image sampling at fixed positions. In another embodiment, piezoelastic materials may be used as resonating actuators in which changes in electrical capacitance energy are released in elastic movements to provide continual oscillatory motion from the dielectric coupling between elastic strain and electric voltage. In this embodiment, a video sampling rate may be continual throughout the oscillation cycle.

The embodiment of the opto-electonic device 30 (FIG. 2) is best determined by the optical device design 22. For example, an embodiment for a simpler design of FIG. 4A consisting of a light source 24 composed of a simple array of several opposing arranged light-emitting diodes (LEDs) activated continuously and dual sensors 26 for, say, a single camera with a light directing mirror system may reasonably be a charge-coupled device (CCD) that is reset following image accumulation and transfer to the digital memory cache of the image processor 34 (FIG. 2) by means of clocked serial bucket brigade downloaded to an analog-to-digital converter with an analog input and a digital output. Because of the design, the transfer includes both stereo images into separate portions of the memory; the glint may be isolated from the image by low pass threshold filtering based on an image intensity histograms and the glint matched across images by light element with the positions fixed in the image by the optical design.

In another design for the optical device 22 (FIG. 2), the light source 24 may be composed of a multiple array of element subsets, possibly configured as elements of an electronic video display, activated sequentially, and the sensor may be a single lens stereo camera with a stepped multiple mirror design as in FIG. 5. In this configuration, considering the controller 39 (FIG. 2) as a display driver, the control line 31 may serve as a raster scan control, the control line 32 as the display field refresh control with the image for each view accumulated over a display refresh cycle, and the display may be is repeated for each view as synchronized with, say, the stepped multiple mirror, by control line 33. In one configuration, the display may be composed of near infrared light elements used to illuminate the eye, in another the infrared elements may be distributed in a systematic manner among the elements of a low resolution visual display, and in still another the return from the visual display elements are used as illuminators.

Considering each view, the image at the end of the refresh cycle will consist of the light returned from the diffuse surfaces of the internal eye elements overlaid with source element specular corneal surface reflection glints distributed in a systematic manner throughout the image as determined by the display design. For a display with only the minimal few elements necessary for, say, a spherical representation of the corneal surface mapping, the image processor may be configured to readily isolate the resulting glints from the image by low-pass filtering from the intensity histogram leaving the image of the internal eye structure, and to isolate the glint points of maximum intensity by high pass filtering. In this case, the opto-electronic device is readily embodied as a charge-coupled device (CCD) that is reset following image accumulation and transfer to the digital memory cache of the image processor 34 by means of clocked serial bucket brigade downloaded to an analog-to-digital converter with an analog input and a digital output.

Since the cornea is more basal than spherical over the full surface the accuracy of the corneal mapping is increased with the number of display element glints; however, the view image tends to be washed-out as the number of glint points increase resulting in reduced accuracy of feature isolation by image filtering and in particular, of the locating of the glint points in the image. For this reason, a reasonable embodiment for the opto-electronic device is as an opto-transistor array, a comparator array and an encoder and latch clocked by the raster-scan pulses of the display driver, which are configured to construct a pairing table of sequential source corneal reflections to sensor activations over the light source array display field refresh cycle. This would be with the purpose of isolating the source element glints of each subset as the view image is being accumulated over the display refresh cycle.

Figure 9:
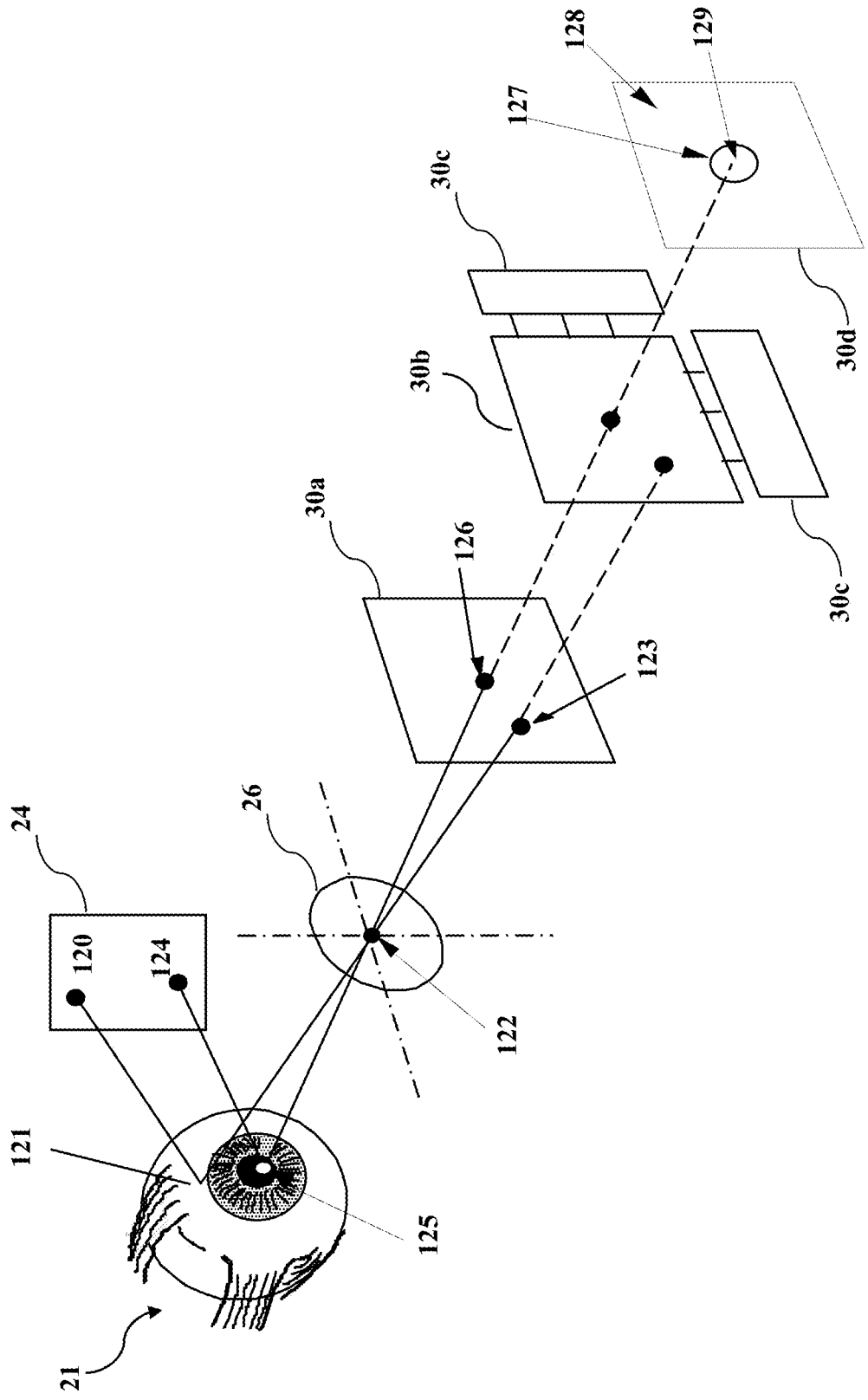
FIG. 9 is a diagram showing features for a method of isolating glint specular reflections from the corneal surface in the image generated with a video display array.

In such an embodiment shown in FIG. 9, the glint 121 and 125 for display 24 elements 120 and 124 are reflected from the cornea of the eye 21 to the sensor 26 with optical center 122, with activation of elements 123 and 126 in the opto-amplifier array 30*a* and electrical input to the comparator array 30*b* and activation of the encoder and latch 30*c*, components of the opto-electronic processor 30 (FIG. 2). Note the accumulation of the view image in the charge-coupled device 30*d* with the array 128 and image 127 of the pupil with centroid 129.

Figure 10:
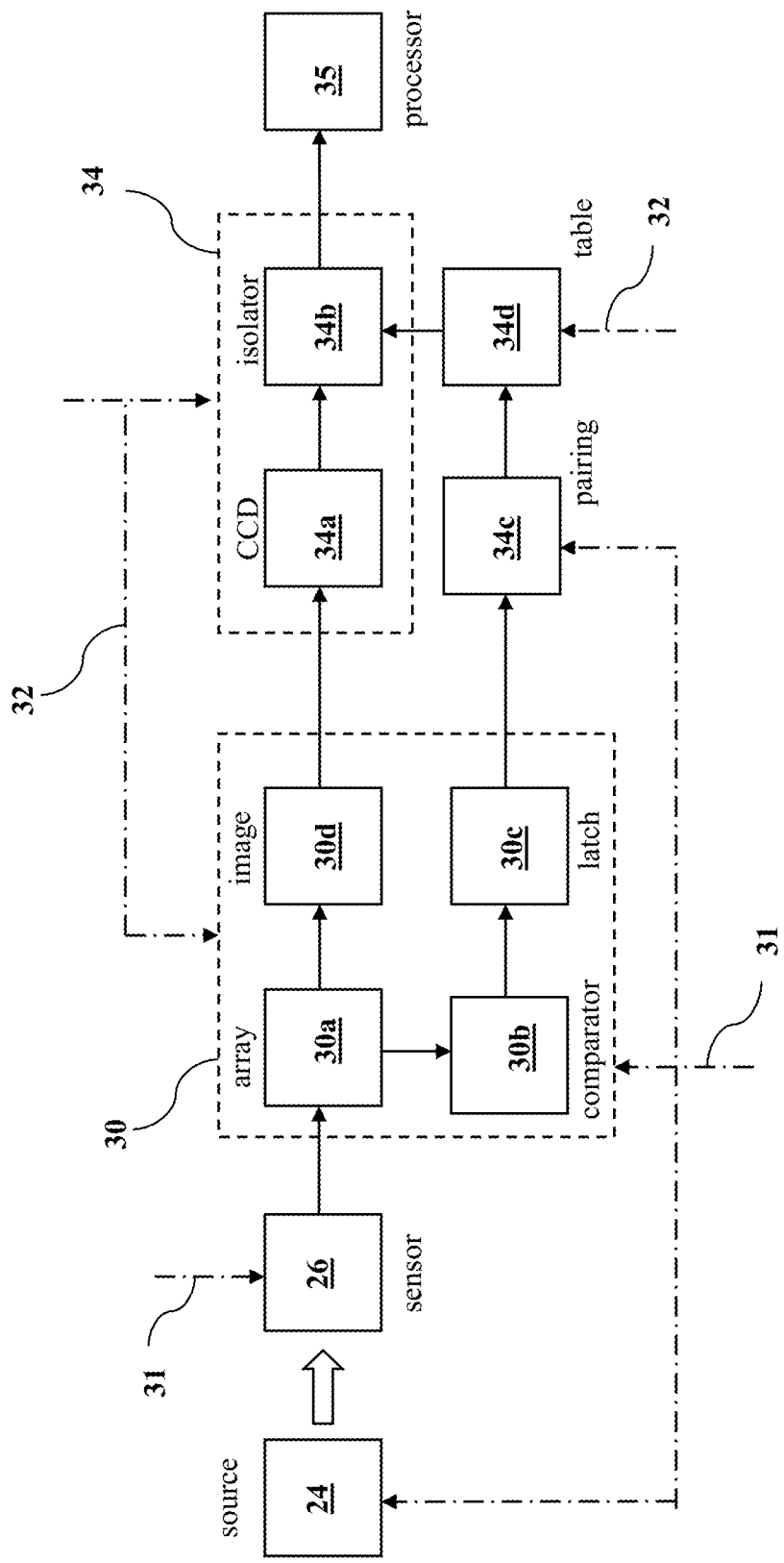
FIG. 10 is a block diagram of an embodiment of the method referenced in FIG. 9.

In this embodiment, shown as a schematic in FIG. 10, the optical output of the sensor system 26 is the input to the opto-amplifier array 30*a* of the opto-electronic device 30 (also of FIG. 2). The electrical output of the array 30*a* is the input to the comparator array 30*b* which in turn provides electrical input to the encoder and latch 30*c*. The electrical output of the encoder and latch 30*c* is the electrical input to a digital processor 34*c* of the image processor 34 (also of FIG. 2), for establishing a display-to-sensor element reference table for the refresh cycle. The comparator array 30*b* isolates the amplifier element 30*a* responding to the instantaneously illuminated element of the video display 24, and the processor 34*c* writes the encoded address from the latch 30*c* to a double buffered digital memory as reference table 34*d* shared with the digital processor 35 (also of FIG. 2), on the clocked raster-scan pulse of control line 31 for the video display 24. The electrical output of the array 30*a* is also input to the charge-coupled device (CCD) 30*d* with the accumulated image being transferred to the image processor 34 on the clocked display refresh pulse of control line 32. The pupil image centroid is isolated by processor 34*b* on the clocked display-field refresh pulse of control line 32 for the video display 24, and the electrical output is digital input to the digital processor 35.

In further embodiment, the light sensor array 26 may use a fiber-optics bundle probe to acquire an eye image. The output of the optics probe feeds the two-dimensional array of photo-transistors 30*a*. A spectral filter is used to ensure that only light of the appropriate wavelength from the display 26 is collected. The simple array of photo-transistors 30*a* instantaneously converts the reflected light to an electrical current. The photo-transistors 30a detect the corneal reflex (first Purkinje image) of the light source from the outer surface of the cornea. The incident light is specularly reflected from the spherical anterior surface of the cornea to create a virtual image of the source. The corneal reflex has a bell-shaped light distribution with the brightest part at the center of the image corresponding to the reflection point.

The sensor array 26 output may be piped through the amplifier array 30a to the array of comparators 30b where the amplified output of each photo-detector 30a is compared to a threshold level. The threshold level is set to collect the brightest part of the image with the level set above the system noise, mainly due to optical reflections from the other sources, the photo-transistor dark noise, and the Schottky, Johnson, and flicker noises in the amplifiers. The comparator array 30b is interfaced to the matrix array static encoder 30c. A comparator voltage output above the threshold level forces the corresponding matrix address on the output lines of the encoder 30c and the encoder output code is latched for the remaining duration of the raster-scan clock cycle period. In this way, the electronic encoder 30c isolates the photo-transistor 30a with maximum response to the corneal reflex from the instantaneously excited light source 26. The encoder latch is reset by the next raster scan clock pulse; the reset is momentarily delayed to allow interaction with the digital processor 34.

In this embodiment, the intensity response of the sensor element 26 receiving maximum intensity during a raster-scan cycle period is such that the voltage output of the corresponding optic-amplifier 30a reaches the comparator-threshold before that of the other amplifiers. The voltage output of the optic-amplifier 30a following the start of the raster-scan pulse performs a rapid rise in intensity as it follows the source 26 reaching a maximum that exceeds the comparator threshold, and then slowly decays below the threshold within the raster-scan period. The output of the corresponding comparator 30b switches from low to high when the intensity exceeds the comparator-threshold.

Still further, in particular considering an electrical circuit design, the comparator output may be an input to a static (priority) encoder, in this embodiment, part of the encoder and latch 30c. The outputs of the encoder are at ground at this time since all input lines from the comparator array 30b were at ground. At the moment in time that the comparator 30b output goes high the output of the encoder becomes the matrix address of that comparator 30b. The output of an OR circuit having as input all output lines of the encoder is now pulled high. The output is the clock input to a type D-flip flop, which with the set line tied to ground, the data-line tied to supply and reset tied to the raster scan pulse line 31 now at ground, causes the inverse-output of the flip-flop to be pulled low. The output, with a storage capacitor for simple leading edge delay, is the store line input to a latch that with clear and disable lines grounded, is part of the encoder and latch 30c, with the encoder address output as input data lines. The latch now holds the comparator address in internal memory until the store line is pulled high. At the end of the scan period the optic-amplifier intensity has dropped below the comparator threshold returning the encoder outputs to ground along with the output of the OR circuit. The raster-scan pulse 31 occurring at the end of the scan period pulls the reset line on the flip-flop high which, now in the direct mode following the capacitor induced delay, pulls the store line on the latch high, releasing the latch output to follow the encoder. However, during the capacitor induced delay, the digital processor 34c activated by the raster-scan pulse 31 leading edge, has read the latched output prior to release.

The electrical output of the latched encoder 30c may be the electrical input to the digital processor 34c and on the raster scan clock pulse 31 for the video display 24, the processor 34c writes the encoded address from the latch 30c for the light sensor 26 matrix address to a double buffered digital memory 34d shared with the digital computer 35. The vertical and horizontal matrix address of the corresponding video display 24 pixel-element is determined by the display refresh order, which is indexed by the raster scan clock pulse count 31. The process is repeated by processor 34c during the display refresh cycle 32, producing a digital memory table 34d of array matrix addresses for photo-transistor sensor 26 and light source element 24 pairings, which is accessible by the digital computer 35 routines. The digital memory 34d is buffered and the raster scan clock pulse counter is reset to zero on the clocked field refresh pulse 32.

In further embodiment, the output of the opto-transistor array 30a may be fed to the CCD video accumulator 30d during the display refresh cycle. The device accumulates an image of the eye with the reflected light from the excitation and decayed states of the refreshed light sources over the display refresh cycle. The accumulated image is downloaded to an image frame grabber at the end of the cycle output and then piped to the image processing board 34 where the centroid of the pupil image may be computed using an binarization and image brightness threshold technique. The center and major and minor axes of the centroid in the accumulator's image plane coordinates are computed and stored in memory accessible by digital computer 35 routines. Finally, the pupil diameter may be computed from the pupil image centroid major and minor axes.

Figure 11:
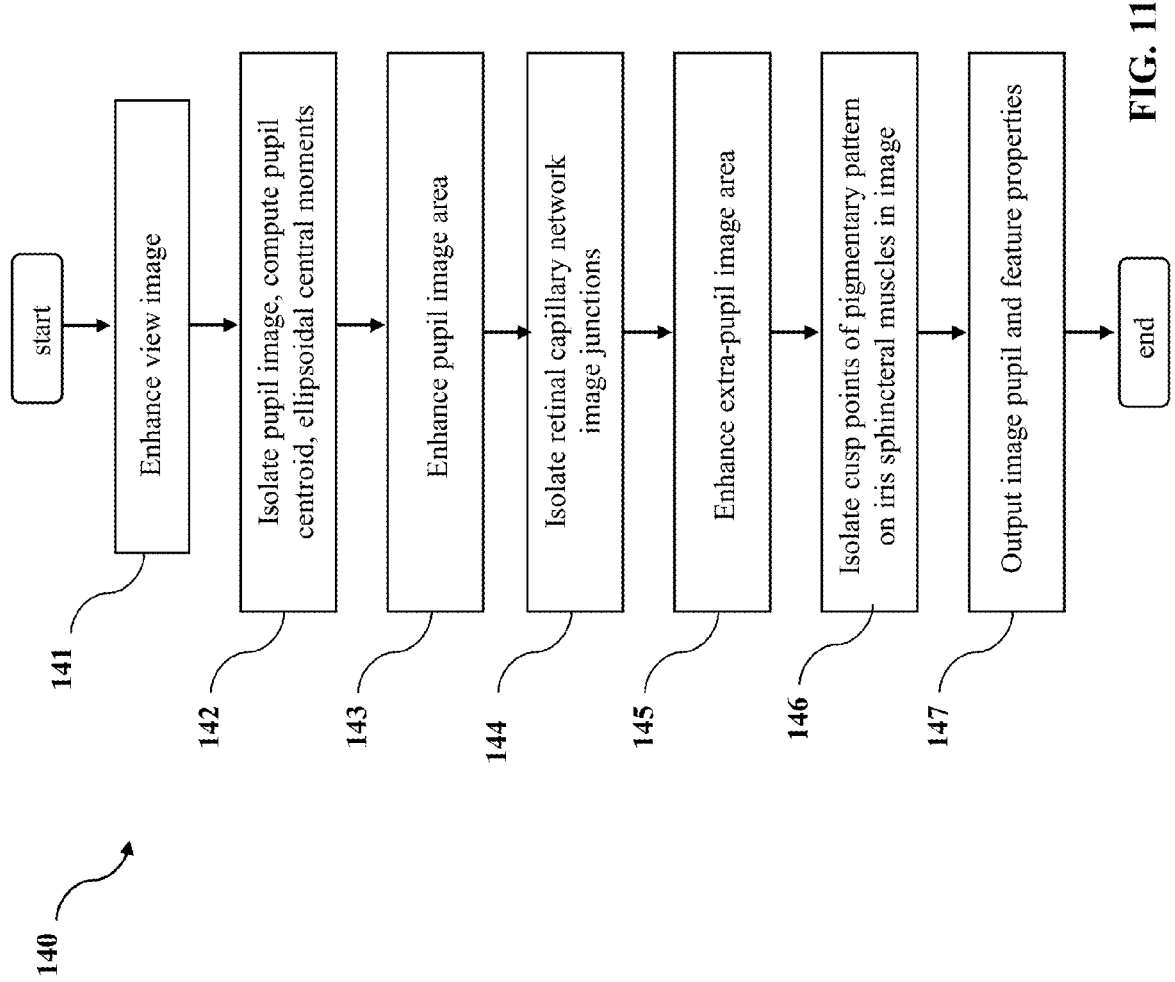
FIG. 11 is a flowchart showing an image processing routine for use in the embodiment of FIG. 10.

In a further embodiment, the image processor 34 may isolate the pupil image centroid major and minor axes, the retinal capillary image network junctions, and the cusp points of the pigmentary pattern on the sphincteral muscles in the iris image as reference for a model of the eye. In one such embodiment, the processor 34b uses the routine 140 of FIG. 11, released from inhibition by the display refresh cycle pulse of the control line 32 to process the digitized eye image held in memory cache 34a. In this routine, the processor enhances the view image 141 by intensity histogram equalization, isolates the pupil image 142 by, say, intensity thresholding and binary equalization of the digitized eye image, and computes the ellipsoidal central moments from the thresholded pupil image including the pupil image centroid coordinates.

In a still further embodiment, the pupil image may be approximated as an ellipsoid resulting from a weak-perspective orthographic projection of a circle in three dimensional space followed by scaling. An ellipse in an image may be described using five parameters: the image x- and y-coordinates of the elliptical center ($x_c$, $y_c$), the major and minor radii ($r_x$, $r_m$), and the rotational angle of the ellipse ($\phi$), in the image plane, say, by the rotation of the major radius from the image plane vertical; an equivalent set consists of the image coordinates of five properly spaced circumference points. The elliptical figure may be located in the image iteratively by searching for the set of elliptical parameters that maximize the response to an integro-differential operator applied to the image following Gaussian smoothing along the radii directions. Given an initial estimate of the parameters and the arc search length, this may be done by the Simplex method or gradient based optimization methods.

Figure 12:
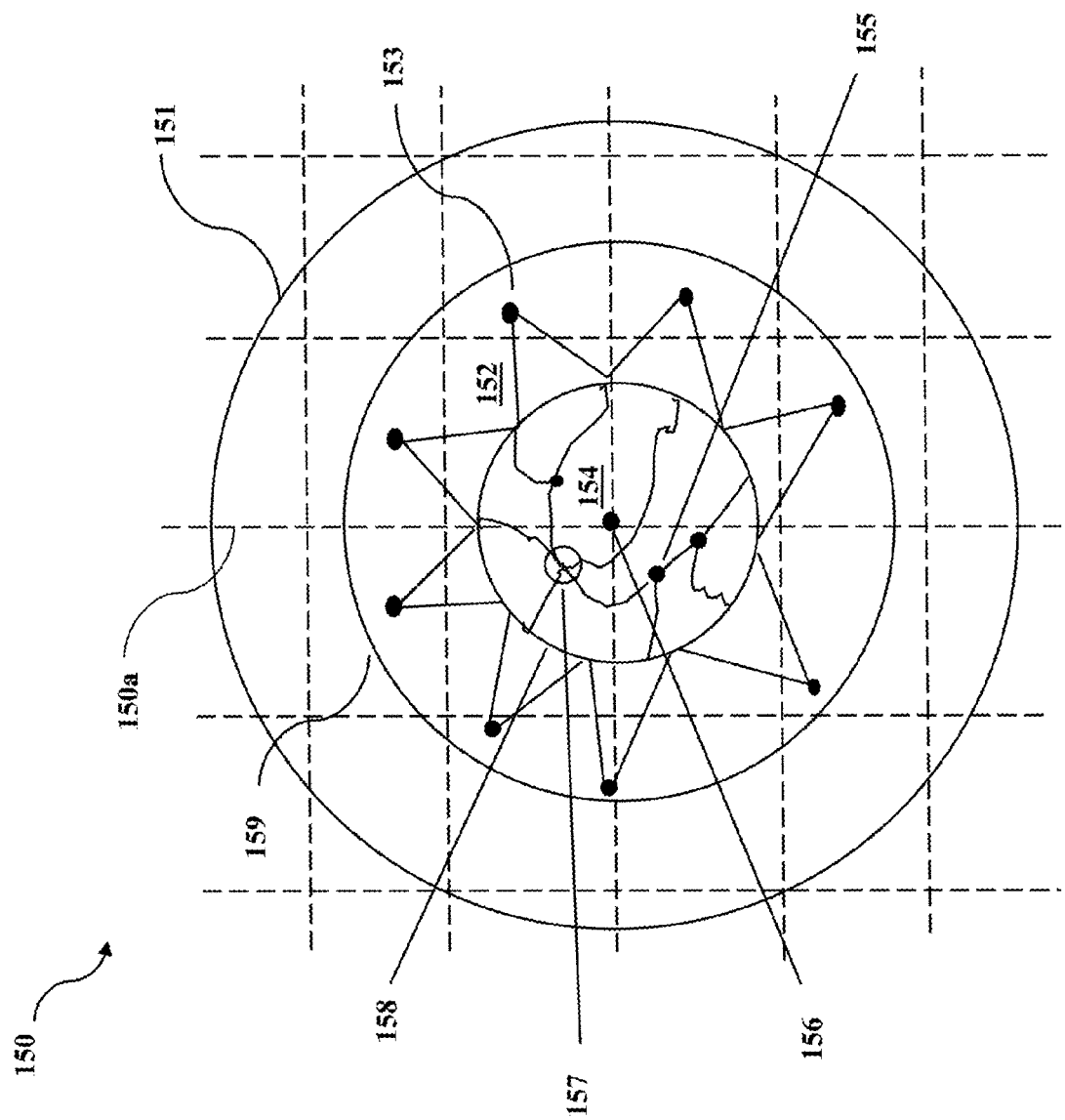
FIG. 12 is a schematic of an image of the eye showing features processed by image processing routine of FIG. 11.

Following isolation of the pupil image, the routine enhances the pupil image area 143 by further intensity histogram equalization, and then determines 144 the junction points in the image of the vascular capillary network that overlays the retinal fundus. As shown in FIG. 12 a schematic of an image of the human eye 150, the portion of the retinal fundus 154 that is visible in the image is determined by the diameter and orientation of the pupil 158, as well as the center 156. Also shown in the figure are the sclera 151, cornea 159, iris 152, with an overlaid grid of corneal reflection point 150*a*. The iris is composed of the sphincteral muscles, the opaque contractile diaphragm performed by the pupil, that with the pigmentary pattern define the cusp points 153. Visible behind the pupil is the retinal fundus with vascular capillary network junctions 155 and for this view the optical disk 157; the vascular capillary network radiates from the optic disk at the back of the retina where the optic nerve ($2^{nd}$ cranial nerve) enters the eyeball. Referring back to FIG. 11, the analysis of the vascular network 144 may be done through a series of consecutive image processing steps, in which the line structure of the vascular network is enhanced with spatial gradient templates for edges and lines, the network is segmented by binary thresholding, and the junction points of the network segments are isolated as key features. The template matching operation is repeated for each template in the orthogonal set of line matching templates.

The routine next enhances the extra-pupil image area 145 formed by the iris and then isolates the cusp points of the pigmentary pattern on the sphincteral muscles in the image. Again, the analysis of the pigmentary pattern may be done through a series of consecutive image processing steps, in which the line structure of the pattern is enhanced with spatial gradient templates for edges and lines, the pattern is segmented by binary thresholding, and the cusps of the pattern are isolated 146 as key features. Finally, the routine outputs 147 the image properties of the pupil centroid location and ellipsoidal moments, and the type, number and locations in the image of the retinal network junctions and the iris cusps points, to say, a double buffered digital memory mapped area shared with the digital processor 35 (FIG. 10; also of FIG. 2).

In still another embodiment, the light source may be configured as a laser retinal scanning display, with a single lens stereo camera with a temporally stepped multiple mirror design as in FIG. 6. Considering the large array of display elements and rapid display update rate possible in such modern display technology, a reasonable embodiment for the opto-electronic device is as a complementary metal oxide semiconductor (CMOS) substrate. The device may be as above, with an opto-transistor array, a comparator array and an encoder and latch clocked by the raster-scan pulses of the display driver, which are configured to construct a pairing table of sequential source corneal reflections to sensor activations over the light source array display field refresh cycle. This will allow the glints to be rapidly isolated while the view image is being accumulated over the display refresh cycle. In this embodiment, an active-pixel image sensor array, embodied as a complementary metal oxide semiconductor (CMOS) substrate, may be directed toward the cornea of the eye through a matrix of micro-lens. As above, the sensor may be integrated with a comparator array which is interfaced to bilateral switches. An element address encoder and latch determines the sensor element which reaches maximum intensity during the raster-scan period of the display driver. Over a display field refresh cycle, the invention maps the corneal surface to a data table by pairing sensor activations to the specular reflections from the cornea of the sequenced source lights. Furthermore, at each raster-scan pulse, the electronics accumulate pixel-wise the intensities of the sensor elements to activate a charge-coupled device (CCD) array for acquiring an image of the eye from the diffused reflections. This is done for those sensor-pixel elements which have intensities that are less than that for specular reflection, as determined by an array of limit comparators. The comparators control an array of transistor-driven emitters which are mapped one-to-one to the CCD array through an array of one-of-two switches. The intensity limiting precludes specular wash-out of the image. In another embodiment, a memory cache replaces the CCD array, and the emitters are replaced by analog-to-digital converters in series with digital read-adder-write circuits. Further, the image processor may be embodied as a stack of very-large-scale-integrated (VLSI) circuit arrays, to rapidly isolate features for the pupil, retinal fundus, and iris. The embodiment enables the invention to compute at the display field refresh rate, a three dimensional model of the eye from the source to sensor pairing table and the eye's image.

Figure 13:
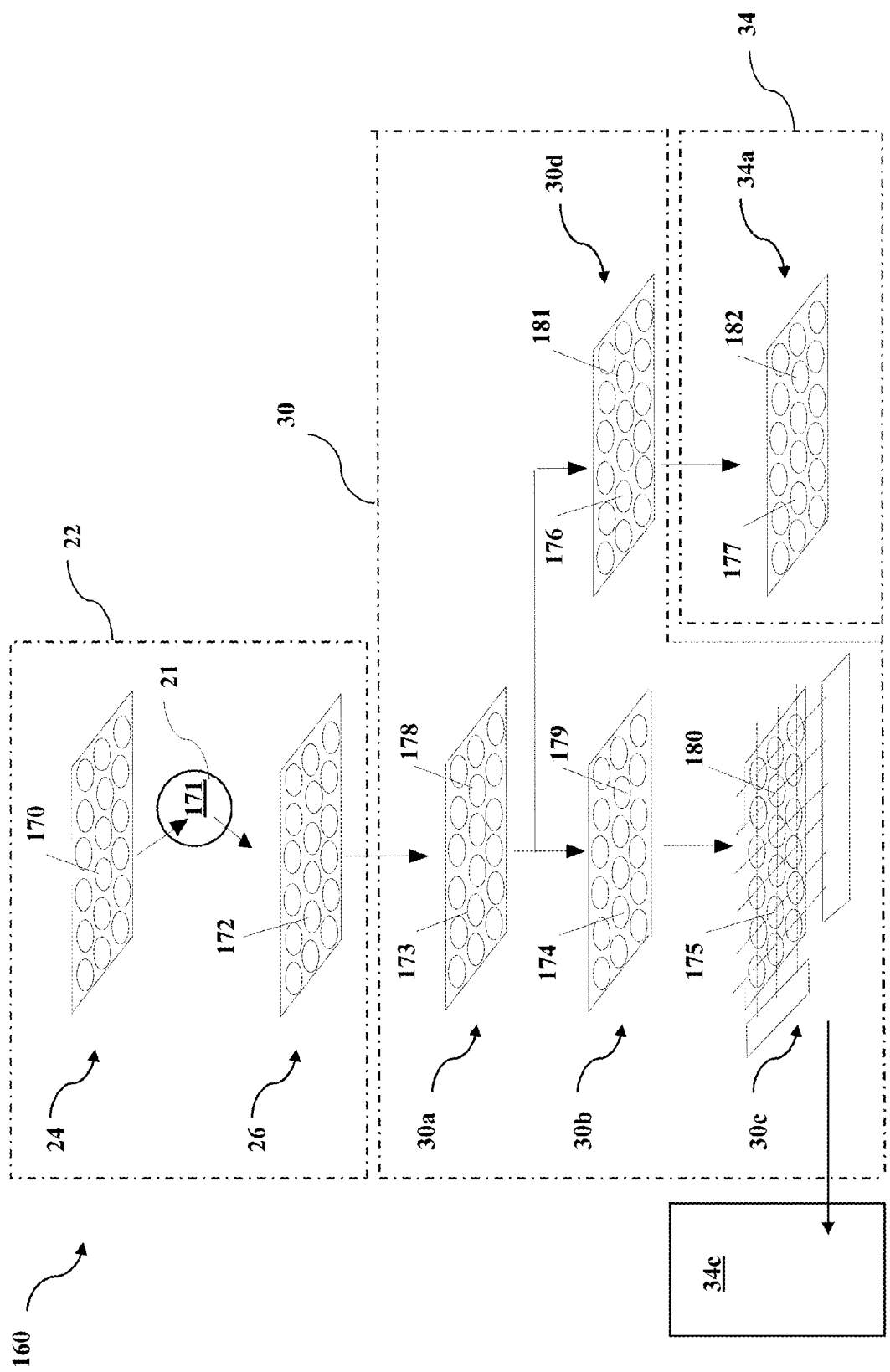
FIG. 13 is a schematic showing processing layers of an active-pixel sensor array for isolating glint specular reflections in the image generated with a video display array.

Considering a CMOS design 160 for the opto-electronic device 30 (also of FIG. 2) as shown in detail in FIG. 13, the light sensor array 26 of the optical device 22 with light source 24 illuminating the eye 21 (also of FIG. 2), may be a set of micro-lens interfaced to a fiber-optics bundle probe. The figure shows the output of the optics probe feeding a two-dimensional array of photo-transistors 30*a* (or photo-diode, transistor amplifier elements). A spectral filter (not shown) is used to ensure that light with a wavelength of the center value for the quarter-wave plate is collected for eye-tracking and not extraneous display light or ambient light from the surround. The array of photo-transistors 30*a* converts the light reflected from the eye to an electrical current distribution matching the image. As shown in FIG. 13, the opto-electronic device 30 consists of layers of arrays matched across corresponding pixel elements with the photo-detector array 30*a* receiving the incident light. The sets of matched elements function as parallel processing channels with two outputs for each channel. One output is for determining the point of specular reflection on the cornea. The other output is for processing the diffused reflections from the surfaces of the eye.

FIG. 13 shows the outputs of the photo-detector array 30*a* being piped one-to-one to an array of comparators 30*b* where the amplified output of each photo-detector of 30*a* is compared to a threshold level for specular reflection. The threshold level is set to collect the brightest part of the image. The level is set above the system noise which is mainly due to optical reflections from the other sources, the photo-transistor dark noise, and the Schottky, Johnson, and flicker noises in the amplifiers. The comparator array 30*b* is interfaced to a matrix array static encoder 30*c*. A comparator voltage output above the threshold level forces the corresponding matrix address on the output lines of the encoder 30*c* as output to the digital processor 34*c*. The encoder output code is latched for the remaining duration of the raster-scan clock cycle period. The circuit 30*c* is clocked by the raster-scan pulse of the display driver, and determines the sensor element with maximum intensity. The first switch to close during a raster-scan cycle causes the latch to be set with the matrix address of that switch. The latch is reset by the next raster-scan pulse.

The outputs of the photo-detector array 30*a* are also piped one-to-one to the elements of the image acquiring array, 30*d*. This array acquires an image of the eye in a CCD array 34*a* by preventing specular-reflective "washout", over a display refresh cycle. At each raster-scan pulse, the output intensities of the photo-detector elements are passed pixel-wise to the CCD. This is done for all elements with intensities less than that of the specular threshold. This point-array configuration accumulates an image of the eye from diffused surface reflections, over the display-field refresh cycle. The image is downloaded from the CCD array to the image processor 34*b* (FIG. 10) at the display-field refresh pulse 32.

At any moment during a raster-scan clock cycle, the eye 21 is illuminated by a single light source, say 170 of the display, 24. The incident light is specularly reflected from the anterior surface of the cornea to create a virtual image of the source. The corneal reflex 171 has a bell-shaped light distribution with the brightest part at the center of the image corresponding to the reflection point. The photo-transistors 30a detect the corneal reflex (first Purkinje image) of the light source from the outer surface of the cornea. Here, the photo-transistor element, say 173 is receiving light collected from the brightest point 171 by the micro-lens 172 and is the first to generate maximum current. This follows activation of the source 170 at the start of the raster-scan clock cycle.

FIG. 13 shows the elements 173, 174, and 175 of opto-electronic device 30 constituting one processing channel that is matched to the micro-lens 172, while 173, 176 and 177 make up the other channel. Here, the output of photo-detector element 173 responding to the brightest portion of the specular reflection causes the matched comparator 174 to reach the threshold first during the clock cycle. This in turn, forces the encoder output to be latched to the address of that comparator element through the switch 175. In this way the electronic encoder 30c isolates the photo-transistor 173 of 30a with maximum response to the corneal reflex 171 from the instantaneously excited light source 170 of the display 24.

The CCD array element 177 receives no light from the matched image acquiring element 176, during the raster scan clock cycle. This is because the intensity output of the corresponding photo-detector 173 exceeds the specular threshold as determined by the matched comparator 174. In contrast, the output of photo-detector element 178, with an intensity less than that of the specular threshold as determined by the comparator 179 in the corresponding processing channel, drives a light-emitter 181 matched to a CCD array element 182, while leaving the array switch element 180 unlatched.

The electrical output of the latched encoder 30c is the electrical input to the digital processor 34c and on the raster scan clock pulse 31 the processor 34c writes the encoded address from the latch 30c for the photo-detector 173 to a double buffered digital memory 34d shared with the digital computer 35 (FIG. 10). The encoder latch is reset by the raster scan clock pulse 31; the reset is momentarily delayed to allow interaction with digital processor 34c. The vertical and horizontal matrix address of the corresponding display source element 170 is determined by the display refresh order, which is indexed by the raster scan clock pulse count. The process is repeated by processor 34c during the display refresh cycle, producing a digital memory table 34d of array matrix addresses for photo-transistor sensor 26 and light source 24 pairings, which is accessible by the digital computer 35 routines. The digital memory 34d is buffered and the raster scan clock pulse counter is reset to zero on the clocked field refresh pulse 32.

A conventional electronic component architecture may be used for a point array processing channel of the opto-electronic device 30. The light collected by the sensor 26 element of the channel may be transformed by the photo-diode into a current, and that in turn to a signal voltage by a current-to-voltage transistor amplifier. Here, both components comprise the channel element of the photo-detector array 30a. The signal voltage is input to a voltage level-comparator, which as part of the comparator array 30b element, outputs a selector voltage, when the signal voltage exceeds the specular threshold. The selector voltage controls a bilateral switch, which closes when the signal voltage exceeds the specular threshold. The switch is the "winner-take-all" element of the encoder and latch 30c.

The selector signal from the voltage level-comparator is inverted by the inverter to control a 1-of-2 switch. The switch has inputs from the signal and ground, and output to a transistor driven, light-emitter. The inverter, switch, and emitter together comprise the point-array channel element for the image acquiring layer 30d, with light output to the CCD array element when the signal is less than the specular threshold.

In a further embodiment, the opto-electronic device 30 is an active-pixel array on a complementary metal-oxide semiconductor (CMOS) substrate, with integrated circuits. The CMOS design is a very-large-scale-integrated (VLSI) circuit with parallel point array architecture. The point array is made up of CMOS field-effect transistors (FET) performing functions equivalent to those of the conventional element architecture described above. The advantage of the CMOS VLSI array design over the conventional architecture is: (1) the small chip size for the large array needed for fine image resolution, and (2) the ability to perform at the megahertz raster-scan rates of retinal scanning displays, due to the parallel point-array circuit architecture.

In another embodiment, the array 30d acquires an image of the eye in a random-access-memory (RAM) cache, over a display refresh cycle, with modifications to the point-array element of the image-acquiring layer 30d for accumulating an image in a RAM cache. In this embodiment, the emitter is replaced by an element, with an analog-to-digital converter which has a digital output to a digital circuit. The circuit consists of a read-circuit, an adder, and a write-circuit. The read-circuit reads the digital contents of the cache memory location, at the leading edge of the raster scan clock pulse. The adder circuit adds the read value to the digital output of the converter. And, the write circuit writes the digital sum back into the cache memory location. The image in the RAM cache is addressed by the image processor 34b (FIG. 10) at the display-field refresh pulse. With dual caches, this embodiment has faster processing times than does the CCD-array design, which is limited by the bucket-brigade technique. While one cache accumulates an image during a display-field refresh cycle, the other retains the image from the previous cycle for the image processing. The role of the caches is switched at the next refresh pulse.

Figure 14:
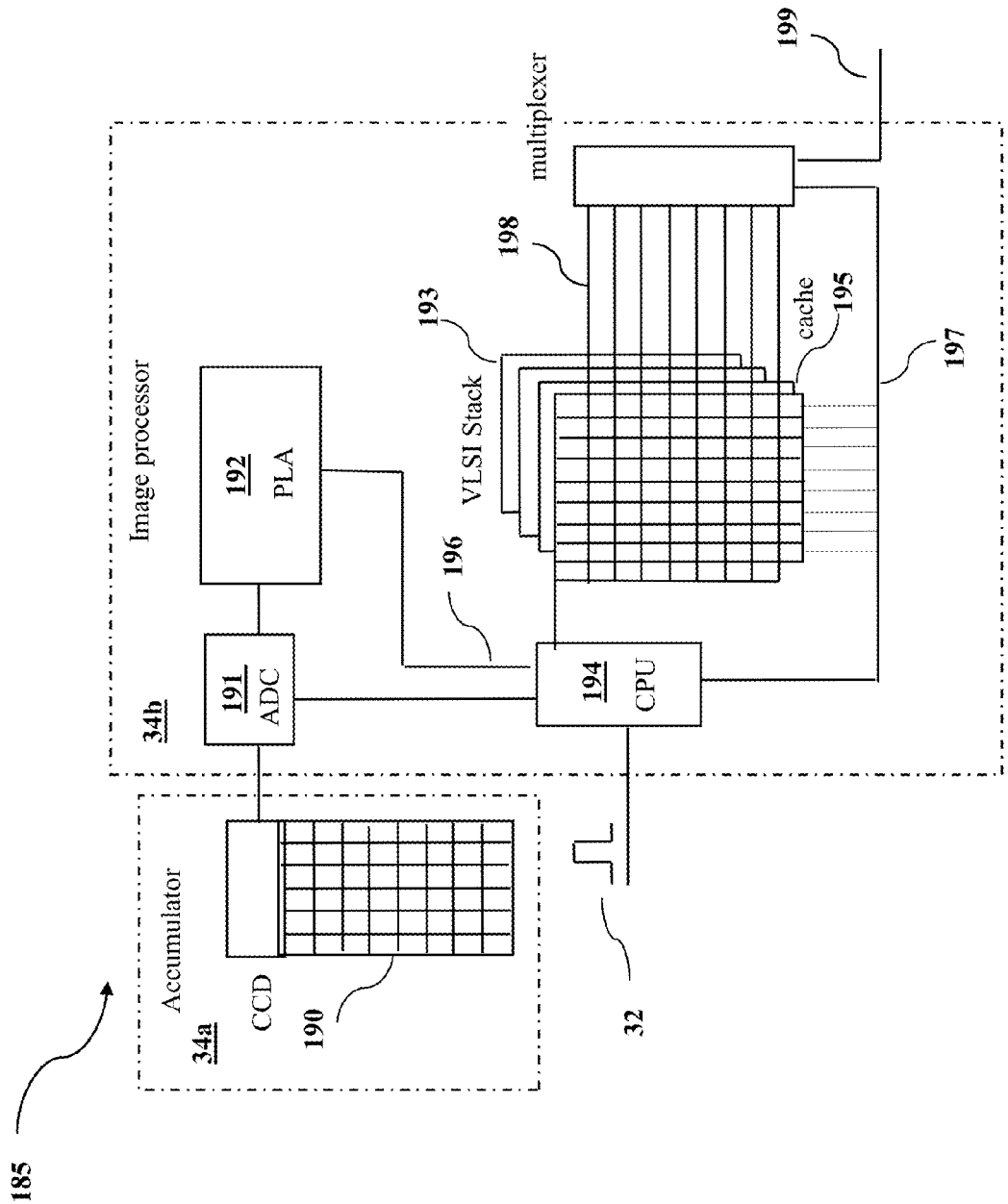
FIG. 14 is a schematic of architecture for an image processor with a CCD array.

Considering a CMOS design for the image processor 34 (FIG. 2) suitable for raster scan display processing, FIG. 14 shows an architecture 185 of the image processor and the interfacing of the image accumulator 34a (also of FIG. 10) to the image processing device 34b used to isolate image features. Here, the image accumulator 34a is a charge-coupled device (CCD) consisting of photosensitive Metal-Oxide-Silicon (MOS) capacitor elements arranged in a regular array 190. In this design, the array elements receive analog light inputs from the outputs of the matched light regenerating elements for the electronic integration of the eye's image over the display field refresh cycle of the display driver. The feature isolation is performed on the accumulated image in 34a by the image processing device 34b upon receipt of the display field refresh pulse 32 from the display driver.

The image processing device 34b may be embodied as a stack 193 of two dimensional very-large-scale-integrated (VLSI) circuit arrays made of CMOS wafers. Each array in the stack consists of identical digital processing elements which are matched between arrays by data bus lines 198 for image processing. The arrays are under the control of a central processing unit (CPU) 194 with common address and control bus lines 197. The CPU operates with a clock, instruction decoder, register, arithmetic and logic unit, and access to a memory cache with a stored program for stack control. The initial array of the stack is the digital memory cache 195 storing the digitized image. The remaining arrays of the stack consist of digital memory, comparators, counters, accumulators, and replicating elements. The stack functions by the CPU writing numerical values to the array elements and then operating the arrays en masse through the data and control bus lines.

The array elements of the stack 193 may perform conventional digital functions: (1) the memory elements perform store, shift, invert, OR, and readout; (2) the accumulators store, add, and readout; (3) the replicating elements input, output, and perform stack control; (4) the counters count in and shift out; and (5) the comparators store reference values and output whether the input is greater, equal, or lower in value. The inputs to the stack are the digitized image cache 195 and the pupil image moments 196. The output 199 of the stack is a memory-mapped list of eye structure features and their image positions.

The accumulated image is transferred to the memory cache array 195 from the CCD array 190 upon receipt of the display field refresh pulse 32. This is done by means of clocked serial bucket brigade downloaded to an analog-to-digital converter 191 with an analog input and a digital output. In the process, the output is read as a serial digital input by a very-large-scale-integrated (VLSI) circuit 192 on the data bus. The circuit is a video moment generator chip used to compute the image moments of the pupil and is made up of CMOS elements. The chip consists of a digital comparator for thresholding, and counters, shifters, adders, registers, and a programmable logic array (PLA). The digital comparator separates the serial digital input for the pupil image intensity from that for the iris and the sclera. The digital elements perform recursive moment computations on the resulting binary image under the control of the PLA. At the end of the serial transfer, the circuit outputs 196 the ellipsoidal moments of the pupil image: the centroid, the principal and minor axes, and deviations from these axes.

In preparation for feature processing the pupil image is isolated by the stack 193. The CPU 194 reads the pupil image moments from the video moment generator 192, following transfer of the digitized image to the digital memory cache 195. The CPU isolates the portion of the image containing the pupil by computing a template from the ellipsoidal moments and masking the image array cache. This is first done by writing "ones" into the elements of a memory array which match the pupil's template and "zeros" into the remaining. The CPU then uses an accumulator array to multiply the elements of the template array with the matched elements of the image array, and writing the products en masse to produce a masked memory array.

Figure 15:
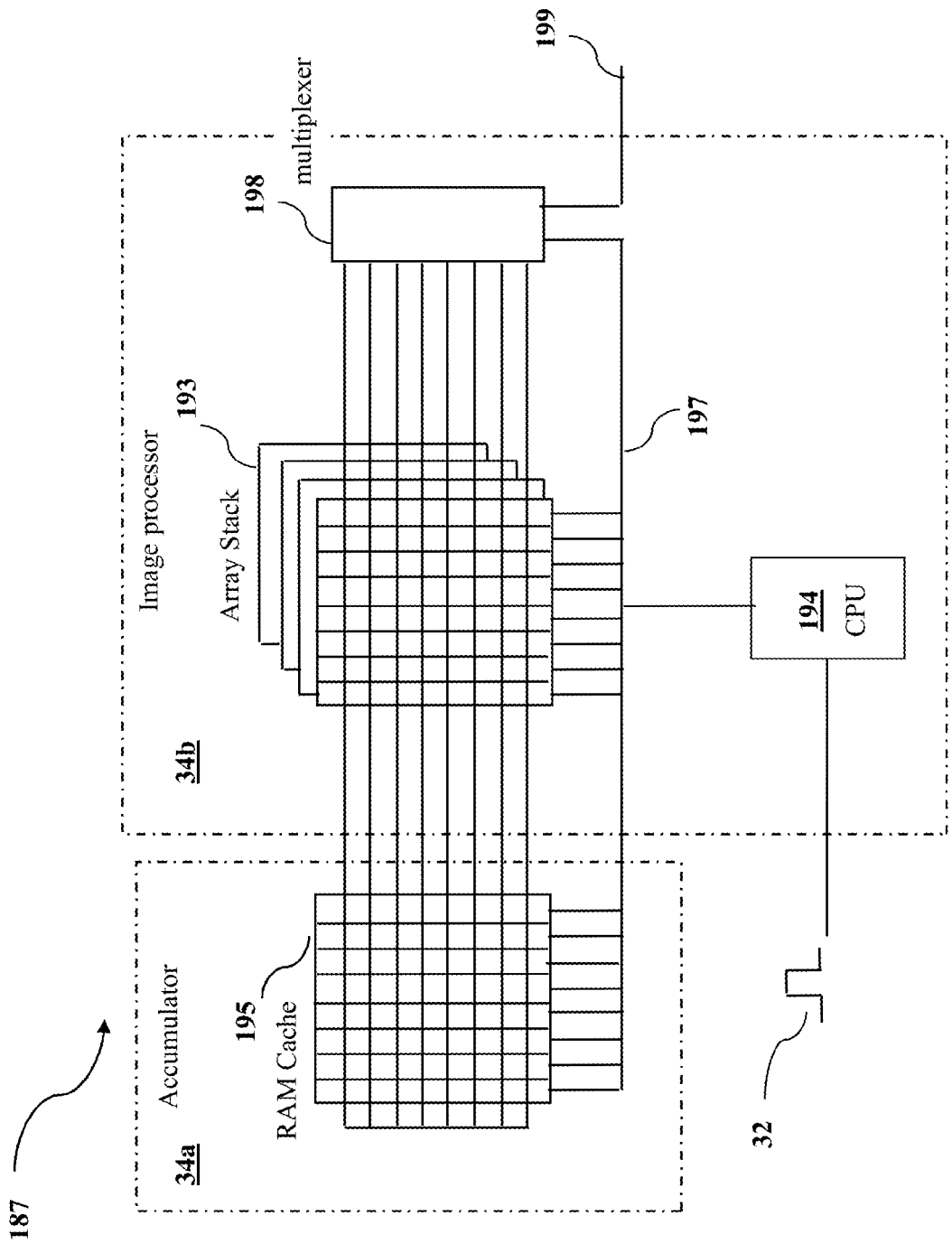
FIG. 15 is a schematic of architecture for an image processor with a RAM cache array.

In a further embodiment of architecture 187 shown in FIG. 15 for the image processor 34, the image accumulator 34a is in the form of the random-access-memory (RAM) cache 195, where the cache is the initial array of the array stack 193 of the image processing device 34b. In this design, the light regeneration elements of the image acquiring array 34d are replaced by analog-to-digital converters with digital outputs to digital circuits; the circuits are mapped one-to-one to the digital memory elements of the cache, for the electronic integration of the eye's image over the display field refresh cycle of the display driver. In this embodiment, the CMOS video moment generator 192 of FIG. 14 is eliminated. Instead, the moments are computed using the array stack 193 under the CPU 194 control upon receipt of the display field refresh pulse 32 from the display driver. The stack performs an intensity thresholding and binary equalization of the digitized eye image held in the memory cache, and computes the ellipsoidal central moments from the thresholded pupil image.

Following isolation of the pupil image, the stack 193 abstracts key image features such as the vascular capillary network 155 that overlays the retinal fundus 154. Referring back to FIG. 12, the vascular network radiates from the optic disk 157 at the back of the retina where the optic nerve ($2^{nd}$ cranial nerve) enters the eyeball. The portion of the retinal fundus that is visible in the image is determined by the diameter and orientation of the pupil 158. The pupil's diameter varies with the ambient lighting, from a fully open 7 millimeters for low light levels to 2 millimeters in bright light. For reference, the figure shows the sclera 151, the cornea 159, and the pupil centroid 156 as they appear in the eye's image. Shown also is the overlaid grid of corneal reflection points 150a that are not part of the image, but are computed from the pairing table 34d by a separate process. Here, the analysis of the vascular network may be done through a series of consecutive image processing steps in which: (1) the pupil image is enhanced with histogram equalization, (2) the vascular network is enhanced with spatial gradient templates for edges and lines, (3) the network is segmented by binary thresholding, and (4) the junction points of the network segments are isolated as key features.

In a further embodiment, the stack may isolate the cusps 153 of the pigmentary pattern on the sphincteral muscles of the iris 152, the opaque contractile diaphragm performed by the pupil. The sphincteral muscles contract or dilate the iris with changes in ambient light and accommodation. While the pattern changes with contraction, the general shape defined by the cusps remains invariant and unique to the individual. The stack isolates these key features through a series of consecutive processing steps, in which the first step is the isolation of the iris image from that of the eye. The remaining steps may follow the vascular network analysis: (1) the iris image is enhanced with histogram equalization, (2) the outline of the pigmented portion of the iris is enhanced with spatial gradient templates for edges and lines, (3) the outline is segmented by binary thresholding, and (4) the cusp points of the outline are isolated. These image processing steps are now reviewed in greater detail.

The stack 193 may isolate the iris image by intensity thresholding and binary equalization of the digitized eye image with removal of the pupil image. The intensity thresholding and binary equalization are performed by computing a threshold reference value with the histogram technique, and then using a replicator array to write the reference value to a comparator array. The gray scale intensities of the digital image memory cache 195 are then compared en masse, under control of the CPU 194. In this process, "zeros" are written to a memory array for intensities that are equal or less than the threshold, and "ones" for those that are greater.

The stack 193 may compute the image moments from the thresholded memory array. The CPU 194 writes the moment coefficients to the elements of an accumulator array as a function of the coordinates of the element in the array and the moment-orders. The accumulator array repeatedly adds en masse the thresholded gray scale intensities according to the corresponding moment coefficients, and the accumulated sums are written to a memory array. The sums are accumulated as the contents of the memory array are shifted along the columns (rows). This continues as the contents are shifted along the row (column), following writing the summed column (row) results to the memory array. The CPU reads the array total as the value of the image moment. This action is repeated for all combinations of image moments of second order or less: (0,0), (1,0), (0,1), (2,0), (1,1), and (0,2). The ellipsoidal central moments, consisting of the centroid, principal and minor axes, and deviations from the axes of an elliptic representation, are then computed from these values. Finally, the image of interest is isolated by masking the image memory array with the thresholded memory array.

The stack may compute an intensity histogram for an isolated image by first loading a comparator array with reference intensity levels, and then shifting the masked image array pass the comparator, while counting the occurrences of the levels. In detail, the CPU writes reference values into the columns (rows) of a comparator array with a replicator array, where the reference values are the same for each column (row) and the values are indexed from zero to the highest intensity level. The contents of the masked memory plane are then shifted along the rows (columns) of the array in a toroidal manner, while a counter array counts the comparator's "equal conditions". The counted values in the counter array are transferred to a memory array, and then summed in an accumulator as the memory array values are shifted along the columns (rows). Finally, the CPU reads the histogram distribution from the bottom row (column) of the accumulator.

The stack may enhance the intensity contrast of the isolated image with histogram equalization. In this process, the CPU computes a histogram equalization mapping from the intensity histogram. Reference values are written into the columns (rows) of a comparator array with a replicator array, where the reference values are the same for each column (row) and the values are indexed from zero to the highest intensity level. The corresponding mapping function values for the histogram equalization are written to the elements of an accumulating array. The mapping function values are then written en masse to an enhanced memory array for the comparator's "equal condition" as the contents of the masked memory array and the enhanced memory array are shifted in step along the rows (columns) of the array in a toroidal manner.

The stack may enhance the line-structure in the isolated image with a spatial gradient template. The CPU first zeros a destination accumulator array, and then performs a sequence of template matching processes on the enhanced image array. The template matching process first zeros a matching accumulator array, and then writes template weight values to an accumulator array. The enhanced image array is multiplied en masse by the template weights, and the products are added to the matching accumulator array. The enhanced image array is then shifted in turn left, right, down, up, and along each diagonal; and the above template weighting process is repeated for each shift. The absolute values of the contents for the template matching are then added to the destination accumulator array. This template matching operation is repeated for each template in the orthogonal set of line matching templates. Finally, the contents of the destination accumulator are written to a line-enhanced memory array.

The stack may segment the enhanced line-structure (either retinal capillary network or pigmentary outline) by binary thresholding. An intensity histogram is first computed for the edge enhanced image, and a selected threshold value is then written as a reference value to the elements of a comparator array. The edge enhanced image is compared en masse to the threshold value. A "zero" or "one" is written to a memory array depending upon whether the intensity of an element of the image is less or equal to the threshold value, or if it is greater.

The stack may isolate the junction points of the line segments by counting with an accumulator array, the number of neighboring pixels that are "one" for each "one"-pixel in the segmented image. For the junctions of the capillary network, the count is compared to a threshold of three with a comparator array; a "zero" is written to an isolation memory array for a count less than the threshold and "one" if equal or greater.

For the sphincteral cusps on the iris, the count is compared to a threshold of two; a "one" is written to an isolation memory array for a count less than the threshold and "zero" if equal or greater.

The CPU may store the image coordinates of the junction points of the network segments in cache memory. This is done by reading the isolation array with the CPU as the elements are shifted by rows (columns) and columns (rows) until all elements are read, and storing the row and column addresses of those elements that are "one". Finally, at completion of the image feature isolation, the CPU outputs to a memory mapped area, the pupil moments and the type, number, and image coordinates of the retinal network segment junctions and the iris-sphincteral cusps. Of course in still further embodiments, these methods for image processing may be used in different combinations depending upon the eyetracker design. It should be understood, however, that the above descriptions, while indicating preferred embodiments and numerous specific details thereof, are given by way of illustration and not of limitation.

Figure 16B:
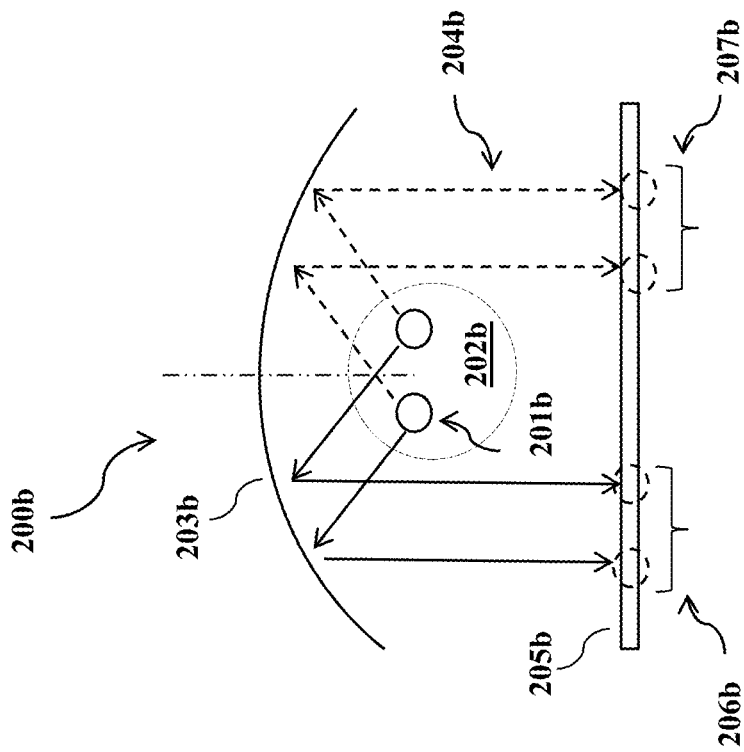
FIG. 16B is a schematic showing the use of concave mirror for determining stereo imaging.
Figure 16A:
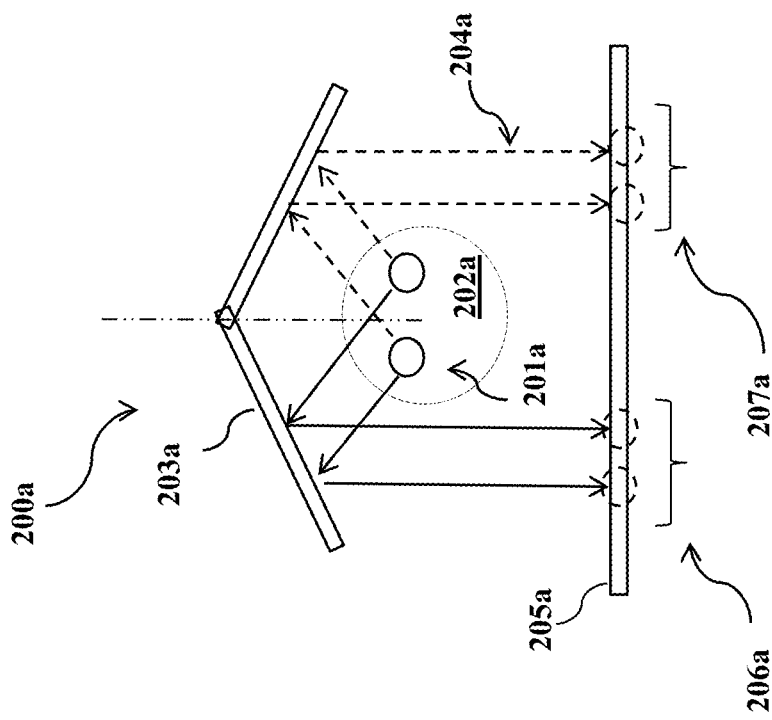
FIG. 16A is a schematic showing the use of split-mirror for determining stereo imaging.
Figure 16D:
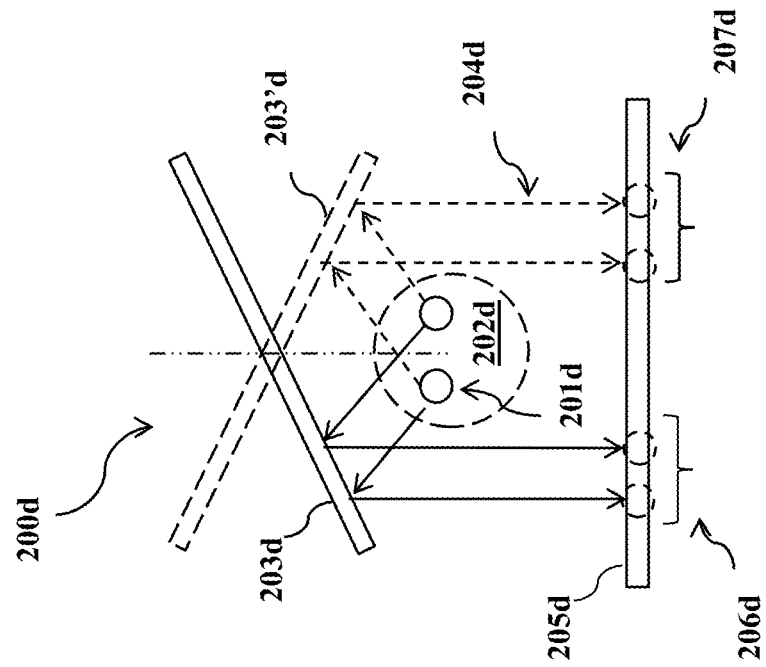
FIG. 16D is a schematic showing the use of a stepped-mirror system for determining stereo imaging.
Figure 16C:
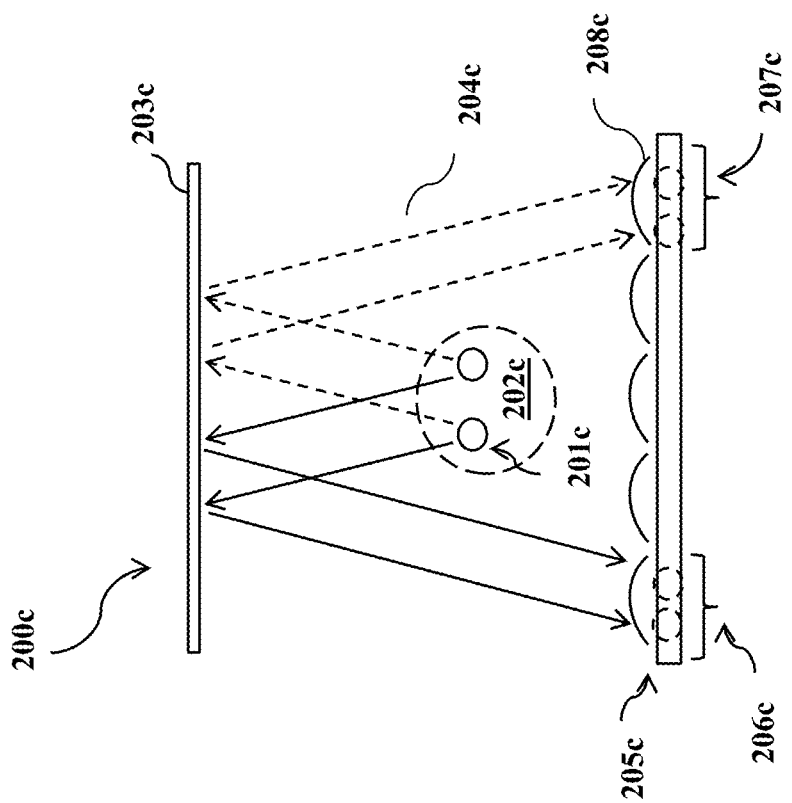
FIG. 16C is a schematic showing the use of microlens array for determining stereo imaging.

The methods of image processing in the invention are applied separately to each of the images in the stereo image set as acquired by the optical device either as an instantaneous stereo-imaging of the eye for a fixed-mirror design or sequentially as the mirror system is indexed. The stereo images are separated spatially at different locations in the image plane as determined by the camera optics following location of the eye-orbit relative to the optical device; the relative position is fixed in a head-donned device or may be located by facial image processing for a displaced device. This separation of images is demonstrated by FIGS. 16A through 16D which show stereo imaging for several different device configurations. FIG. 16A shows a schematic of stereo imaging for a fixed split-mirror design 200a where illumination of internal eye features 201a of an eye 202a is reflected to the mirror 203a and redirected to an image plane 205a for separate stereo views of the features 206a and 207a. Similarly, FIG. 16B shows a schematic of stereo imaging for a concave-mirror design 200b with the eye located between the centering and focal points, where illumination of internal eye features 201b of an eye 202b is reflected to the mirror 203b and redirected to an image plane 205b for stereo views of the features 206b and 207b. In this configuration, the stereo images are magnified and inverted as well as distorted. As with any concave mirror, the image magnification is greater with the eye closer to the focal point. Further, FIG. 16C shows a schematic of stereo imaging for a lenticular array design 200c where illumination of internal eye features 201c of an eye 202c is reflected to a mirror 203c and redirected to an image plane 205c for a stereo view of the features 206c and 207c, following imaging by the lenticular array 208c. Finally, FIG. 16D shows a schematic of stereo imaging for a indexed-mirror design 200d where illumination of internal eye features 201d of an eye 202d is reflected to the mirror in the first position 203d and redirected to an image plane 205d for a stereo view of the features 206d, and then reflected to the mirror in the second position 203'd with redirection to the image plane 205d for a stereo view of the features 207d; here, the stereo images are separated both spatially and temporally in the image plane.

A further embodiment for a design with an indexed mirror system is the application of motion stereo-optics for the determination of image element depth as another feature for classification and template matching. In this process, isolated elements are tracked across consecutive images by the apparent optical flow induced by the displacement from the previous locations in the image as the mirror is indexed. An optical flow routine determines the apparent optical flow data from the sequential images, and a further algorithm calculates three dimensional data from the optical flow data using the varying viewpoint of the mirror as a basis. The embodiment has the advantage of tracking isolated elements across images from the slight displacements and using the computed image depth as an additional feature for matching the elements to the feature template. This embodiment is particularly applicable with an oscillating mirror system driven by say a piezoelastic actuator, where the video image may be sampled continually during the oscillation cycle.

Figure 17A:
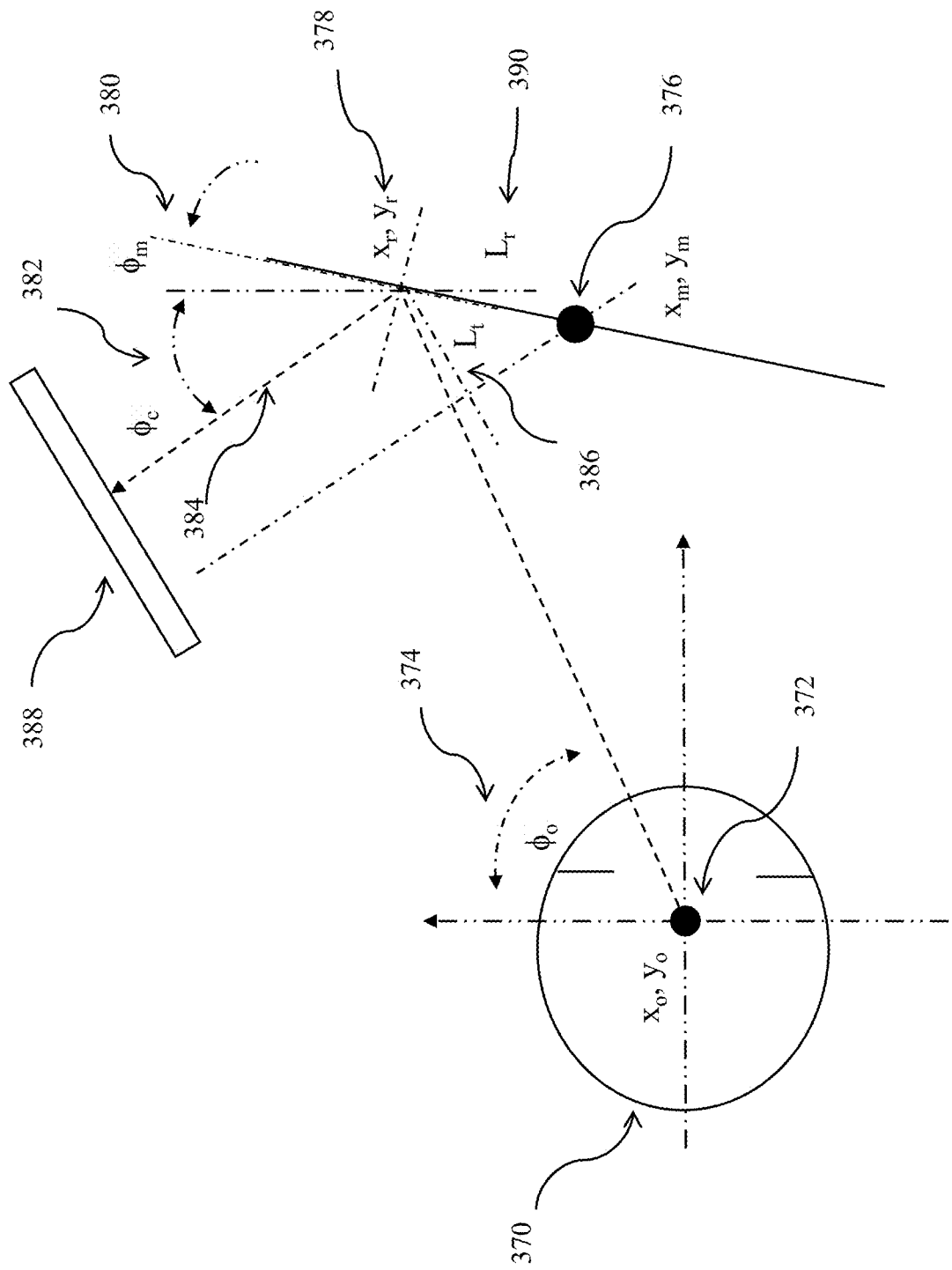
FIG. 17A is a schematic showing the use of motion-stereo from multiple images for determining depth as additional feature for template matching.
Figure 17B:
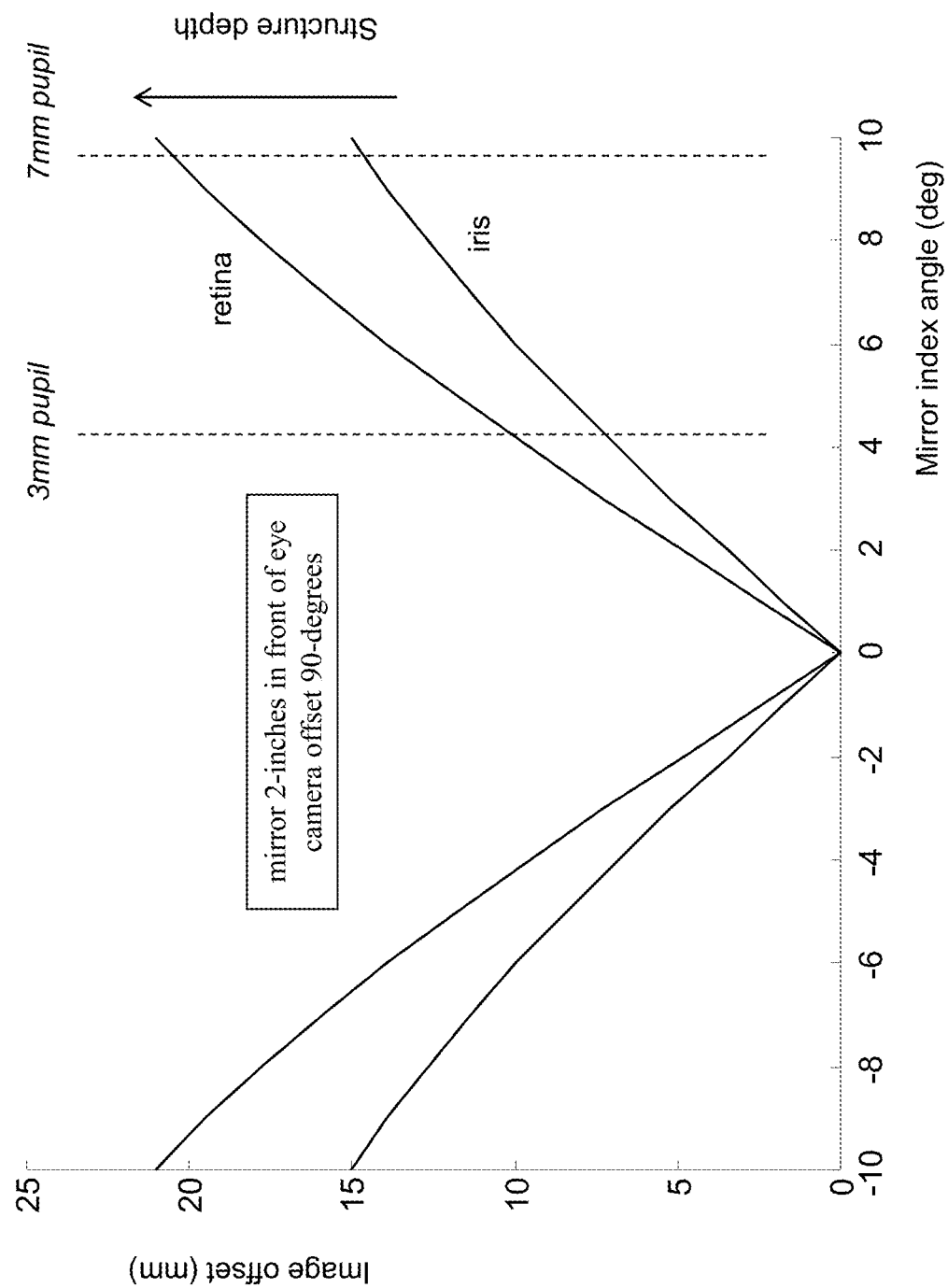
FIG. 17B is a plot of image offset by mirror index angle for typical iris and retinal structure features.
Figure 17C:
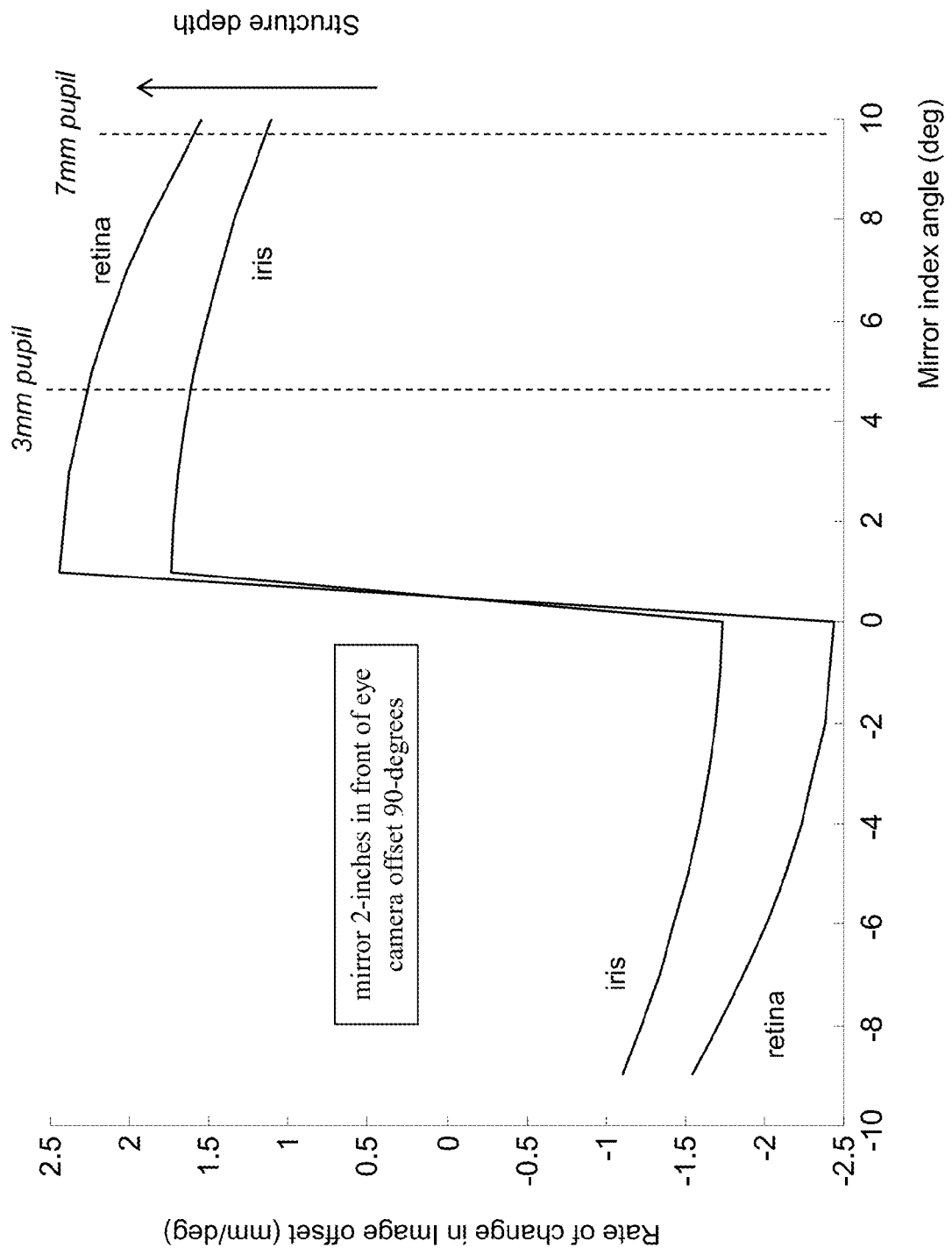
FIG. 17C is a plot of the rate of change per degree with index angle for typical iris and retinal structure features.

FIG. 17A demonstrates the application in two-dimensions of apparent motion stereos for use of eye structure depth as an additional classification feature. Here the image of a structure 372 located at position $P_o$:[$x_o$, $y_o$] within the eye 370 is reflected by the mirror centered at location 376 $P_m$:[$x_m$, $y_m$], to the camera 388 positioned at the angle 382 $\Phi_c$. In the figure, the mirror is indexed at angle 380 $\Phi_m$. The structure image from an incident ray at angle 374 $\Phi_o$, is reflected from mirror point 378 $P_r$:[$x_r$, $y_r$], to the camera along the reflection ray 384. From Snell's law of reflection, it can be shown that the incident angle is given by: $\Phi_o=\Phi_c+2*\Phi_m$. In turn, the reflection point coordinates in terms of the structure location and the mirror location and index angle are: $y_r=(x_o-x_m+y_m*\tan(\Phi_m)-y_o*\tan(\Phi_o)/(\tan(\Phi_m)-\tan(\Phi_o))$, and $x_r=x_m+(y_r-y_m)*\tan(\Phi_m)$. In turn, the offset of the image 386 in the camera view from the mirror center is related to the mirror index angle by $L_t=L_r*\sin(\Phi_c+\Phi_m)$, where $L_r$ is the distance 390 from the mirror center to the reflection point, $L_r$=sqrt$((x_r-x_m)^2+(y_r-y_m)^2)$. FIG. 17B shows plots of the image offset (mm) as a function of mirror index angle in degrees for structures at the iris and retina level within the eye for the mirror centered 2-inches in front of eye pupil and camera offset 90-degrees (behind the eye). FIG. 17C containing plots of the change in image offset (mm per degree) as a function of mirror index angle, shows that the absolute value of the offset rate increases with structure depth within the eye, and therefore this apparent motion-stereo based parameter may be used as additional classification feature over a wide range of pupil size at least from 3-mm to 7-mm.

Figures 18A, 18B:
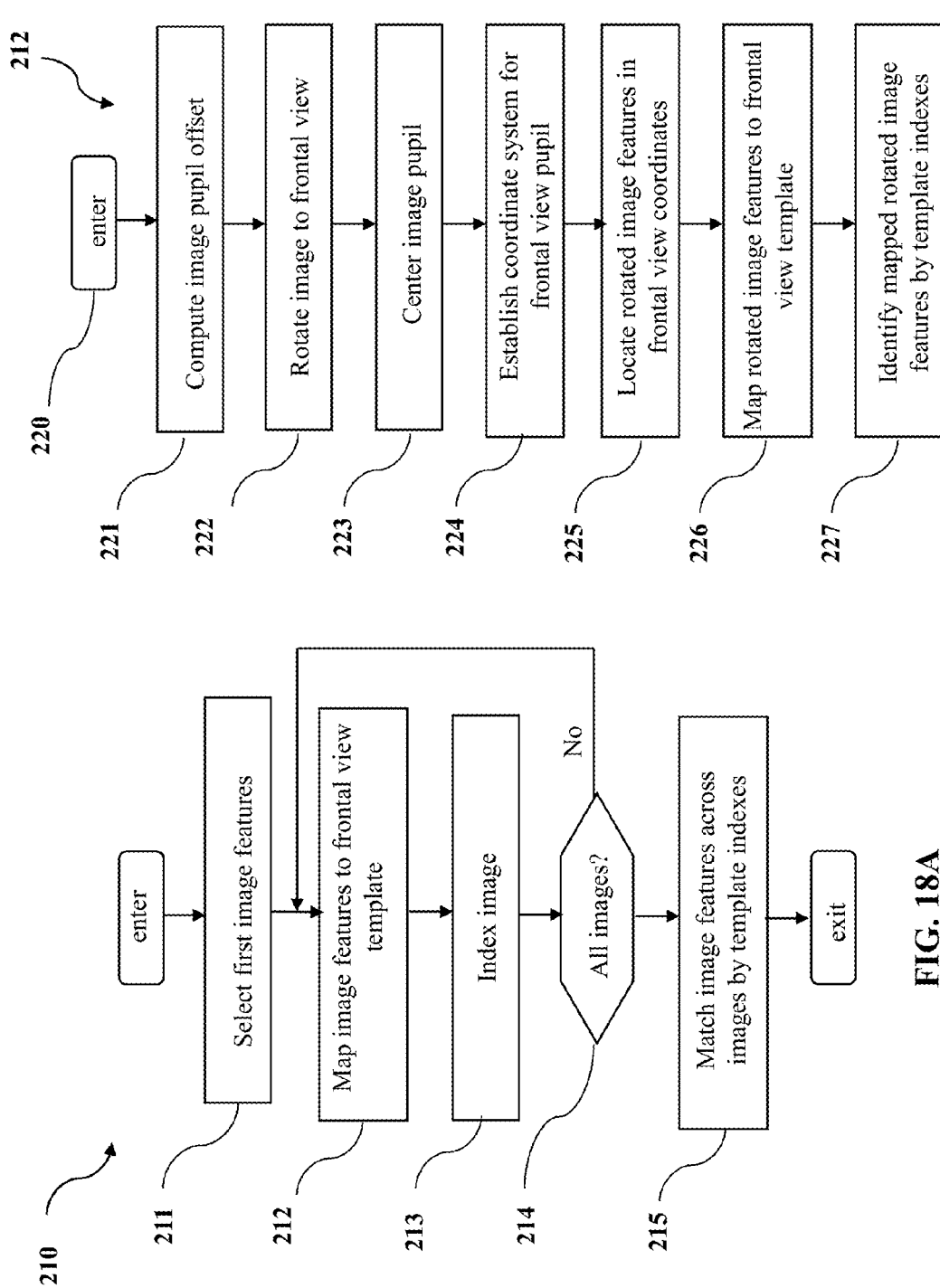
FIG. 18A is a flowchart showing a routine for matching image features for forming conjugate stereo pairs using template mapping.
FIG. 18B is a flowchart showing a routine for mapping image features to a pupil template.

Considering again the visual axis calculation system 35 (FIG. 2), the system includes a feature matcher 36, feature locator 37, and gaze processor 38, all under the control of the controller 39. In a preferred embodiment, the feature matcher 36 maps the image features isolated by the image processor to a template of the eye, and after fitting the features to the template, match the mapped features across the images to form stereo pairs. As shown in FIG. 18A, the processor 210 once released from hibernation after receiving as input all image features, for each image 211 maps the image features to template frontal pupil view 212, for all images 213, until complete 214, and then matches the features across the images by the corresponding template indexes 215. FIG. 18B shows the steps of the routine 212 mapping image features, which when called 220, computes the pupil offset from the sensor 221, rotates the pupil image to a frontal view of the pupil 222, centers the pupil image 223 on the true pupil position, and establishing the coordinate system for the frontal pupil view 224, locates the rotated image features with those coordinates 225, maps the rotated image features to the frontal view template features 226, and finally, labels the mapped image features by the template indices 227, before program return 228.

Figure 18C:
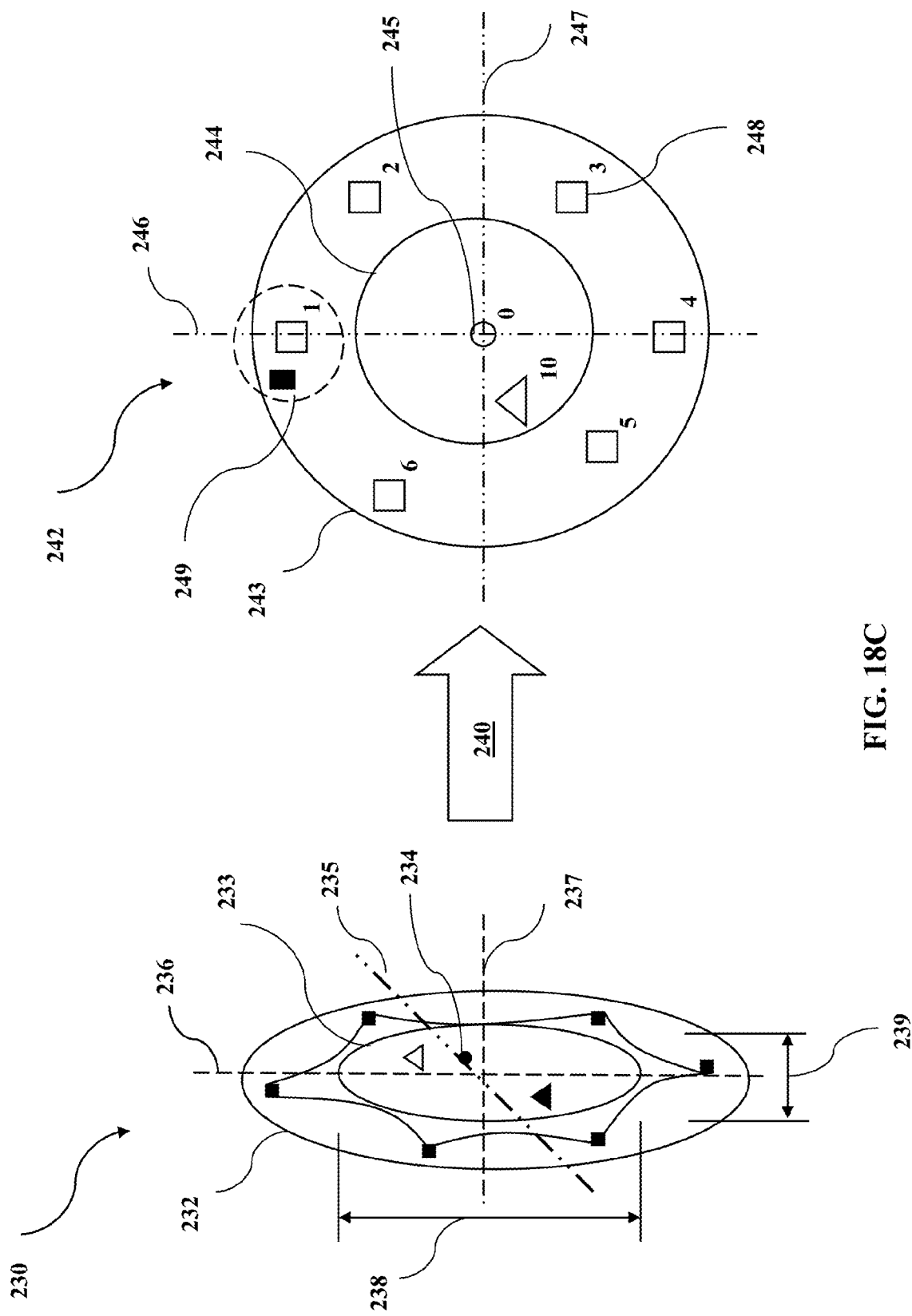
FIG. 18C is a schematic showing features for a method of mapping image features to a template.

This process can be demonstrated in FIG. 18C, where the pupil image with the isolated features is effectively rotated to that of a frontal view of the eye. This follows locating the apparent image features in a reference frame common to stereo views as defined by the centroid and ellipsoidal axes of the pupil images. Here, the figure shows the features of the pupil image 230 isolated within both the iris 232 and the retinal fundus area behind the pupil 233, located by the pupil centroid and the image ellipsoidal axes 236 and 237. The pupil image is offset from the sensor by an offset-angle which may be defined by the ratio of the ellipsoidal chords 239 and 238 for the pupil with the true axes given by 236 and 235 in the plane of the frontal pupil view. Note that because of non-uniform image distortion caused by the light ray refraction, the true image centroid 234 is displaced from the center of the pupil image. The pupil image is rotated 240 by the offset angle to the frontal pupil view 242 with the orthogonal axes 246 and 247, and the iris 243 and pupil area 244 with indexed template features 248, including the pupil center 245.

The template locates the features for the frontal view relative to the optical axis; in one embodiment the template may be derived in an initial calibration process. As a result of the rotation, the isolated features of the image are mapped into the coordinate system of the frontal pupil view. In this process, the iris cusp points map directly to the pupil axes since they are in the plane of the pupil; however, the fundus area lies well behind the pupil and the image points are rotated back to alignment with the pupil before mapping. The features are next fitted to the template features 249 by best-fit feature vector process with a parameter set for the features containing the reference frame locations and the feature category, that is, iris cusp or retinal capillary junction point; the process gives the probability of a feature mapping to the template features with the result that the image features are indexed to those of the template. Further, the apparent image features of the eye: pupil image and those of inner structures of the eye including the sphincteral pattern of the iris and the retinal capillary network in the image may be matched across views by the template indices. In one embodiment, the process individually compares the isolated features to those of the template and finds candidate matching features based on the Euclidean distance of their feature vectors. An iterative search through all possible matches selects the most likely feature matching set with the minimal sum of Euclidean distances for the corresponding feature vectors. In this embodiment, the features are individually compared across the image and template and the Euclidean distance is computed for the feature vectors. The most likely candidate provides a linear least square sum as a solution for an accurate fit. In a further embodiment, a scale-invariant feature transform may be employed to better account for clutter and partial occlusion by using smoothing filter techniques to produce feature vectors that are invariant to distortions in scale, orientation, and affine translation, as well as illumination changes.

Figures 19, 20:
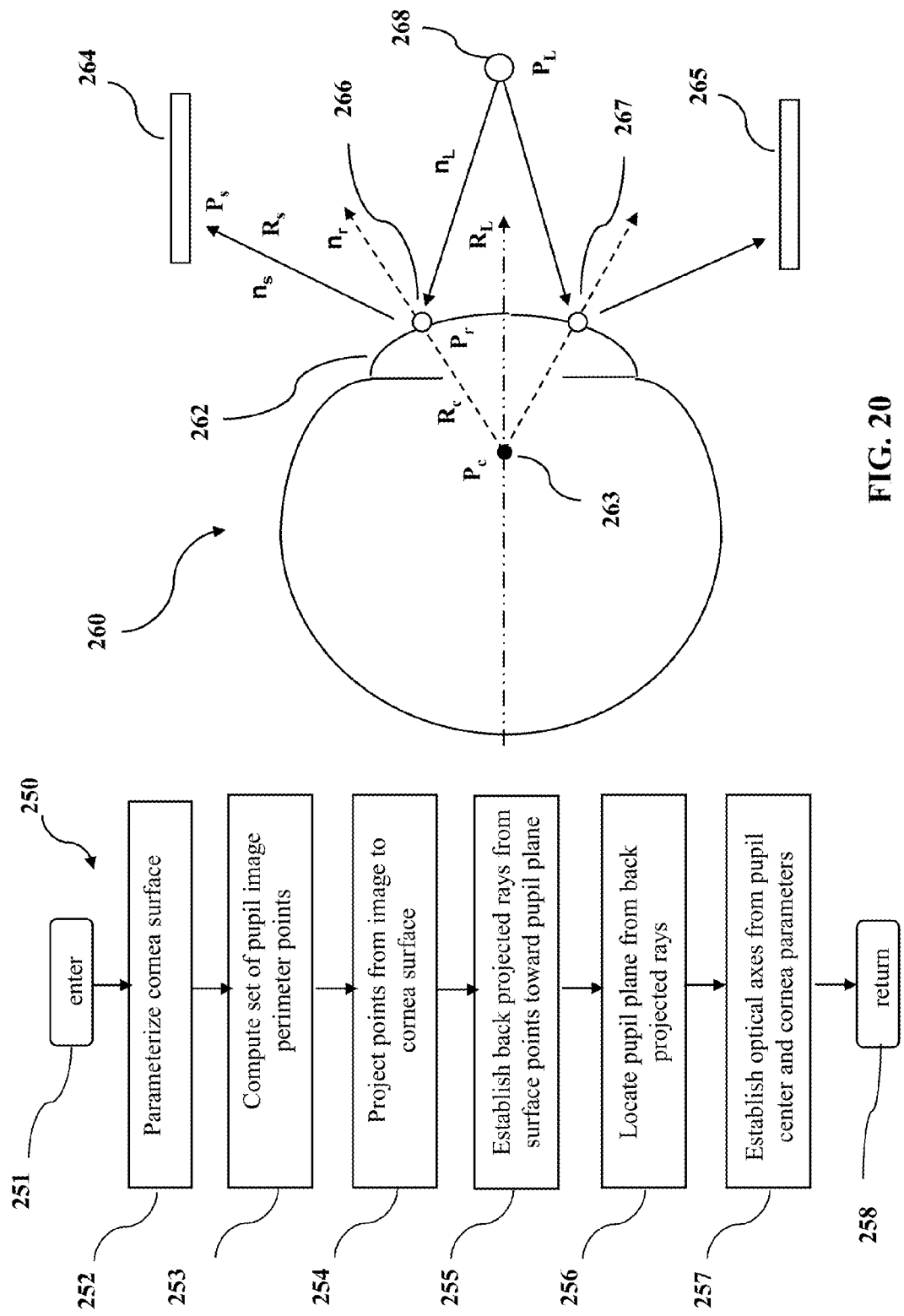
FIG. 19 is a flowchart of a routine for reconstructing the pupil from the pupil images.
FIG. 20 is a schematic showing features for a method of determining the anterior surface parameters of the cornea.

In a further embodiment, the matcher incorporates pupil reconstruction from the pupil images to provide a reference for the feature template mapping. Here, the reconstructed pupil is used to locate the reference frame common to stereo views as defined by the centroid and ellipsoidal axes of the pupil images. This is because the cornea refraction causes the pupil image to appear in the camera scene as a distorted ellipsoid. For this reason, the ellipsoidal moments computed from the image are only an approximation and give an inexact measure of the optical axis. A method of reconstructing the pupil from the perimeter points of the figure has proven more exact. In this process, the isolated image points are mathematically back traced to the pupil plane within the eye, where the traced points must form a circle on the plane by the nature of the iris within the eye. With this restriction, the pupil center and plane normal can be determined, thereby locating the optical axis of the eye and consequently the visual line of sight. FIG. 19 is a flowchart of a routine for the pupil reconstructor 250 where following parameterization of the cornea 252 and isolation of a suitable set of perimeter points for the pupil image 253, the points are first projected back to the cornea surface 254, and then the back refracted rays projected back from these points to the pupil plane within the eye 255, are used to center the plane 256, and consequently align the major optical axis 257. The pupil image perimeter points may be traced back through the corneal surface to the pupil plane given the location of the cornea surface within the camera spatial coordinates. This may be done for a spherical model of the cornea by locating the spherical center and surface radius of curvature. As described below, the cornea may be located from the glint points in the camera scene given the locations of the glint sources relative to the camera.

Considering FIG. 20, the pupil center may be found by first locating the cornea in the camera three-space with a set of glint reflections generated by known external light sources. FIG. 20 shows a schematic cross-section of the eye 260, with cornea anterior surface 262 and center 263, a light source 268 illuminating the eye, a sensor 264 recording the light source glint 266 from the cornea surface and the sensor 265 recording the source glint 267. For pupil tracking with a near-infrared point light source or an array of such sources directed at the eye, the light may be reflected back to the camera from the corneal surface as glint points depending upon the tracker design. These are mirror-like specular reflections from the anterior surface showing the image of the source used to illuminate the eye as opposed to diffused reflections from the inner structure such as the iris. For example, a design with a source collinear with the camera optical axis will reflect a glint point back from the cornea. Several such sources may be used to locate the cornea in the camera three-space from the locations of the glint points in the eye image with knowledge of the positions of the sources relative to the camera using Snell's Law of surface reflection. That is, the light ray from a source to the corresponding glint point must be coplanar with the ray from the glint to the camera image, and that both rays must form equal but opposite angles about the surface normal at the glint where the surface normal is defined by the radial from that point to the corneal center.

For example, considering source $P_L$ in FIG. 20, with ray $n_L$ to the glint point $P_r$ as seen by the sensor at $P_S$ via ray $n_s$, the vector dot products of the ray unit vectors with that for the reflection point must be equal, that is, $n_s*n_r = n_L*n_r$, where $n_r$ is the ray from the cornea center $P_c$ to the reflection point $P_r$, i.e., $n_r=(P_r-P_c)/R_c$, where $R_c$ is the cornea radius; here, $n_s=(P_s-P_r)/R_s$, and $n_L=(P_r-P_L)/R_L$, where $R_s$ and $R_L$ are the respective distances. Here vector quantities are denoted in italics. Similarly, the dot product of the reflection point ray unit vector with the vector cross-product of the unit vectors for the source and sensor rays must be zero, since the cross product defines a ray normal to that for the reflection point, i.e., $n_r*(n_s \times n_L)=0$. Here, the positions $P_L$ and $P_s$ are known for each glint point, while the position $P_c$ and radius $R_c$ for the cornea must be determined as well as those of position $P_r$ for each glint point; $R_s$ and $R_L$ follow once this position is known. With knowledge of the camera imaging system, determining the reflection point $P_r$ reduces to finding the length $R_L$ to that point from the imaging system since $P_r=P_L+n_L*R_L$, and the unit vector $n_L$ is known from the camera optics; further, the cornea radius $R_c$ may be determined in calibration. Thus, two sources are needed to determine the cornea spherical representation; with stereo imaging, one source properly positioned may be used to represent the cornea from these equations as a spherical surface as defined by the corneal center and the surface radius from the positions of the light sources in the camera space and those of the corresponding glint points in the camera image. A more accurate surface representation may be generated with more reflection points using regression analysis, perhaps linear least-square fitting, to provide a piece-wise surface element fit to the cornea.

Figure 21:
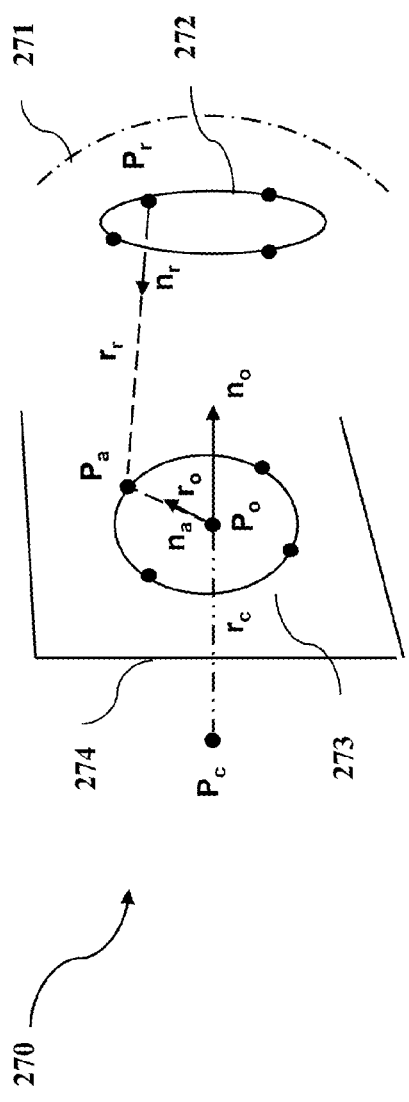
FIG. 21 is a schematic showing features for a method of reconstructing the pupil by ray-tracing from a pupil image.

Having located the cornea surface, the pupil image may now be reconstructed from the image perimeter points. FIG. 21 shows the elements of the pupil image reconstruction using back projected rays from the refraction points of the pupil image circumference at the cornea surface. Here FIG. 21 is a schematic showing the elements of the pupil reconstruction 270 from a pupil image 272 as imaged through the cornea anterior surface 271; the pupil image is projected back to the pupil 273 on the pupil plane 274 within the eye. The pupil plane normal $n_o$, formed by the straight line radial distance $r_c$ connecting the corneal center $P_c$ with the pupil center $P_o$, that is, $n_o=(P_o-P_c)/r_c$, must be such that the reconstructed pupil circumference points $P_a$ form a circle about the center. Here vector quantities are denoted in italics. These points are formed by back projecting a distance $r_r$ along directional unit vector $n_r$ from the refracted image points $P_r$, that is, $P_a=P_r+n_r*r_r$. While the refracted image circumference points and the back projection directional unit vectors may be computed from the cornea model and the pupil image, the back projection distance $r_r$ remains an unknown to be solved for along with the coordinates of the pupil center $P_o[x_o, y_o, z_o]$ and the pupil radius $r_o$. These may be solved for from the equations of construction and sphericity for a sufficient number of back-projected points.

Since each back-projected point must lie in the pupil plane by construction, the straight line from the point to the pupil center (along the unit vector, $n_a$) is orthogonal to the surface normal, and therefore the vector dot product of the resulting vectors is zero, that is, $(P_a-P_o)*n_o=0$. Furthermore, since the back-projected point must lie on the sphere centered at the pupil center and with radius equal to that of the pupil, the dot-product of the vector distance formed by point and center with itself equals the pupil radius squared, that is, $(P_a-P_o)*(P_a-P_o)=r_o^2$. A unique solution is possible with three points positioned about the circumference; however, a more accurate solution may be generated with more refraction points using regression analysis, perhaps linear least-square fitting, because of the inherent error in isolating the pupil circumference by the image processing. Since the equations are non-linear, an iterative steepest descent gradient solution may be used with the elliptical offset angles derived in image processing as an initial solution for the iterative process.

Two solution sets result from this process, one set for a plane in front of the cornea center and the other behind the center at a distance located by the feature sphere for the pupil center. The feature sphere is a mathematical construct centered on the corneal center and of radius equal to the center to pupil center distance; the pupil center must lie on the spherical surface by definition. The surface normal for the pupil plane is directed outward in contrast to the back-projected rays for the circumference points; that is, the dot product of the pupil surface normal and the back directed rays are negative: $n_o*n_r<0$, for all such rays. However, while this is a convenient test for a frontal view of the eye, it is less so for extreme viewing offsets because of increased error in isolating the pupil circumference by the image processing along with the limitations of round-off errors in computations.

Figure 22:
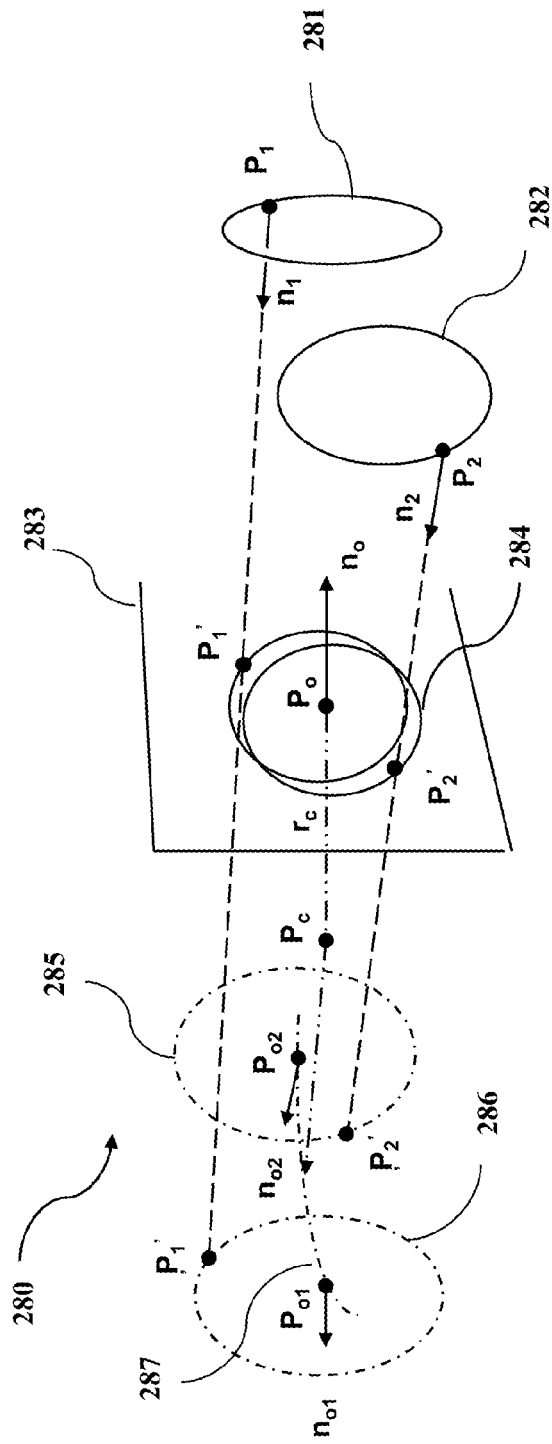
FIG. 22 is a schematic showing features for a method of reconstructing the pupil by ray-tracing from stereo pupil images.

In a further embodiment, the pupil parameters may be solved using multiple stereo images for increased accuracy as shown in FIG. 22. Here FIG. 22 is a schematic showing the elements of the pupil reconstruction 280 from stereo images with pupil image 281 in one image and pupil image 282 in the second, as imaged through the cornea anterior surface; the pupil images are projected back to the pupil plane 283 within the eye forming overlapping reconstructed pupils 284. In addition, also formed are separate ghost pupils 285 and 286 at the back of the eye as determined by the pupil feature sphere arc 287. In this embodiment, the pupil may be reconstructed for each image separately as shown in the figure where for pupil image #1, the refracted point $P_1$ is projected back along ray $n_1$ to point $P_1'$ on the corresponding reconstructed pupil. Similarly for pupil image #2, the refracted point $P_2$ is projected back along ray $n_2$ to point $P_2'$ on a separate reconstructed pupil. The pupils are practically overlapping and the separate centers being within a specified tolerance may be averaged for the best estimate $P_o$ with optical axis $n_o$, with the averaging being weighted by the relative offset as determined in the image processing. In comparison, another set of solutions are generated in this process since the back-projected rays can be extended further to result is a reconstructed "ghost" pupil located behind the cornea on the feature sphere arc at a distance $r_c$ from the corneal center, $P_c$, for each of the pupil images. For example, the ray $n_1$ may be extended to the point $P_1''$ and $n_2$ to the point $P_2''$; here, the reconstructed centers $P_{o1}$ with axis $n_{o1}$, and $P_{o2}$ with axis $n_{o2}$, are displaced from each other a sufficient distance that that the reconstructions are not considered to overlap and are therefore rejected as solutions.

In another such embodiment, the refracted circumference points from the multiple images are combined into a single data set for pupil reconstruction resulting in increased accuracy because of the increased number of points. Furthermore, the stereo images tend to be offset from each other about the line of sight and for this reason the directional cosines of the ray components in the pupil plane tend to cancel, while those along the plane normal reinforce, resulting in a more exact solution. For example referring to FIG. 22, the component of ray $n_2$ that is in the pupil plane would tend to cancel the equivalent component of $n_1$, while the two components normal to the plane reinforce. This is because the two rays are from opposing stereo images; here ray $n_2$ reaches point $P_2'$ in the pupil plane while $n_1$ reaches the point $P_1'$. While as before there are two solution sets, one being the reconstructed ghost set, the solution set with the smallest variance may be accepted where variance in one embodiment may be measured by the sum of the squared offsets from the reconstructed pupil for the back-projected data points. In a still further embodiment, where the cornea is modeled more realistically as an ellipsoid or even an elongated ellipsoid located by an apex, central axis, eccentricity, and central radii of curvatures in orthogonal planes, the above approach may be used to locate the pupil plane a distance from the cornea apex by employing a feature sphere centered on the apex. Still again, the pupil may be located by solving for the best fit of the separate stereo image reconstructed pupils as above with the apex depth to the pupil plane as a variable. In this embodiment, the location may be solved for by an iterative search algorithm, Gauss-Newton's iterative method for solution of non-linear equations, the more robust Levenberg-Marquardt algorithm method or a steepest gradient descent method with iterative step size for the depth with a minimum error difference in best-fit values. Once the pupil has been located, the perimeter points from the stereo images may be combined to reconstruct a single more accurate pupil as above at the resulting minimum-error depth. In this embodiment, the stereo images provide an advantage for both locating and orienting the pupil plane and then scaling the pupil size.

Considering the feature locator 37 (FIG. 2) of the visual axis calculation system 35, the locator comprises a processor and/or software that locates the image features by the mapped template to the inner structure of the eye within the geometry of the optical device 22. In a preferred embodiment, the locator calculates the three-dimensional coordinates of the pertinent features of the eye, and therefore the principal and orthogonal optical axes and consequent visual axis, using ray-tracing techniques. In this process, the locator computes the center and radius of the anterior spherical corneal surface from the specular reflection points, and the locations of various internal features of the eye including, for example, the pupil centroid, the iris cusp points, and the capillary system in the inner structure of the eye. This is done from the image locations of these features and the geometry of the cornea and the locations of the source and sensors in the optical device.

Figure 23:
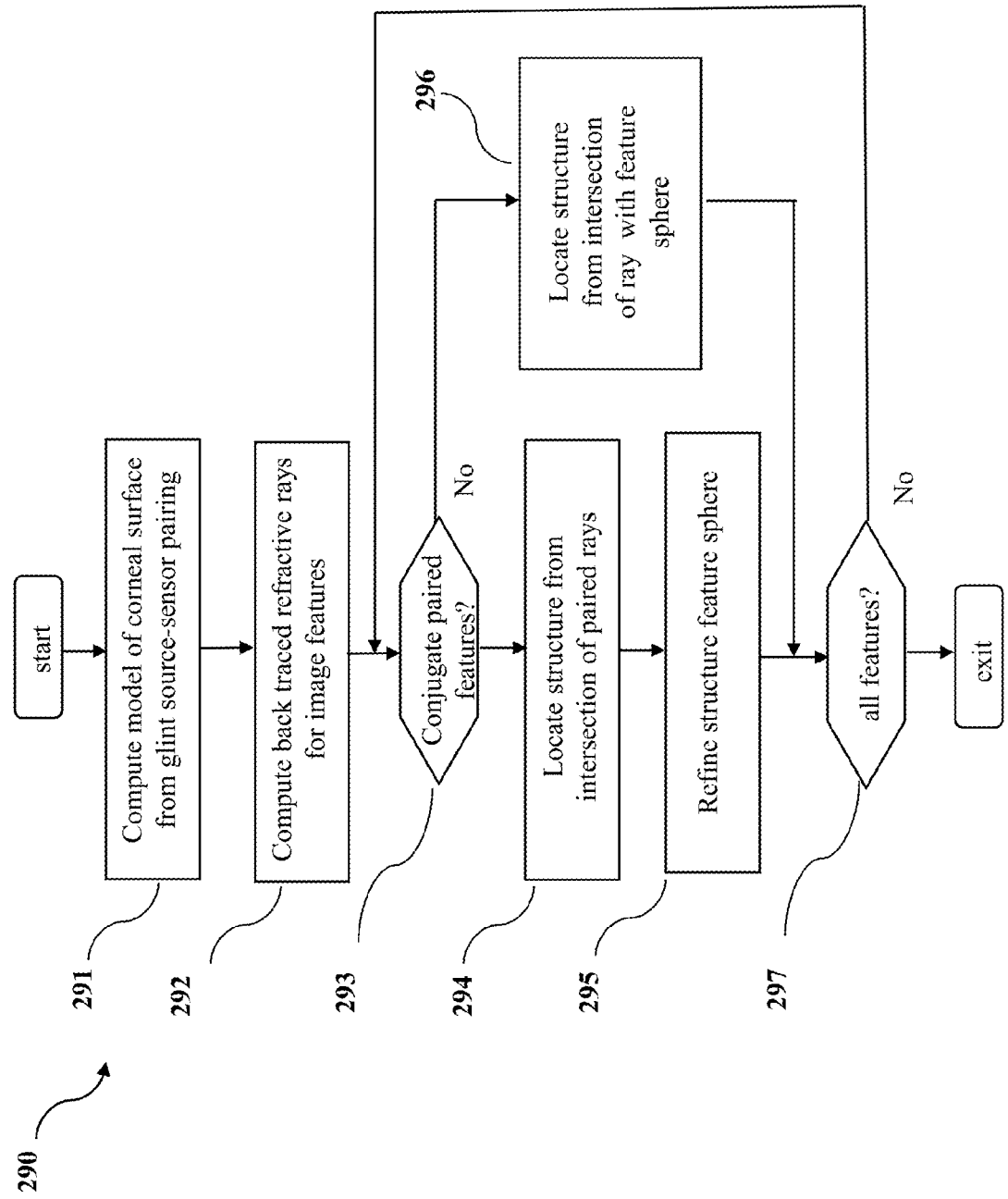
FIG. 23 is a flowchart of a routine for computing the locations of internal structures for the image features in the optical device coordinates.

FIG. 23 is a flowchart of a routine 290 for a preferred embodiment of the locator 37 for locating the further inner structure of the eye in the optical device 22 coordinates from the image features mapped by the matcher 36. The routine, having computed a solid body model of the corneal anterior surface 291 from the source-sensor glint pairing, including a body centroid; computes light ray traces back through the anterior corneal surface to the inner structure from the image features 292; and if the features are matched as stereo conjugate pairs 293, locates the inner structure from the intersection of matched rays 294, where intersection is the point of closest approach, and refines a representative feature sphere for the structure 295; or if not matched, locates the structure from the intersection of the ray with the feature sphere 296; for all mapped features 297. Here, the feature sphere is a mathematical spherical construct for the structure that is centered on the corneal body surface centroid and has the radius of the separation distance to the structure that is derived in one embodiment in a calibration process. The resulting output of internal structure features in optical device coordinates is in one embodiment written to a common memory area for reference by the gaze processor.

Figure 24:
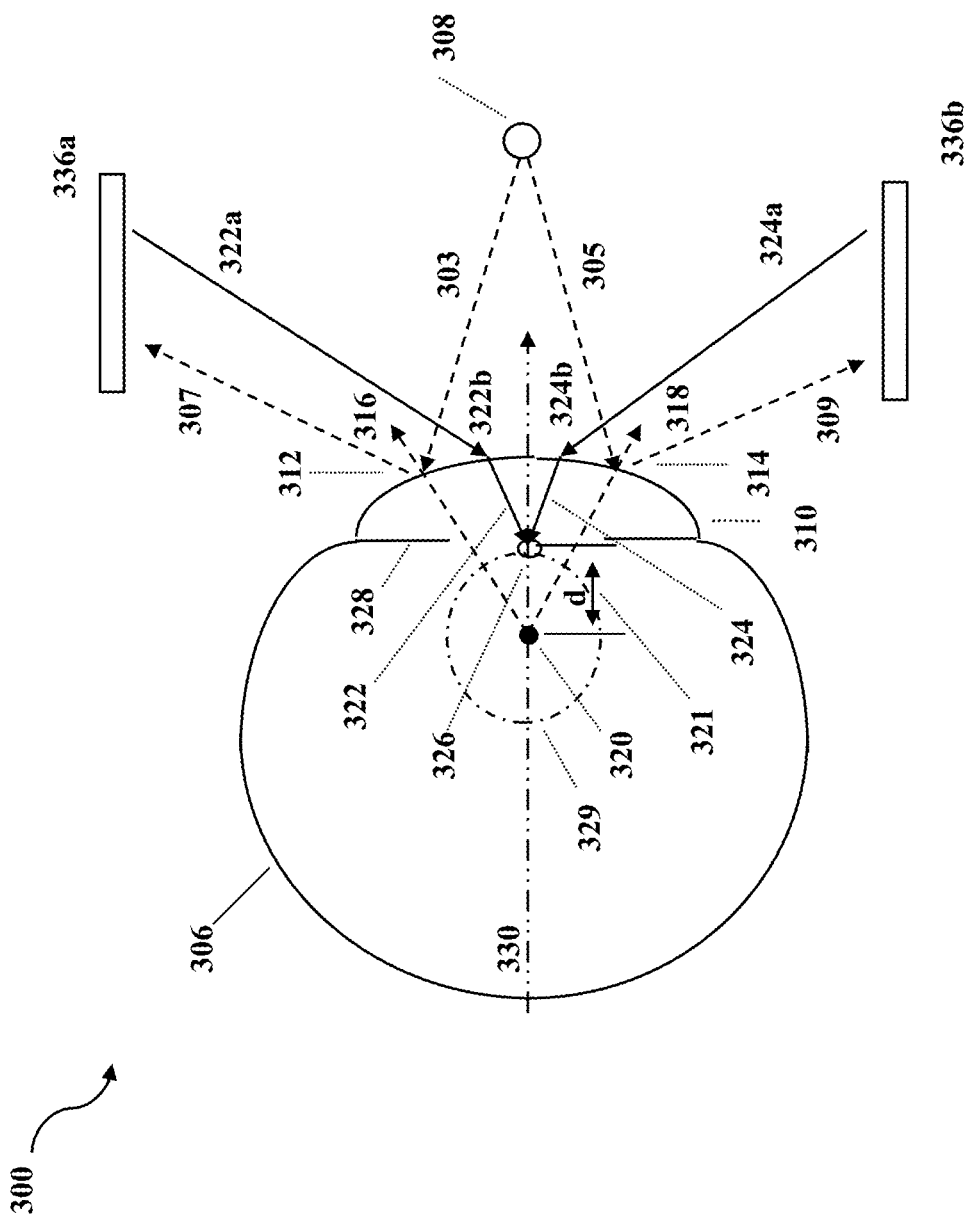
FIG. 24 is a schematic showing features for a method of locating internal eye features by ray tracing from the image.

FIG. 24 illustrates an example ray-tracing technique 300 performed by the locator 37. In particular, FIG. 24 shows a cross-sectional view of an eye 306 with the geometry of the ray-tracing technique. Here, emitted rays 303, 305 from a light source element 308 are reflected from the corneal surface 310 (as reflected rays 307, 309) to the sensors 336A and 336B from surface reflection points 312 and 314, respectively. The emitted (303, 305) and reflected (307, 309) rays are coplanar with surface normal 316 and 318 drawn from the corneal center 320. The locations of the reflection points 312, 314 on the corneal surface 310 are computed from the source and sensor pairing relations for the emitted (303, 305) and reflected (307, 309) rays. In this manner, the locator 37 computes a geometrical representation of the corneal anterior surface, here represented in the figure by a spherical section with a center and radius, from the set of reflection points (i.e., glint specular reflections) indexed by the light source and sensor pairing over a source activation cycle. Important to the successful application of this technique is the proper parametric representation of the corneal surface 310. The corneal surface 310 may be calculated as a spherical section with center 320 in the coordinate system of the optical device 22 (FIG. 2) holding the sources 334 and sensors 336 with the memory-mapped image locations of the surface reflection points, such as 312 and 314. In an alternative embodiment, an ellipsoidal fit is determined for the corneal surface 310 with orientation axes because the corneal surface is more basilar with a slightly ellipsoidal shape than spherical. In a further alternative embodiment using geometric modeling, a grid of triangular meshes of basilar segments is used to define the corneal surface.

The locator 37 then uses the computed model of the corneal surface 310 to trace the images of the eye features isolated by the image processor 34 (FIG. 2) back to the inner structure sources. For example, consider locating the pupil center by ray tracing. With further reference to FIG. 24, the locator 37 computes the traces 322a, 324a of the refracted rays for the pupil center 326 back from the sensors 336a, 336b to the locations of the apparent pupil images 322b, 324b on the corneal surface 310. From the locations of these apparent images 322b, 324b, the locator 37 then computes the traces 322, 324 of the transmitted rays back to the pupil center 326, which lies in a plane defined by the iris 328 and along the optical axis 330 at a distance d from the corneal center 320. These back-traced rays (identified by traces 322, 324) are the reverse of the light rays refracted by the surface of the corneal surface 310. The true rays originate from the inner structure of the eye and are transmitted to the surface points (e.g., points 322b, 324b) where they are refracted toward the sensors 336a, 336b. The distance d between the cornea center and feature location defines a feature sphere for the pupil 329; in one embodiment the distance may be determined by an initial calibration. The feature sphere 329 is a mathematical construction that is centered at the center of the cornea (here idealized itself as a sphere), and has the location of the inner structure feature on its surface. Thus, a ray traced back for a single sensor will intersect the surface of the feature sphere 329 at the location of the feature itself. The location of the ray intersection is calculated from the radius of the corneal model and that of the feature sphere. The pupil center 326 lies on the sphere 329 at the point at which the back-traced transmitted rays 322, 324 intersect the sphere. Since the pupil is positioned in front of the corneal center 320, a correct solution for the ray tracing occurs with a negative value for the vector dot product formed from the directional cosines of the back-traced transmitted rays 322, 324 and the outer-directed surface normal from the corneal center 320 to the sphere 329 at the ray intersection point.

This technique of opthalmometric ray tracing may further be applied to determine the positions of the capillary junctions of the retinal fundus and the cusps of the sphincteral pattern on the iris. In such a case, the locator 37 computes the locations of these structural features using the memory-mapped eye image locations from the image processor 34. The light rays from the features are transmitted through the eye and refracted by the cornea to reach the image plane of the sensor for processing by the accumulator 34a of the image processor 34. The locations of the refraction points are computed from the image coordinates of the feature, the locations and orientations of the corresponding sensors, and the geometry of the corneal surface. The directional cosines for the transmitted rays are computed from the corneal index of refraction and Snell's law relating the angle of incidence to the angle of refraction. In turn, the location of each feature is computed from the intersection of the back-traced transmitted ray with the corresponding feature sphere. The location of the feature is the point at which the back-traced refraction rays intersect the sphere. Since the iris 328 is positioned in front of the corneal center 320, a correct solution for the ray tracing of the cusp features occurs with a negative value for the vector dot product formed from the directional cosines of the back-traced ray and the outer-directed surface normal from the corneal center to the cusp feature sphere at the ray intersection point. Unlike the iris 328, the retinal fundus area lies behind the corneal center. Therefore, a correct solution for the locations of the capillary junctions occurs for a positive vector dot product. The computations for the features of the retinal network include transmission through the crystalline lens and the internal vitreous body. The indexes of refraction for the aqueous humor and vitreous body are the same at 1.33; the index for the crystalline lens at 1.42 is nearly the same as that for the cornea at 1.38. The fundus capillaries are on the retina behind the crystalline lens within the eye, and the corresponding images acquired by the sensors depend upon the visual accommodation distance. However, the distribution of the fundus capillary junctions about the visual axis remains invariant of lens accommodation and this relation is used in the computations.

Referring back to FIG. 23, the locator 37 computes the rays 322 and 324 for the pupil centroid 326 from the apparent images at 322b and 324b, respectively. However, these rays 322, 324 may be identified by the feature matcher 36 as corresponding to the pupil centroid 326, and the physical location of the feature is computed from the intersection of the rays 322 and 324. Equivalently, the locator 37 may compute the back-traced rays for the inner features of the iris cusp and retinal capillary junctions as matched across images to determine the inner structure physical location of the feature from the intersection of the matched rays. In this way, the locator 37 processes image data across matched images in the three dimensional stereo realm. Notably, in extreme viewing cases in which the user is looking so far to the side of the optical device that the pupil image is acquired by only one sensor, this ray-tracing technique (i.e., back-tracing across matched images) is not possible. In such cases, the ray-tracing technique described in relation to FIG. 21 can be used to compute the location of the feature from the intersection of the back-traced ray with the corneal-centered feature sphere determined from calibration.

Figure 25:
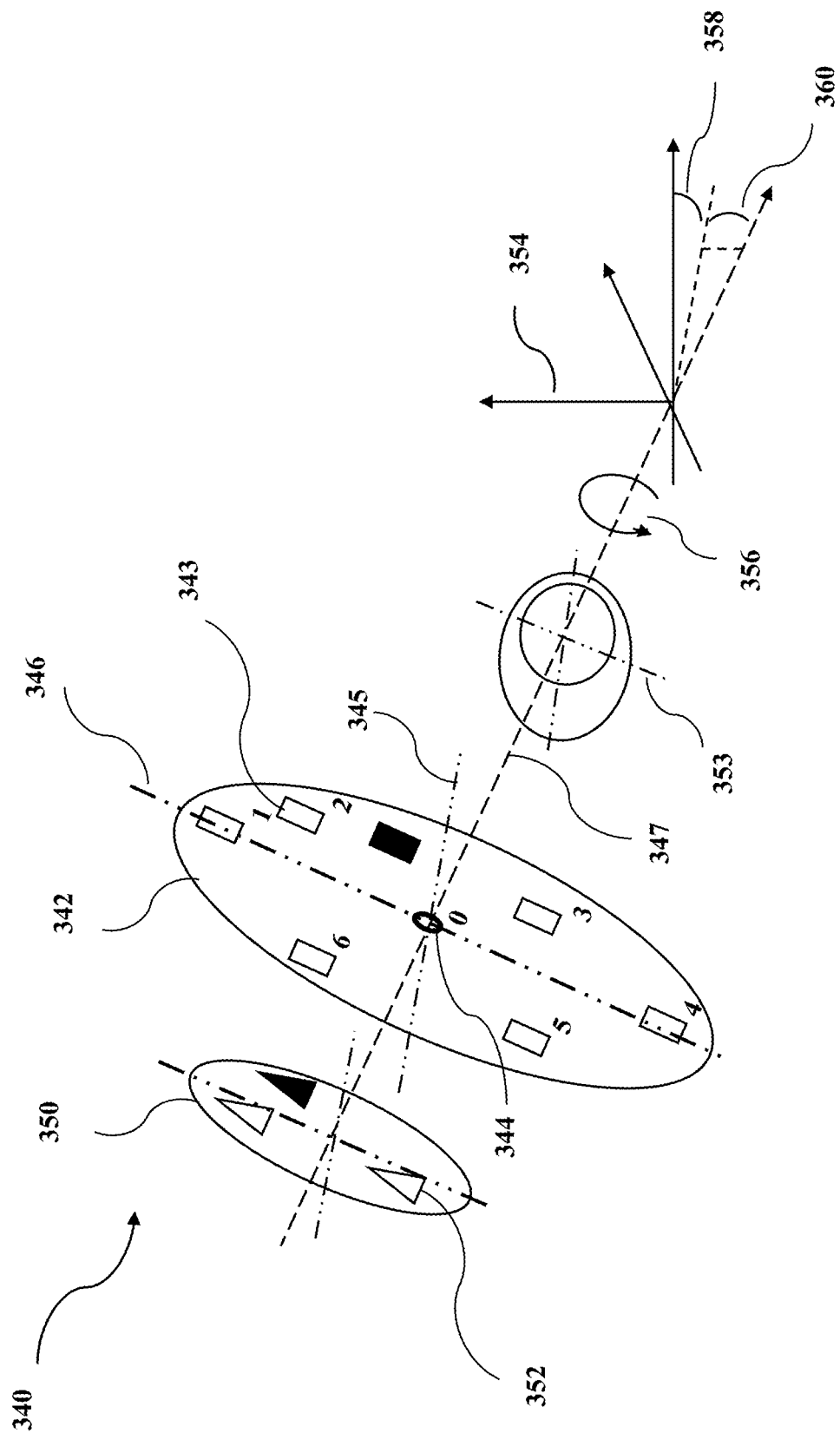
FIG. 25 is a schematic showing the relationship between the template elements and the sight direction in the camera spatial coordinate system.

FIG. 25 is a schematic showing the relationship 340 between the template elements and the sight-line direction in the camera coordinate system. This follows using the method of template location of eye features in the pupil plane 342 such as the pupil center 344 and iris cusps points 343, features in the retinal plane 350 such as capillary network junctions 352, and the corneal surface principal axes 353. These features in turn map to the optical coordinate system with optical center located by the pupil center 344 in the pupil plane 342, principal optical axis 347, and orthogonal axes 345 and 346, as determined in an initial calibration process. As a result of template locating, the corneal optical center, the surface center, and the median and normal axes are computed from the smoothed surface as above, the pupil orientation is computed from the image moments, and the pupil optical center and the optical locations of the capillary network and the sphincteral pattern are computed using the ophthalmometric ray tracing method as above. While the central 30-degrees of the corneal anterior surface is spherical in shape, the basilar surface is slightly astigmatic with two principal meridians perpendicular to each other. The corneal horizontal radius of curvature (normally 7.98 mm) is roughly equal to that of the optical center; however, the vertical radius is less (7.60 mm). The routine produces an accurate description of the optical axes and center in the camera coordinate system. The visual axis extends from the first Gaussian nodal point of the eye (normally near the center of curvature of the corneal anterior surface) and is commonly perpendicular to the cornea; it is generally directed 5 degrees inwards to the optical axis and 2 to 3 degrees upward. The visual axis is defined by an origin point in the optical axes coordinate system and three directional cosines determined in an initial calibration process. These parameters defining the visual axis are transformed into coordinates for the camera coordinate system 354 from the relations for the optical axes as elevation 360, azimuth 358, and roll 356. The torsional roll of the eye about the principal optical axis is computed in an orthogonal set of coordinate axes that are perpendicular to the optical axis to complete the specification of the optical orientation. Torsional roll and accompanying vertical vergence eye movement can occur during tilting of the head such as doing target tracking while moving.

Various other embodiments are possible. In one such embodiment, the locator matches source specular reflections or glints by source elements across views, reconstructs the glint locations on the corneal surface by stereo triangulation, and uses the locations to parameterize the corneal surface: the surface may be parameterized as a sphere with center and radius from the locations of three non-planar glint points. However, these are at best approximate bounds to the physical locations since stereo reconstruction is based on the acquisition of multiple images of the same surface points from different perspectives and the pupil image center and the glint points would occur on different corneal surface points for different camera views; therefore, a stereo reconstructed glint point would be projected as being well within the eye rather than on the cornea surface.

In another such embodiment, the structure locations within the eye of matched features may be determined by stereo triangulation; however, the stereo reconstructions are approximate bounds to the actual locations because light ray distortion by the corneal surface distorts the image, and for this reason the features computed by image feature triangulation are distorted and closer to the corneal surface than in actuality. A further embodiment is to correct the image location of the features by the refraction and then perform stereo reconstruction. However, this is effectively the preferred embodiment elaborated above. In a further embodiment, the stereo reconstructed glint locations and that of the apparent pupil image at the corneal surface may be used in this process; however, as noted the pupil image is refracted by the cornea from the actual location and these approximations are at best useful as bounds on the final computations from the inner eye structure.

Considering the process for computing line-of sight, a further embodiment employs a hierarchical approach to bound the template estimate described above with approximations gathered from the image data such as for example, the pupil image offset from the camera and the distribution of glint points in the image about the pupil image center. Although these approximations are not as accurate as the template method, and we note that the glint point method is less accurate than that of the pupil offset, they are more robust and this expanded process bounds computational deviations that may result from corrupted images caused by randomly occurring factors such as extraneous light sources that may lead to mismatching of the template features.

Figure 26:
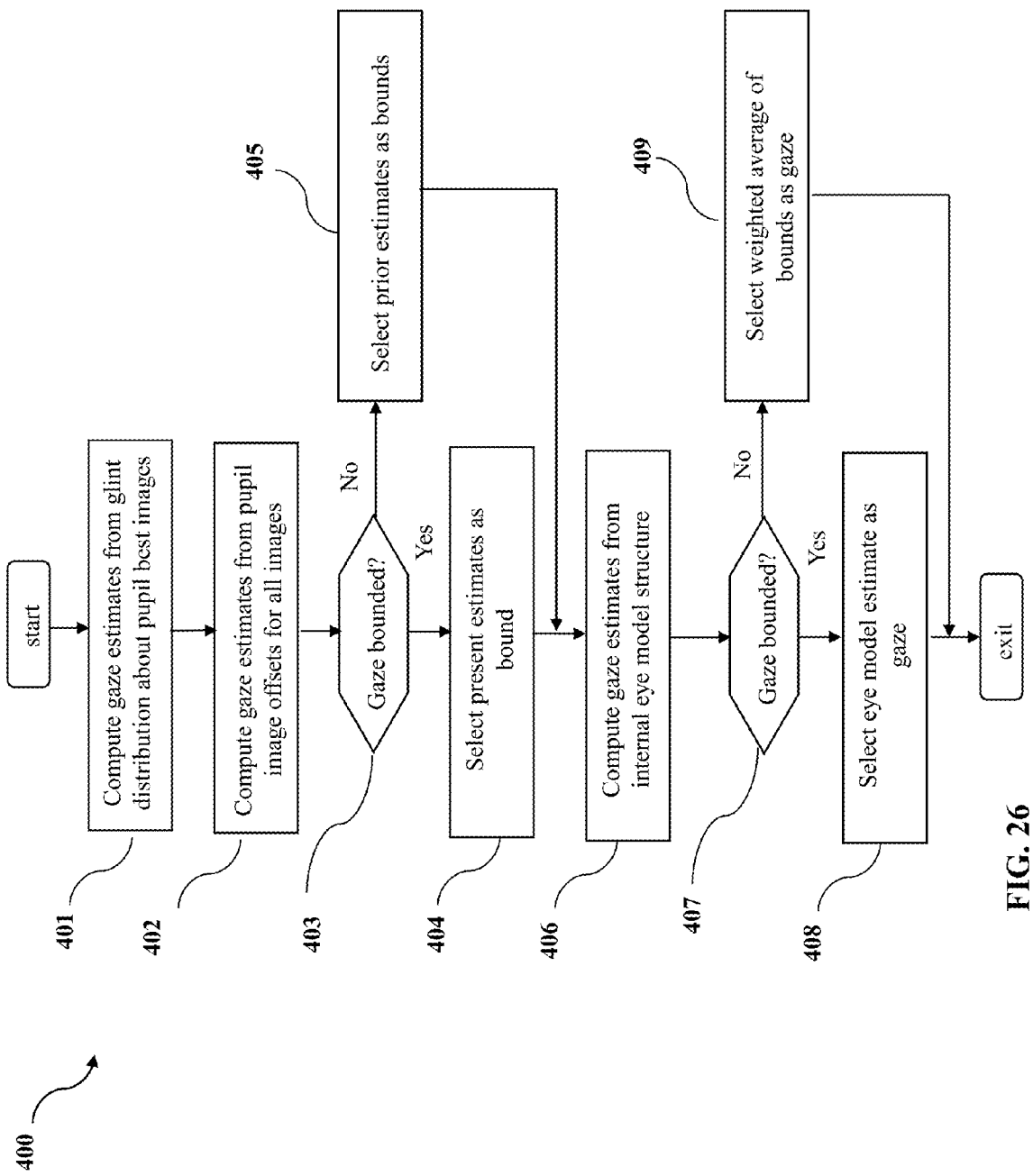
FIG. 26 is a flowchart of a routine for estimating the sight direction from the internal eye structure using the image gaze offsets as bounds.

Referring to FIG. 26, the expanded process operating with the routine 400 computes 402 line-of sight estimates by triangulation from the distribution of glints about the pupil image center for the images; computes 401 estimates of the sight direction for all images from the pupil image offsets; checks 403 that the pupil offset estimates are bounded by the glint gaze estimates and if so, selects 405 the pupil offset estimates as bounds, otherwise 404 uses the glint sight estimates; computes 406 the sight estimates from the internal eye structure the locations of which are determined by template matching; checks 407 that the template estimates are bounded, and if not selects 409 the weighted average of the bounds as the sight direction, otherwise 408 uses the template estimate as such.

Figure 27:
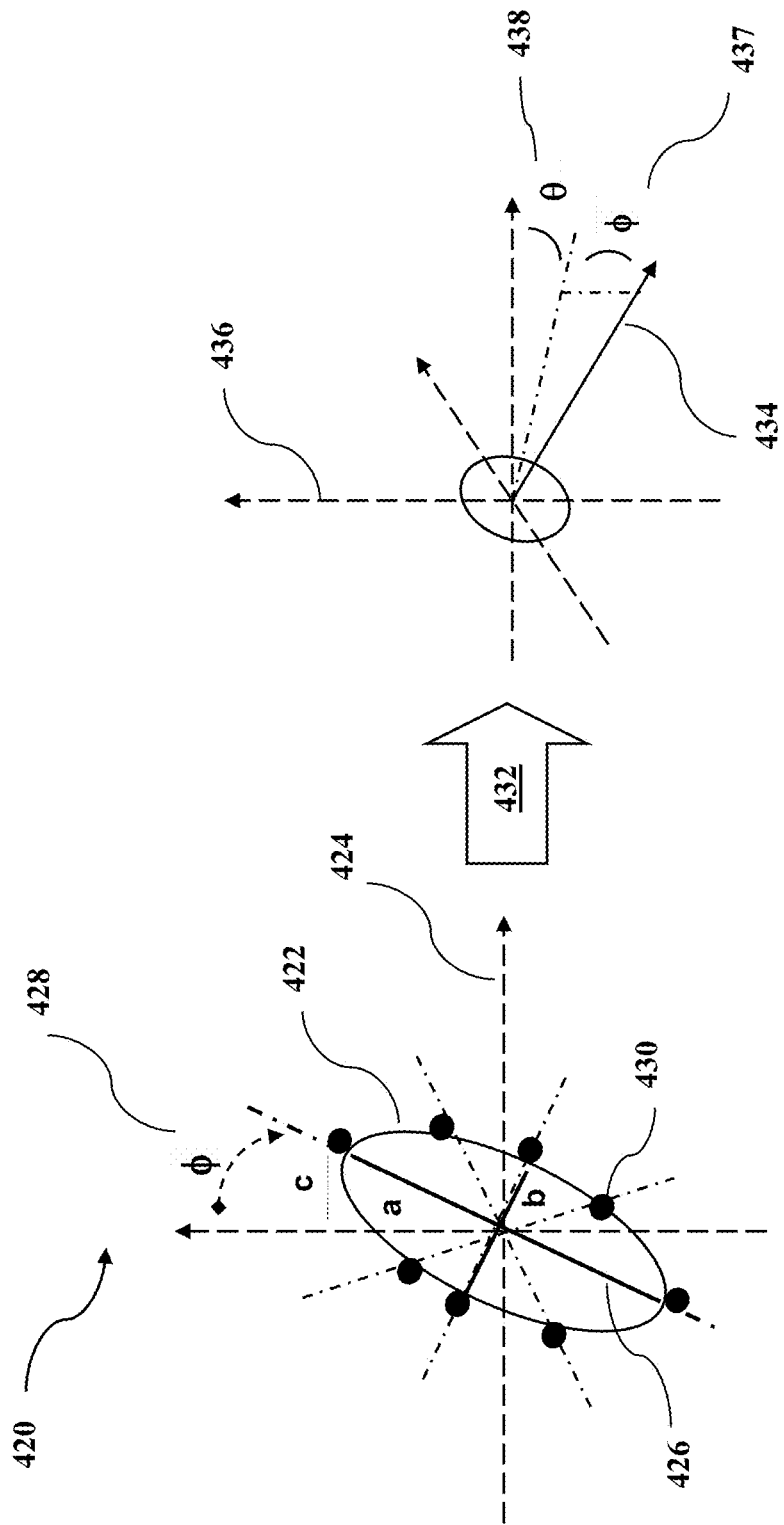
FIG. 27 is a diagram showing the relationship between the pupil image offset and the sight direction in the camera spatial coordinates.

For example, referring to FIG. 27, the line-of sight direction may be estimated from the pupil image 420 parameters derived from the image ellipsoidal moments for a linear perspective view as determined from an ellipsoidal fit to the outer circumference of the pupil image, including the ellipsoidal area 422, major and minor axes 426, the image tilt 428 in the image planar coordinates 424, as well as equivalently ellipsoidal circumference points 430 (5 points needed for an exact solution to a parabolic body); the parametric description is transformed 432 into a gaze direction estimate as the surface normal 434 for an equivalent circular body, where direction is specified by the elevation 437 and azimuth 438 angles in the camera coordinate system 436. Again, because the pupil image is non-uniformly distorted by the corneal surface refraction with a bias toward the offset, the estimate is an outer bound to the sight direction.

Considering this method of pupil image offset, referring again to FIG. 27, the line-of sight may be estimated from the major and minor axes (a, b), and the image tilt $\phi$ in the image planar coordinates; the parametric description is transformed into a gaze direction in the camera space as the surface normal for an equivalent circular body, where direction is specified by the elevation $\phi$ and azimuth $\theta$ angles in the camera spatial coordinate system, where $\phi=a \sin(2*c/a)$, and $\theta=a \cos(b/a)$. The ellipsoidal fit is an approximation because the pupil image is non-uniformly distorted by the corneal surface refraction with a bias toward the offset; the estimate is an outer bound to the sight-line direction. In particular, the centroid of the ellipsoidal representation is biased away from the distorted pupil center image, that is, the centroid is displaced from the pupil center point in the distorted image.

This is a variation of the simple perspective view approach used in the present technology where the viewing direction may be determined from a camera image of the eye, either the image of the pupil for say, near infrared light illumination or of the iris as outlined by the limbus junction for visible light. This is done from the three dimensional coordinates and orientation of the image in the camera image coordinates following isolation of the figure in the image. Referring back to the image processing, the pupil image (or that of the limbus), may be approximated as an ellipsoid resulting from a weak-perspective orthographic projection of a circle in three dimensional space followed by scaling. An ellipse in an image may be described using five parameters: the image x- and y-coordinates of the elliptical center $(x_c, y_c)$, the major and minor radii $(r_x, r_m)$, and the rotational angle of the ellipse ($\phi$), in the image plane, say, by the rotation of the major radius from the image plane vertical; an equivalent set consists of the image coordinates of five properly spaced circumference points. The elliptical figure may be located in the image iteratively by searching for the set of elliptical parameters that maximize the response to an integro-differential operator applied to the image following Gaussian smoothing along the radii directions. Given an initial estimate of the parameters and the arc search length, this may be done by the Simplex method or gradient based optimization methods.

Under this weak-perspective projection, the relative size and orientation of the circular figure may be determined in the three-dimensional space of the camera from the image parameters since the major radius of the ellipse in the image corresponds to the diameter of the originating circle, and the three-dimensional angular orientation ($\phi$, $\beta$), is given by the angular rotation of the figure in the image ($\phi$) as given above, and $\beta$ is tilt of the plane in which the figure lies relative to the image plane, where this angle can be determined from the major and minor radii of the ellipse, $\beta=\arccos(r_m/r_x)$. For a limbus figure of known radius the originating circle may be located in the camera space from the camera focal length, since the center of the figure has been located in the image and the depth distance along the camera optical axis to the limbus is related by the perspective proportion, $d=r_L*f_c/r_x$, in terms of the major radius; here, the limbus radius $r_L=5.5$ mm for the standard cornea and $f_c$ is the focal length of the camera. However, the limbus defined by the iris contained behind the cornea is subject to similar distortions caused by refraction as is the pupil. Furthermore, the pupil diameter is a variable function of ambient lighting (varying from about 3 mm for bright to 8 mm for dim luminance), and while the elliptical center is located in the image space the pupil location cannot be extended to the camera space as above without knowledge of the diameter.

The difficulty with this approach is that the corneal surface distorts the image of the pupil of the eye in accordance with Snell's law of surface refraction for a surface interface between materials of unequal indexes of refraction (n), since air has an index of unity (n=1), and that of the anterior corneal surface of n=1.377. This is because after refraction, the pupil image shape is changed as the light rays returned from the pupil contour are deviated from the perspective. For this reason, the pupil image is magnified, blurred, and appears nearer the corneal apex than the real pupil. Furthermore, because of the unequal refraction caused by the nearly spherical surface, the shape is enlarged and distorted toward the camera offset, and the refracted ray of the pupil center does not coincide with the center of the refracted pupil shape but is also shifted toward the camera offset. The perspective projections employed in the above methods are at best approximations because of the corneal surface refraction.

Considering the shape of the cornea, the anterior surface is closely spherical at the apex and exhibits a peripheral flattening toward the limbus, the boundary between the cornea and the selera. The adult anterior cornea surface may best be approximated as an ellipsoid in shape with the outer limit formed by the limbus, and is best modeled in three dimensional Cartesian coordinates using the expression [Baker, 1943]: $p*z^2-2*R*z+r^2=0$, where the z-axis is into the eye at the corneal apex and the x- and y-axes are in the plane of the limbus, $p=1-e^2$ where e is the eccentricity, and R is the radius of curvature at the ellipsoidal apex. When p is less than 1, the ellipse is prolate and fattens from the center to the periphery. For the standard eye, the eccentricity e is 0.5 (p=0.75), and the radius R is about 7.8 mm. Here, $r=sqrt(x^2+y^2)$, is the radius of the cornea arc about the surface in a plane parallel to the limbus; the limbus is closely circular with a radius of approximately $r_L=5.5$ mm, and a distance 2.18 mm behind the cornea apex. The iris lies slightly behind the limbus. In a further refinement, the cornea surface may be represented as an elongated ellipsoid [Kasprzak, 2005]: $z(x,y)=(R_{ox}/(1-e_x^2))*[1-(1-((1-e_x^2)/R_{ox})*(x^2/R_{ox}+y^2/R_{oy}))^{1/2}]$, where $R_{ox}$ is the central radius of curvature in the x-y plane, $R_{oy}$ that in the y-z plane, and $e_x$ is the eccentricity in the x-y plane; here, the coordinate system is located at the apex of the cornea with z-axis as the major axis of the ellipsoid in coincides with the major axis of the cornea.

While this is true, the standard cornea surface may be simplified as a central zone at the apex that fitting a spherical shape is followed by a grouping of consecutive annular rings of increasing asphericity. The central zone with an outer diameter of about 3 mm, subtends 22-degrees as measured relative to the apex radius of curvature. This is followed by a paracentral zone or ring that with a progressive flattening prolate surface subtends about 29-degrees with an inner diameter of 3 to 4 mm and an outer diameter of 7 to 8 mm. Next is the peripheral ring that with a still greater flattening of the surface subtends 70-degrees and has an outer diameter of 11 mm. The cornea surface steepens at the limbus junction before joining the sclera. A further simplification is the LeGrand's Simplified Eye having an assumed spherical anterior surface with an 7.8-mm radius of curvature. With this understanding, the analysis following is based on the assumption of a spherical shape for convenience of demonstration.

The distortion of the pupil image and particular of the image of the pupil center as a function of the camera offset from the eye will now be demonstrated by analysis for a standard cornea represented as a spherical surface with 7.8-mm radius. We show the effects of the distortion on the width of the pupil image, the center point of the image, and the image point of the pupil center; and derive correction factors for the true offsets of the pupil from the camera. To this purpose, FIG. 28 shows a schematic section 500 of the eye cornea 501 as a spherical surface with corneal center 502 and radius, an iris 507 defining the pupil, the pupil center 504 located within the eye below the anterior surface, an optical axis 517 for the eye located by the corneal spherical center 502 and pupil center 504, the points on the cornea surface corresponding to the pupil image center 509 and pupil edges 510 and 511, and the width of the pupil image 512 center to edge, all which may be related by consideration of the refractive angles for a camera with an optical axis 518 offset from that of the eye.

Figure 28:
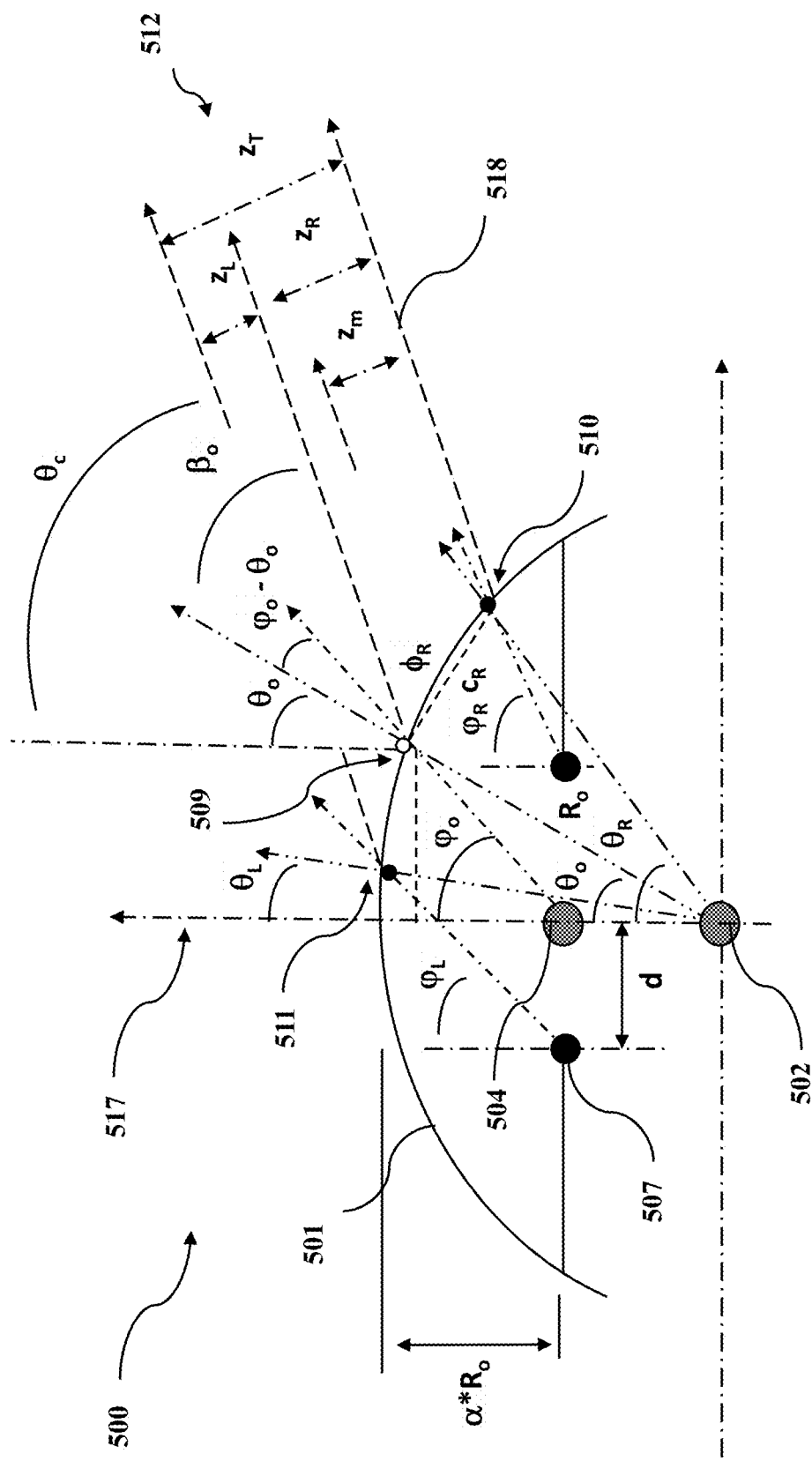
FIG. 28 is a schematic showing the eye elements used to compute pupil image distortion caused by corneal surface refraction.

Considering FIG. 28 now in detail, for the corneal angle $\theta_o$ of the pupil-center image offset from the optical axis of the eye, it is readily shown that the pupil-center angle $\phi_o$ of the pupil-center image from the optical axis is: $\phi_o=a\,tan(sin(\theta_o)/(a-1+cos(\theta_o)))$; the refracted ray angle $\beta_o$ for [from] the pupil-center image from the cornea angle radial line to the camera is: $\beta_o=a\,sin(n*sin(\phi_o-\theta_o))$, where the offset of the camera optical axis from that of the eye is: $\theta_c=\theta_o+\beta_o$. Given the pupil-edge image of [as] the right side of the iris located at a corneal angle $\theta_R$ seen by the camera, it is readily shown that the apparent width of the pupil side $z_R$ seen in the image from the pupil-center image to the right-side image, is: $z_R=c_R*sin(\phi_R)$, where $c_R=2*R_o*sin((\theta_R-\theta_o)/2)$, $\phi_R=\pi/2-\theta_c+(\theta_R+\theta_o)/2$, and $\theta_R$ and $\phi_R$ satisfy the non-linear relations: $\theta_R=\theta_c-a\,sin(n*sin(\phi_R-\theta_R))$, and $\phi_R=a\,tan((-d/R_o+sin(\theta_R))/(a-1+cos(\theta_R)))$. Similarly, given the pupil-edge image of [as] the left side of the iris located at a corneal angle $\theta_L$ seen by the camera, it is readily shown that the apparent width of the pupil side $z_L$, seen in the image from the pupil-center image to the left-side image, is: $z_L=c_L*sin(\phi_L)$, where $c_L=2*R_o*sin((\theta_o-\theta_L)/2)$, $\phi_L=\pi/2-\theta_c+(\theta_L+\theta_o)/2$, and $\theta_L$ and $\phi_L$ satisfy the non-linear relations: $\theta_L=\theta_c-a\,sin(n*sin(\phi_L-\theta_L))$, and $\phi_L=a\,tan((+d/R_o+sin(\theta_L))/(a-1+cos(\theta_L)))$. Note that the apparent pupil width seen in the image is the sum of the left and right side widths, $z_T=z_L+z_R$; the apparent pupil center occurs at the half-width point $z_m=z_T/2$, and the corresponding corneal angle $\theta_m$ may be determined from the set of equations: $z_m=c_m*sin(\phi_m)$, where $c_m=2*R_o*sin((\theta_o-\theta_m)/2)$, $\phi_m=\pi/2-\theta_c+(\theta_m+\theta_o)/2$. The displacement of the apparent pupil center from the true pupil-center point in the image is: $\delta z_m=z_R-z_m=(z_R-z_L)/2$.

Figure 29:
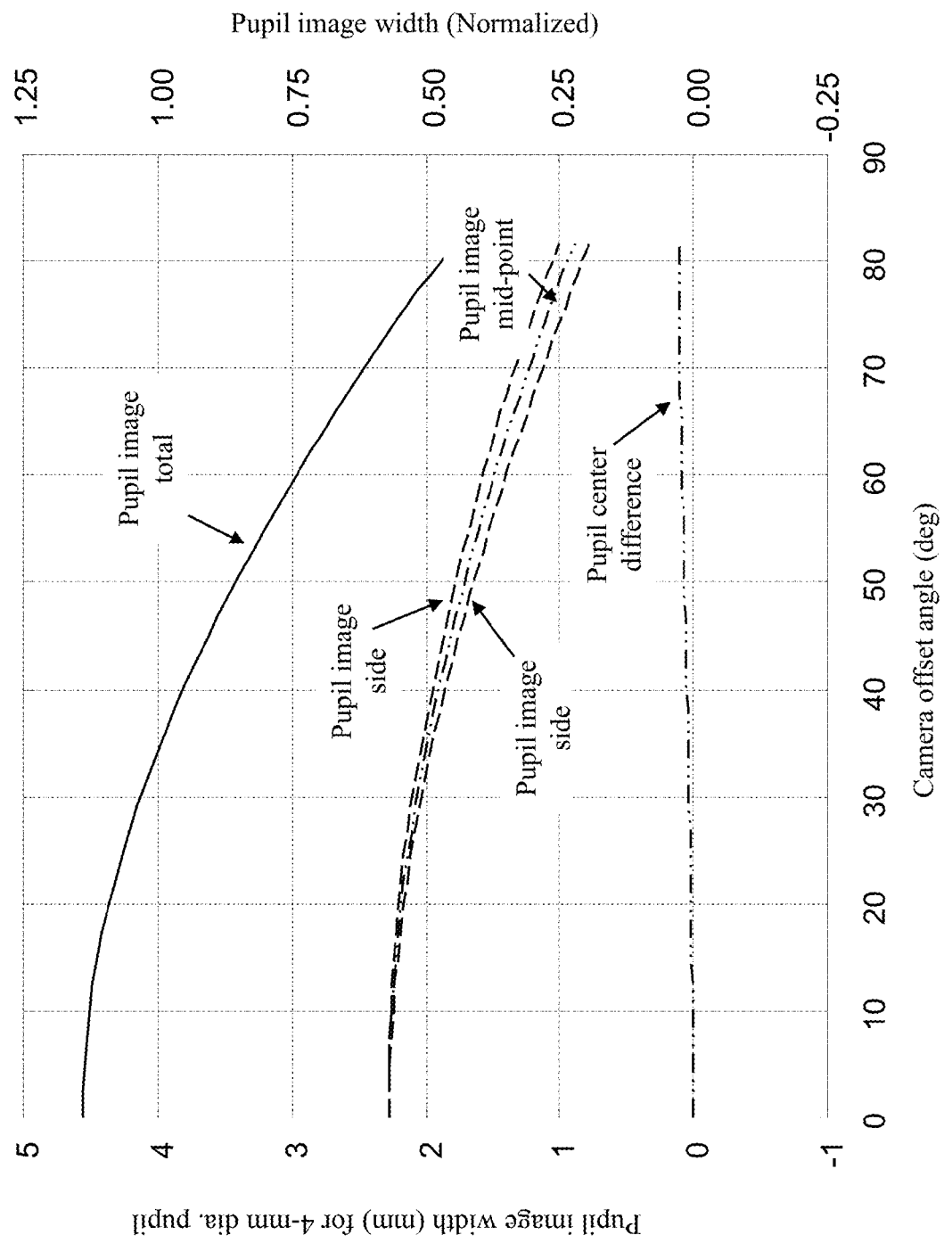
FIG. 29 is a graph showing the distortion in the pupil image width as a function of camera offset angle.

FIG. 29 shows plots of the width of the pupil image as a function of offset angle between the camera and eye, along with the pupil image mid-point, the distance of the end-points of the pupil image from the image point of the pupil center, and the difference between the two center points. Here, the plot shows curves for ratios of: $z_T/z_{To}$, $z_L/z_R$, and $\delta z_m/z_T$, and the difference between the image mid-point and the pupil-center image point. The plot is for a pupil of 4-mm diameter; however, normalized plots in which the image width is divided by the true pupil diameter, give the same curves for pupil diameters from 3- to 7-mm as indicated by the ordinate added to the right side of the figure. The plot shows that the pupil image is enlarged in the frontal view and decreases with increasing offset but less steeply than for a perspective view; the pupil image mid-point and pupil center image point are slightly displaced. For a perspective view, the pupil image would be the actual size for a front view and decrease with the cosine of the offset angle; the pupil image mid-point and pupil center image point would coincide for all offset angles. We note that the difference in corneal angle between the point on the corneal surface corresponding to the image point for the pupil center, and the mid-point of the pupil image is: $\delta\theta_m=1.69*\theta_m-0.11$ (in degrees) for a 4-mm pupil, where $\delta\theta_m=\theta_m-\theta_o$, and $\theta_m$ is the azimuth to the mid-point. Thus, determining the eye azimuth for the image mid-point enables the determination of the pupil center.

Figure 30:
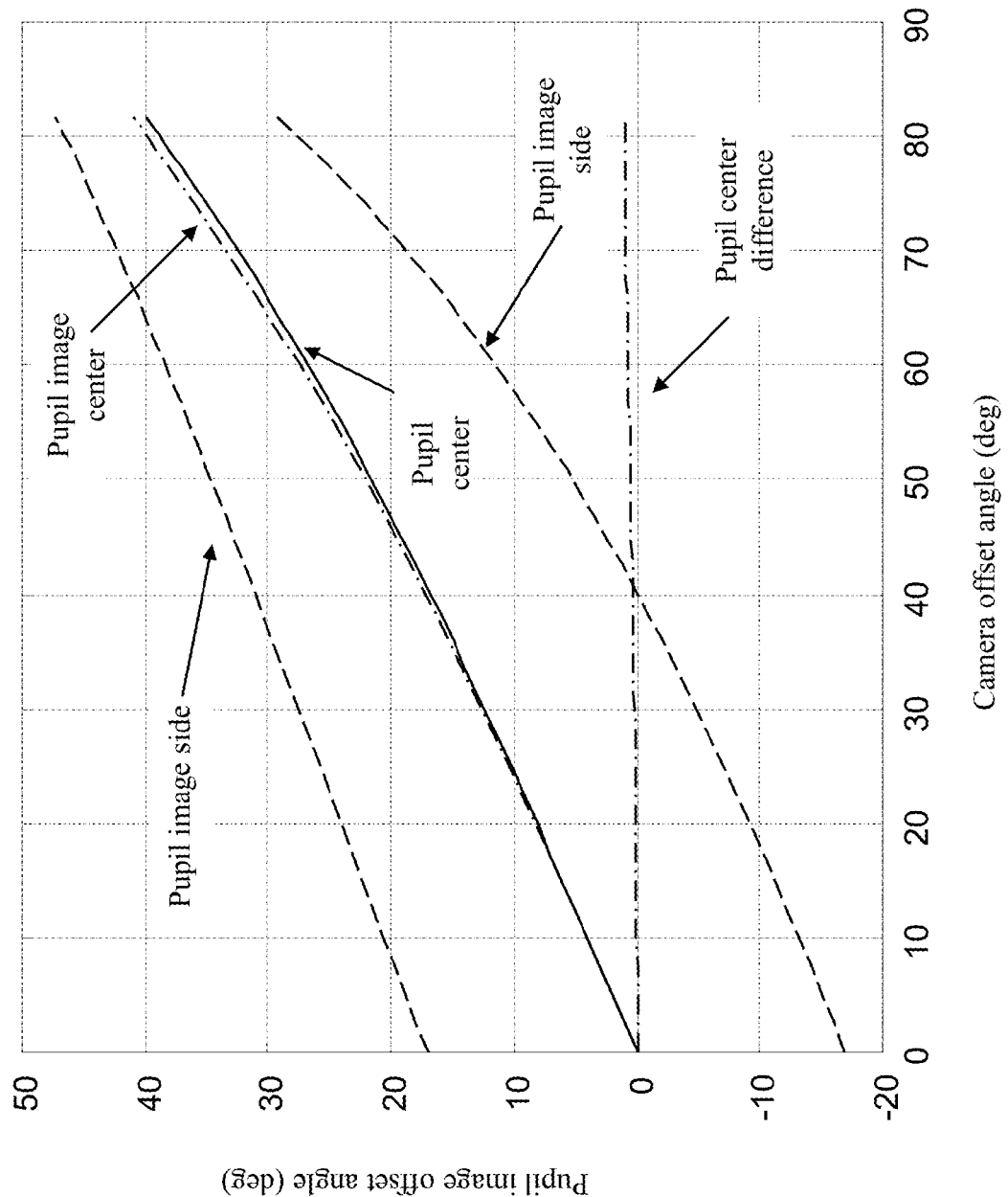
FIG. 30 is a graph showing the distortion in the pupil image center as a function of camera offset angle.

FIG. 30 shows equivalent plots of the apparent offset angles for a perspective view of the pupil image center, the pupil image edges, and the pupil center image point along with the differences between the center points as a function of the actual offset angle between the optical axes of the camera and eye. The plots show less actual offset for the image features than would occur with a perspective view. Thus, we can conclude that the image distortion affects the pupil tracking through the distortion in the offset angle used to locate the pupil plane surface normal and the distortion in the pupil center used to locate the pupil in the plane.

Figure 31:
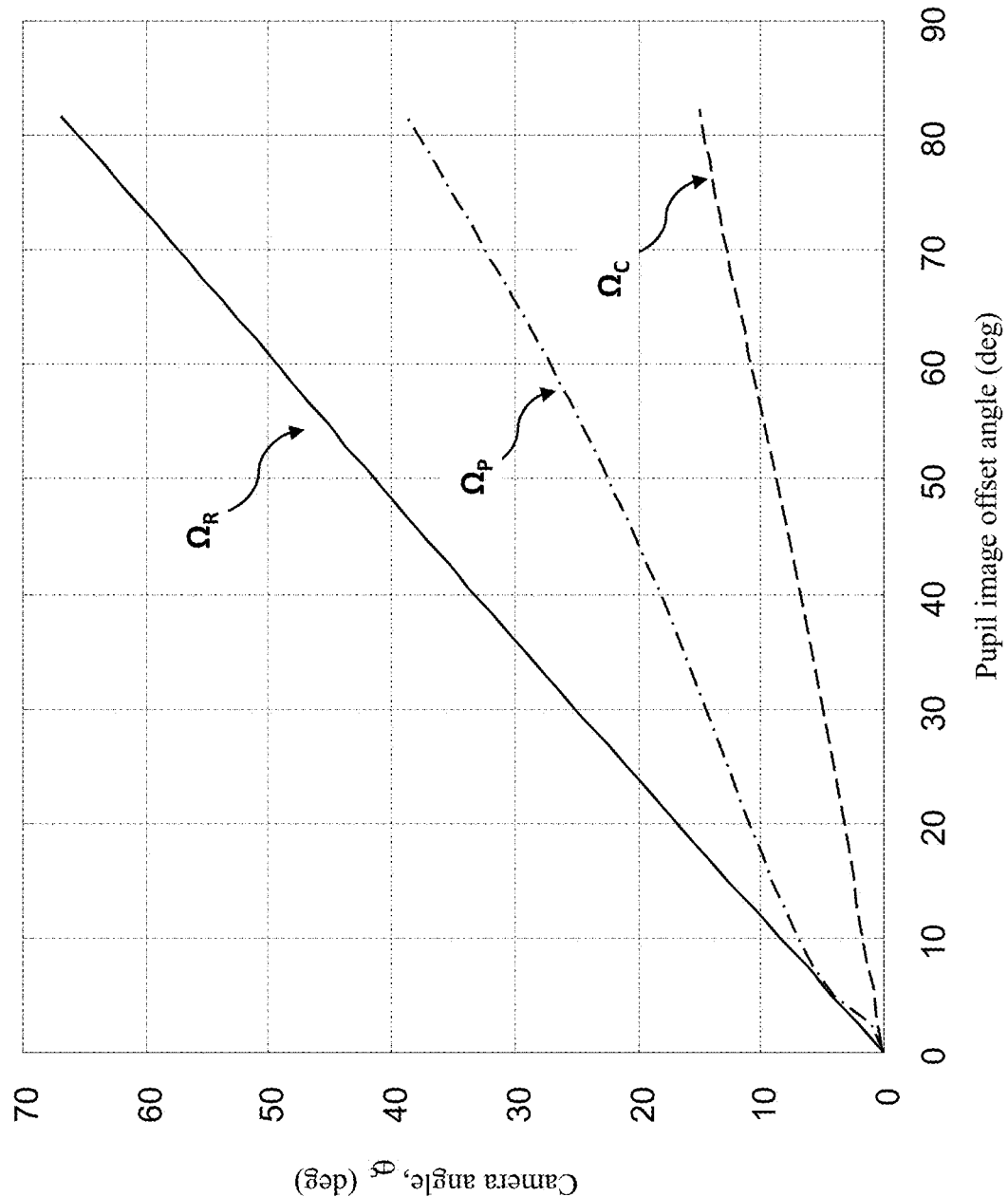
FIG. 31 is a graph showing the correction to sight direction estimated from pupil image offset as a function of camera offset angle.

In a further embodiment, the accuracy of the simple perspective line-of-sight direction estimate made from the pupil image may be improved by adjusting for the refractive distortions caused by the offset from the camera. FIG. 31 shows corrections to line-of sight estimate made from the pupil image offset that have been computed assuming a spherical corneal surface as approximation. This difference between the corrected and the image perspective derived offset can be expressed in terms of the apparent pupil width seen in a frontal view of the eye here denoted by $z_{To}$; the image offset computed by the ratio of major to minor ellipsoidal axes for the pupil is: $\Omega_R=a\cos(z_T/z_{To})$, where the frontal view width is taken as the major axis, here approximated by $z_{To}=2.32*d$, where d is the half-width of the true pupil corrected by a factor of 1.16 from FIG. 28 for a frontal view; this is the camera offset for the distorted image. Since $\theta_c$ is the true offset angle as measured for the camera from the eye optical axis, the correction to the camera offset for the perspective view of the image is: $\Omega_C=\Omega_R-\theta_c$. The location of the pupil center in the distorted image may be expressed as an angle in terms of the ratio of the left and right image sides: $\Omega_P=a\cos(z_L/z_R)$, that is, as the angle of pupil center about the offset angle. FIG. 31 shows these plots of $\Omega_R$, $\Omega_C$, and $\Omega_P$ versus the camera offset $\theta_c$. The plots relate the offset of camera from the viewing axis to the pupil image angle computed from the ratio of the minor to major ellipsoidal axes for the camera angle $\Omega_R$ and the correction to the pupil image offset $\Omega_C$, as well as the pupil center offset $\Omega_P$; the pupil center is located within the pupil image by the arccosine of the former plot. Because of the refractive distortion bias toward the offset, the pupil is actually rotated further from the camera than the image angle would indicate. Note that for a simple perspective view of the pupil, $\theta_c=\Omega_R$, i.e., $\Omega_C=0$; and $\Omega_P=0$, since $z_L=z_R$. Plots of this nature enable gaze direction corrections for the refractive distortions of the pupil image with pupil image offset from the camera. That is, given the pupil image offset $\Omega_R$ computed from the ratios of the image ellipsoidal minor and major axes, FIG. 31 may be used to estimate the offset $\theta_c$ of the eye from the camera; similarly given the pupil image center, the image point of the pupil center may be estimated from $\cos(\Omega_P)$. Of course, the accuracy of these corrections depend upon the model of the corneal surface used; here a spherical model is used as an approximation while the cornea of the eye is more basal (i.e., flatten at the front) than spherical. The actual shape depends upon the individual.

Figure 32:
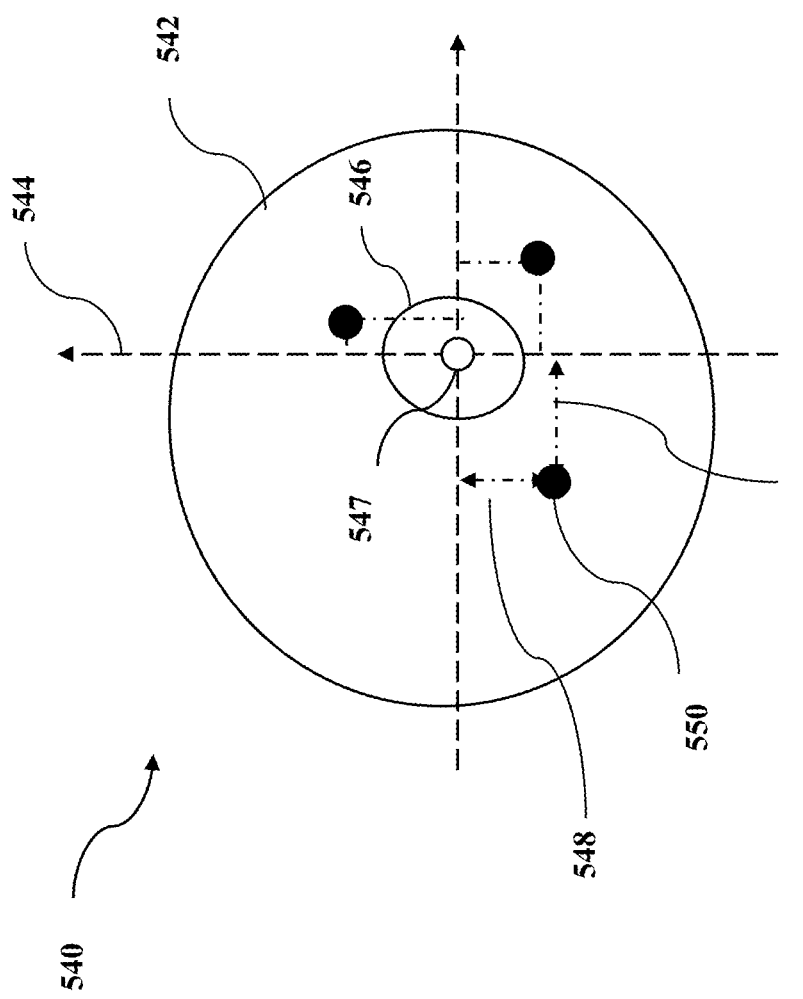
FIG. 32 is a figure showing the relationship between the pupil image center and the light source glints used in triangulation.

As a further embodiment, the line-of sight direction may be estimated from the offset of the pupil image center from a single glint source or a set of glint points fixed in the workspace or to the camera; this is true when the locations of the glint light sources are known. Referring to FIG. 32, the line-of sight direction may be estimated from the distribution of glint points in the pupil image. Here, the figure shows the image 540 with pupil image 546 in the eye 542 with glint points 550 distributed about pupil image center and for further reference, a glint point 547 overlaid the center. The glint points may be located by the relative rectangular displacements 548 and 549 from the pupil center coordinate system 544 in the image planar coordinates, and in turn, the sight direction estimated by triangulation of the angular displacements given the locations of the glint sources in the camera coordinate system. The accuracy of this estimate decreases with pupil image offset from the camera because of refractive distortions of the pupil image; however, for a front eye view, letting $\alpha 1$ be the angular offset of the glint from a first light source from the pupil image center and $\alpha 2$ the same for second source, then the gaze point on the base line (b) connecting the light sources, is at: $\Delta b=b*\alpha 1/(\alpha 1+\alpha 2)$, as measured from first source. For a frontal camera view, a user would be looking directly at a light source for a glint point superimposed over the pupil image center. The light sources may be activated in clusters, say composed in groups of three opposing elements, that are readily paired with the glint points by the distribution in the image thereby mapping uniquely to the source elements. Because the pupil image is non-uniformly distorted by the corneal surface refraction with a bias toward the offset, the centroid of the ellipsoidal for the pupil image is biased toward the offset. Furthermore, not only is the glint disproportionately offset from the pupil image true center with viewing angle, but the disproportionality increases with camera lateral angle because of the convex surface. For these reasons, the estimate is an outer bound to the line-of sight.

Figure 33:
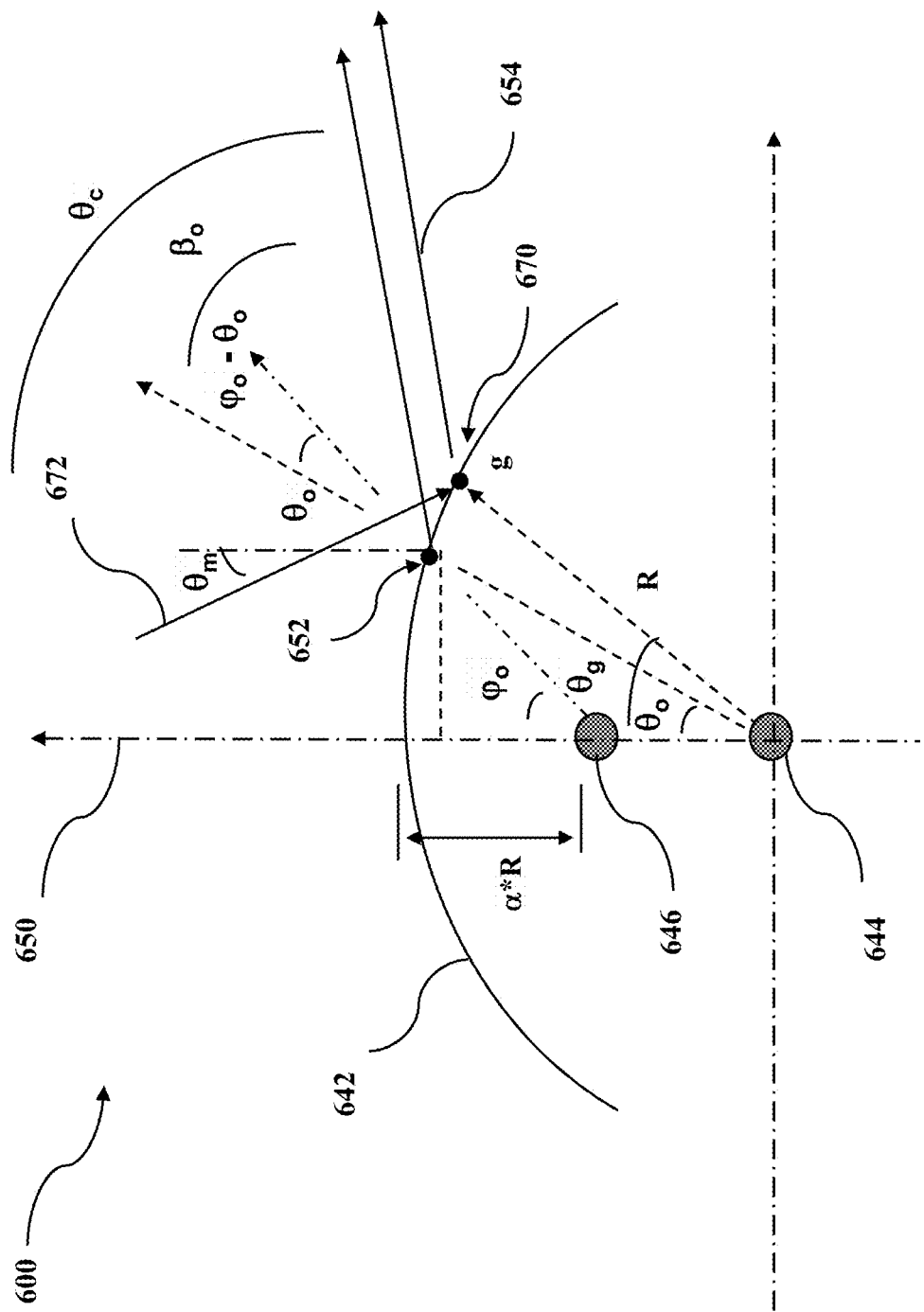
FIG. 33 is a schematic showing the eye elements used to compute the distortion in glint to pupil image center that is caused by corneal surface refraction.

Considering now triangulation for light sources fixed in the workspace separate from the camera, the accuracy of this estimate may be improved by adjustment for the change in glint point offset caused by the refractive distortions of the pupil image with pupil offset from the camera. —Referring to FIG. 33, showing a schematic section 600 of the eye cornea 642 as a spherical surface with center 644 and radius, an iris defining the pupil, the pupil center 646 located within the anterior surface, an optical axis 650 for the eye located by the corneal spherical center 644 and pupil center 646, a camera with optical axis 654 offset from that of the eye, the pupil center seen in the camera image corresponding to a corneal surface point 652, and the glint point seen in the camera image corresponding to corneal surface point 670 with glint from a light source with bearing offset 672, where the corneal surface points for the pupil center and glint may be determined from the consideration of appropriate angles, as follows.

Considering the pupil-center image point, these angles are the offset $\phi_o$ of the pupil-image center about the pupil center, the offset $\theta_o$ of the corneal radial to pupil image center [ray], and the resulting refracted ray angle $\beta_o$ to the camera. Similar considerations apply to the glint image point as located by the corneal glint point radial angle [ray] $\theta_g$ resulting in a refractive angle to the camera. These relations may be solved for the light source offset $\theta_m$ as a function of camera offset $\theta_c$ resulting in corrections to the triangulations for the refractive distortions of the pupil image with pupil image offset from the camera. Of course, the accuracy of these corrections depends upon the model of the corneal surface used; here a spherical model is used as an approximation while the cornea of the eye is more basal than spherical. The actual shape depends upon the individual.

Considering now FIG. 33 in detail, for a corneal angle offset $\theta_o$ of the pupil-center image from the optical axis of the eye, it is readily shown that the pupil-center offset $\phi_o$ about the pupil center is: $\phi_o = a\tan(\sin(\theta_o)/(a-1+\cos(\theta_o)))$, and the corresponding refracted ray angle $\beta_o$ to the camera is: $\beta_o = a\sin(n^*\sin(\phi_o - \theta_o))$, where the offset of the camera optical axis from that of the eye is: $\theta_c = \theta_o + \beta_o$. Given a glint point, g, located at a corneal angle $\theta_g$ seen by the camera, the glint illuminator is located along the azimuth: $\theta_m = \beta_o + \theta_o - 2^*\theta_g$, i.e., $\theta_m = \theta_c - 2^*\theta_g$. Note that if the glint point is over the pupil-center image, $\theta_g = \theta_o$, the illuminator offset is: $\theta_m = \beta_o - \theta_o$; in general for a known illuminator, the glint point offset is: $\theta_g = (\theta_c - \theta_m)/2$, and the angular separation between the glint point and pupil-center image is: $\Delta\theta_g = (\theta_c - \theta_m)/2\theta_o$. Of interest later is the case where the camera and illuminator are in a fixed relation by design, say, $\delta\theta_m = \theta_c - \theta_m$, since the separation angle between the pupil-center and glint may be used as a measure of the viewing offset from the camera, $\theta_c$.

Figure 34:
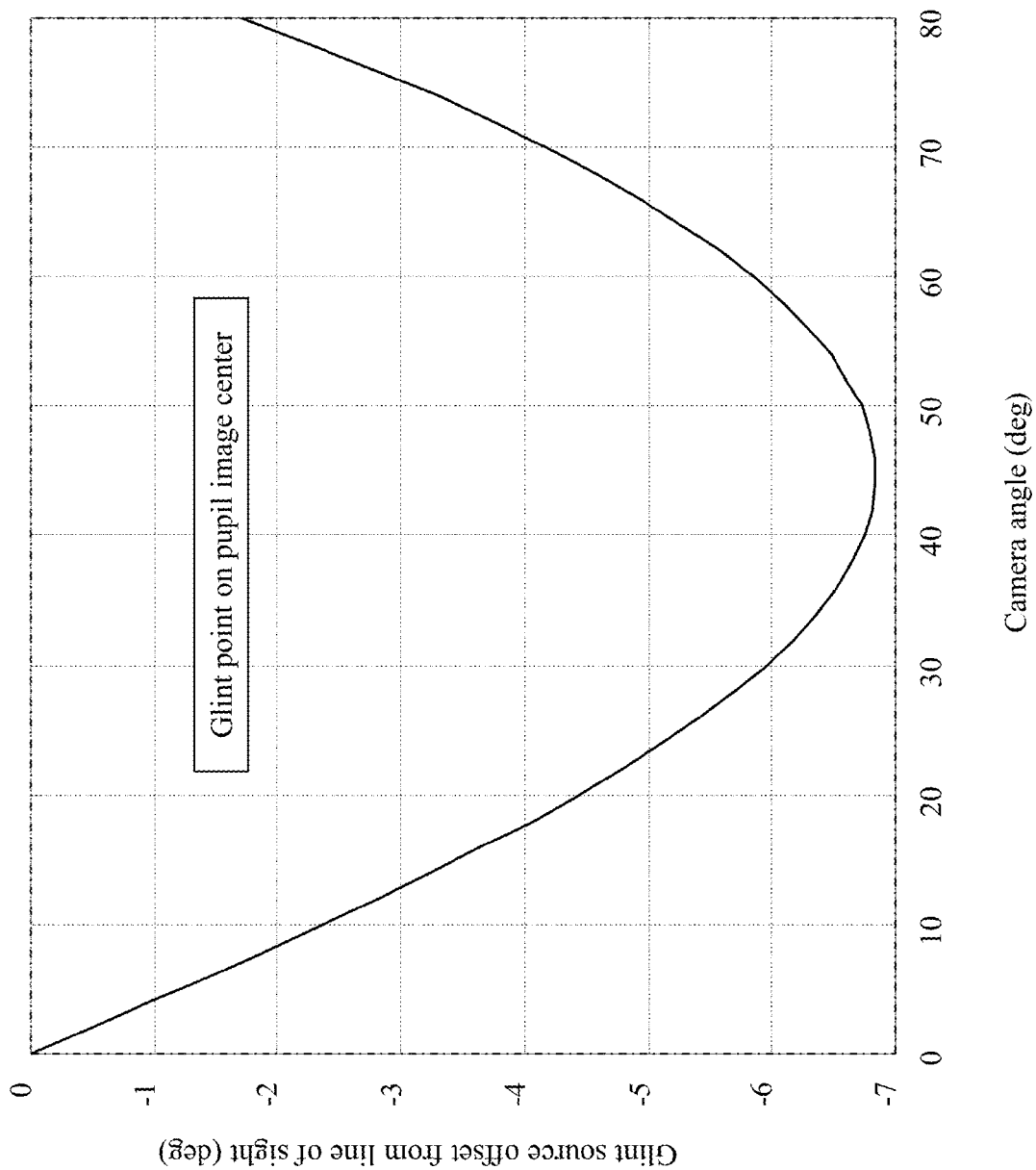
FIG. 34 is a graph showing the relationship between the camera offset angle and the glint light source offset angle from the optical axis of the eye for a glint point superimposed over the pupil image center.

FIG. 34 shows a correction to the line-of sight estimate for a single glint point located on the pupil image center that has been computed assuming a spherical corneal surface as an approximation. The plot is of the lateral offset of the glint light source from the line of sight as a function of camera offset from the light source, and shows that the source for a glint seem superimposed over the pupil-image center is located at the camera for a frontal eye view (i.e., the user is looking directly at the camera), but the source is increasingly offset from the viewing direction with offset of the camera from the light source, up to about 45-degrees, where the source offset then decreases with camera offset. This is because of the refractive distortion in the pupil image that occurs with offset from the camera.

Figure 35:
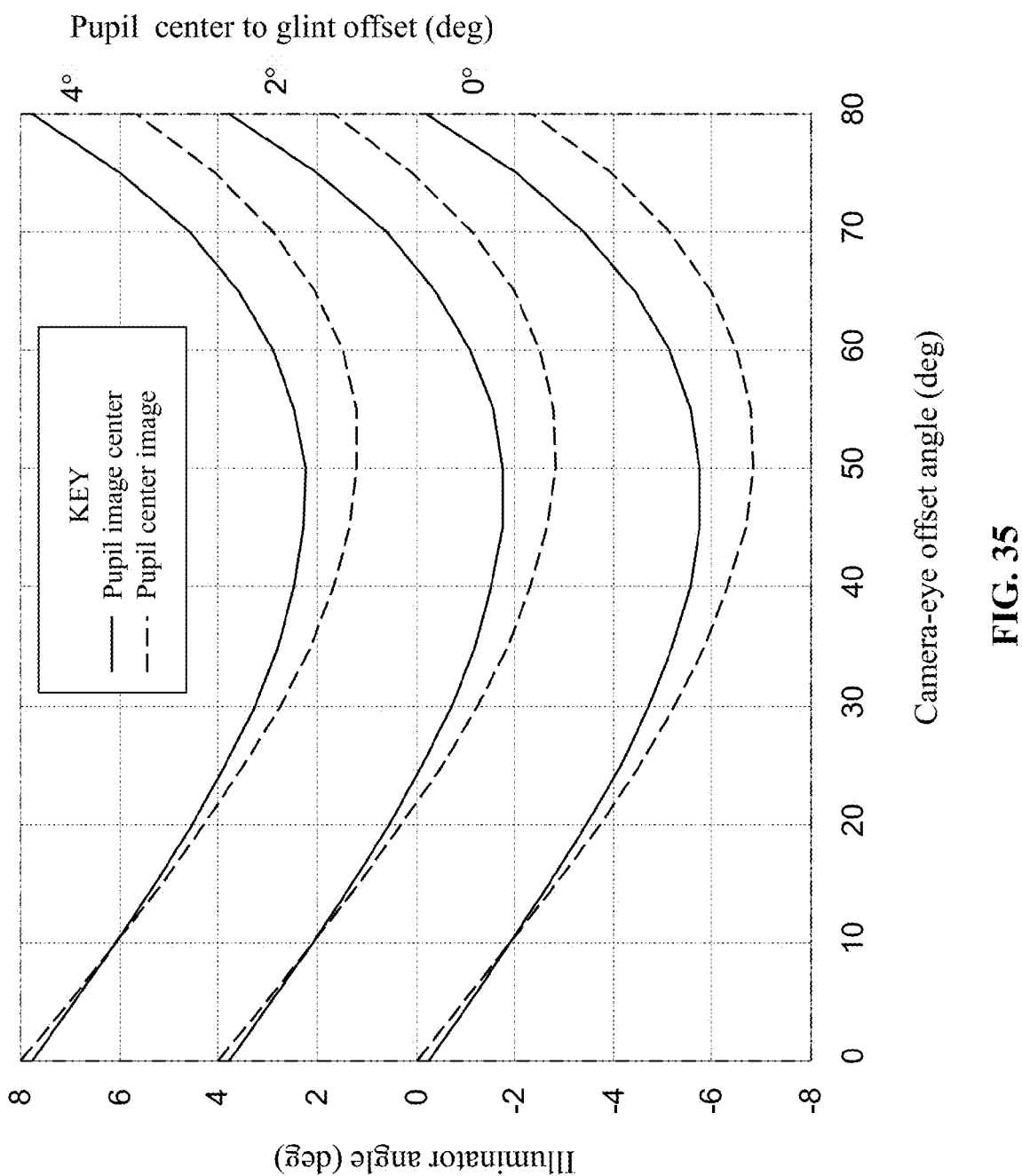
FIG. 35 is a graph showing the relationship between the offset between the glint and pupil image center as a function of camera to eye offset for fixed light sources.

FIG. 35 shows the light source offset from the visual axis as a function of the camera to eye offset for a single light source at several glint to pupil angles: 0, 2, and 4-degrees. The plots are for perspective views based on the pupil image center and the pupil-center image. The glint to pupil angle is a valid measure of the illuminator offset for a camera frontal view of the eye (i.e., the user is looking directly at the camera); this is true for the angle measured from either the pupil image center or the image of the pupil center. However, the plots show that the illuminator for a fixed pupil to glint angle is increasingly offset from the viewing direction with offset of the camera from the eye, up to about 45-degrees, where the light source offset then decreases with increasing camera to eye offset. The figure shows a noticeable discrepancy between plots for the different pupil centers past the 20-degree camera-to-eye offset with the plot for the pupil image center being more accurate. The figure demonstrates the difficulty of determining the line-of sight from the glint to pupil angle for a known illuminator without knowledge of the camera to eye offset or the relation between the illuminator and camera in the viewing space.

Consider now triangulation from the disposition of multiple glint points about the pupil-image center for illuminators in known positions. Equations may be derived for the effects of the distortions upon gaze determination from glint triangulation by further consideration of FIG. 33. Given glint points $g = \{g_1, g_2\}$, disposed about the pupil-center image, with corneal angles to the glint points of $\theta_g = \{\theta_{g1}, \theta_{g2}\}$, that are generated by illuminating markers located at angles $\theta_m = \{\theta_{m1}, \theta_{m2}\}$, to the eye optical axis, let the relation between the corneal angle to the pupil-center image $\theta_o$, and the camera angle $\theta_c$, be as in the above discussion of FIG. 33, then the glint corneal angle is related to the illumination offset by: $\theta_g = (\theta_c - \theta_m)/2$, and the angular offset of the glint point from the pupil-center image by: $\alpha_m = R^*(\theta_o - \theta_g)$, where R is the corneal radius. The offsets for the glint points from the pupil-center image are: $\alpha_1 = R^*(\theta_o - \theta_{g1})$, and $\alpha_2 = R^*(\theta_o - \theta_{g2})$, and the angular triangulation: $\Delta b = b^*\alpha 1/(\alpha 1 + \alpha 2)$, gives the gaze point on the base line (b) connecting the light sources, as measured from first source. We consider the case where the light sources are in an array that is fixed in relation to the camera, that is, as the eye rotates about the scene, the glint points in the vicinity of the pupil image can be identified from the camera with the relative locations known. In particular, two elements of the array with triangulation of glint points within the pupil image area are spaced a distance $\delta\theta_b = \theta_{m1} - \theta_{m2}$ apart, with the spacing center $\theta_b$ a fixed angular separation $\delta\theta_m = \theta_b - \theta_c$, from the camera.

Figure 36:
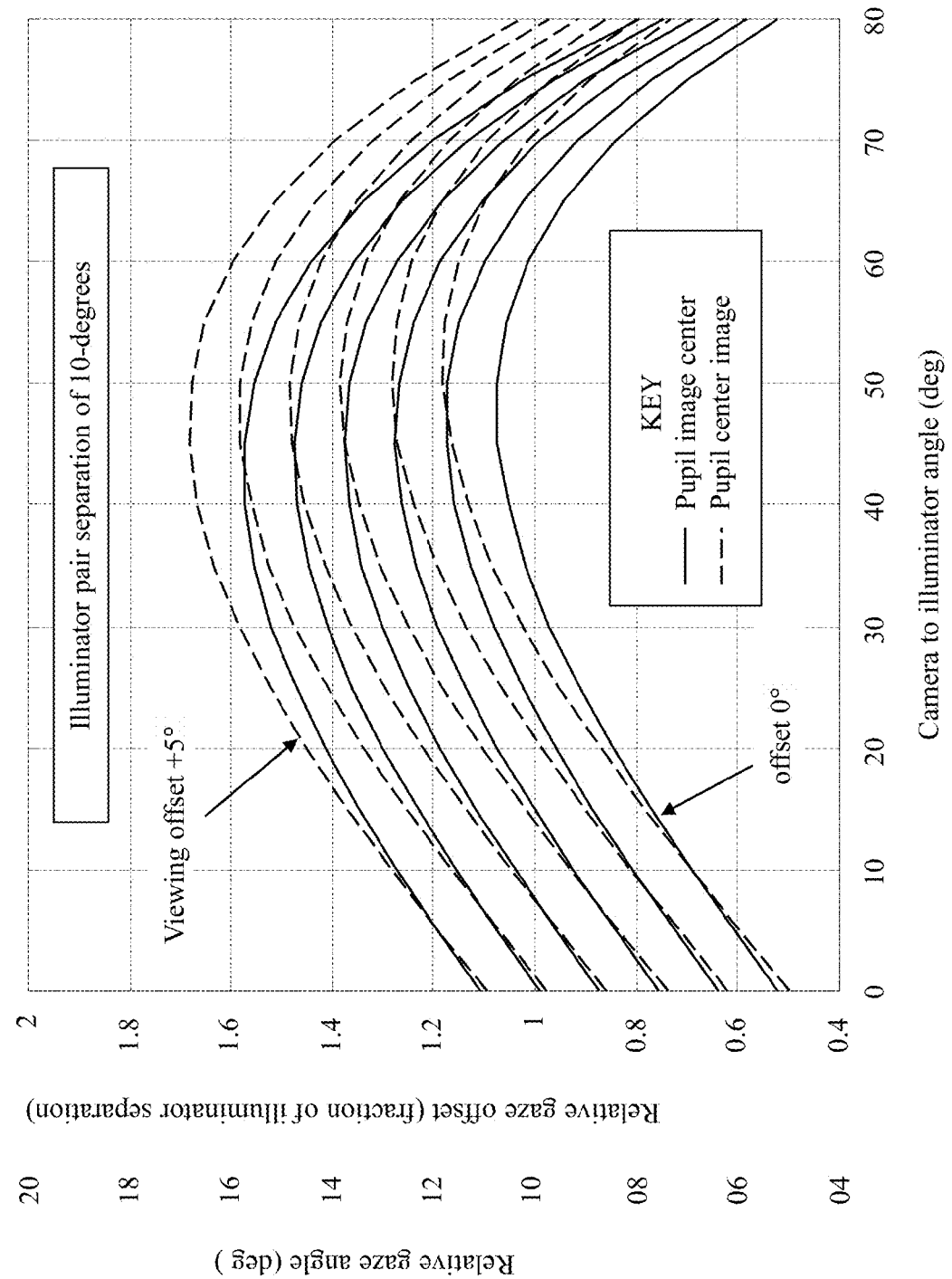
FIG. 36 is a graph showing the distortion in sight direction derived from triangulation of a glint pair as a function of camera offset from the light sources.

FIG. 36 is a plot of the estimated gaze-point direction $\Delta b$ as a fraction of the illuminator separation $\delta\theta_b$ for an illuminator pair $\{\theta_{m1}, \theta_{m2}\}$ versus the camera to illuminator angle $\delta\theta_m$ as a function of the viewing offset from the illuminator base, where the illuminator pair has a spacing of 10-degrees and the viewing offset is from 0° to 5° from the center of the base, that is, at the mid-point to one of the illuminators. The plots are for perspective views based on the pupil image center and the pupil-center image. The plots show that the line of sight estimation is most accurate for a frontal view where the illuminators are located symmetrically about the camera and the viewer is looking directly at the camera; here, the plot shows the viewer for no offset looking at the mid-point between illuminators. However, even for this configuration, the accuracy decreases with viewing offset from the center point between the illuminators. For the 5° offset corresponding to looking at the end illuminator, the plot shows an estimation of a view point that is 1° beyond that illuminator. Furthermore, the accuracy decreases with increasing angle between the camera and the illuminators (and therefore camera to eye), for all viewing offsets, reaching minimum at 45-degrees and then improving with a further increase in angle. Throughout this range, the accuracy is decreased with increased offset from the illuminator pair mid-point.

Figure 37:
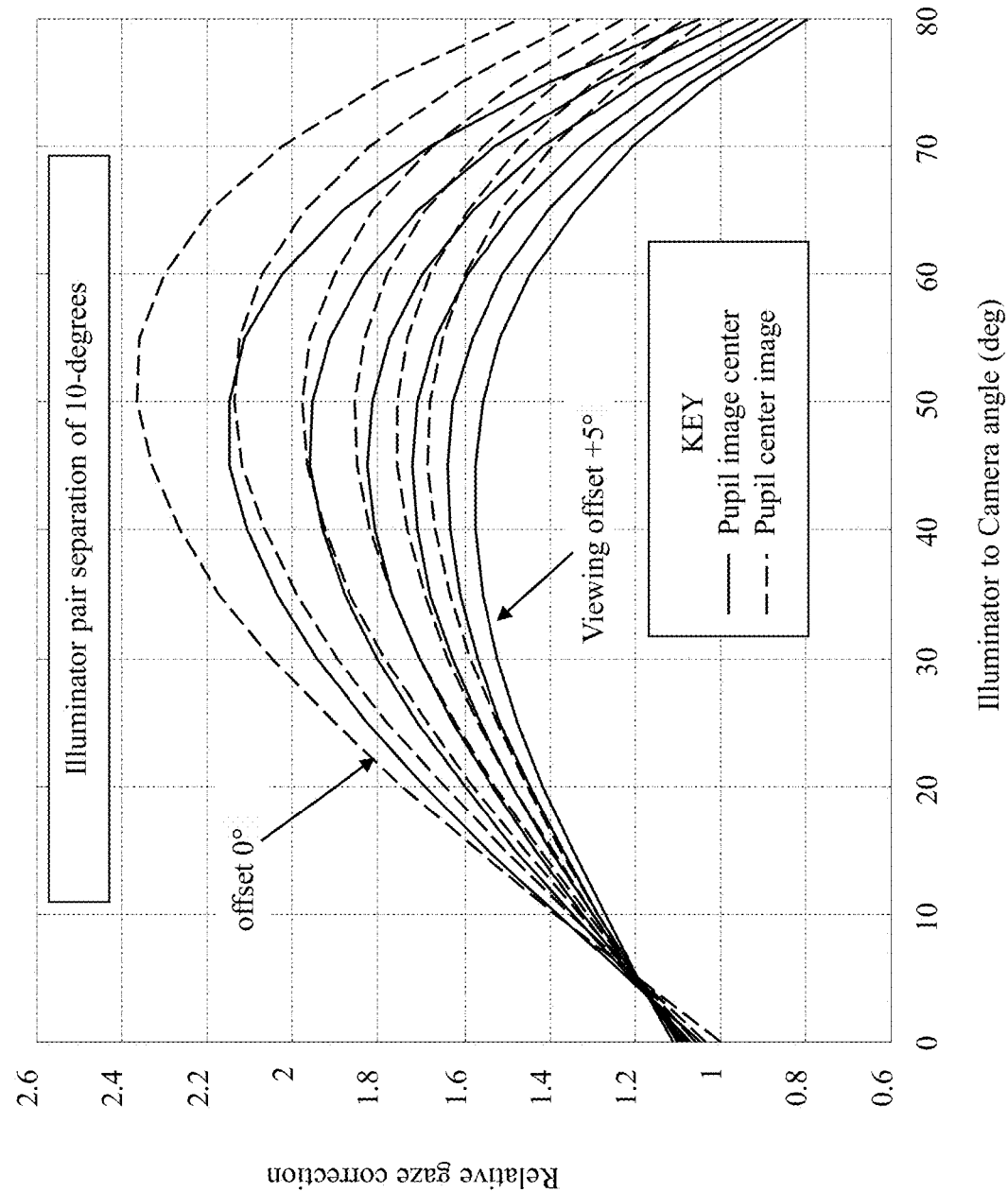
FIG. 37 is a graph showing relative sight direction derived from triangulation of a glint pair as a function of camera offset from the glint sources.

FIG. 37 shows the relative gaze offset [in] estimation from the viewed point versus the camera to illuminator angle as a function of the viewing offset from the illuminator base. The plots over the camera to illuminator angle range of 0° to 10° are in fair agreement for offset and may be considered as forming corrections to line-of sight direction estimates by triangulation of glint points located about the pupil center image. But, the illuminators are increasingly offset from the estimated viewing direction with offset of the camera resulting in both a baseline shift and decrease in accuracy, up to about 45-degrees where the estimation error then decreases with camera offset. Further, the correction increases with viewing offset from the midpoint of the illuminators because of the refractive distortions in the pupil image. Again, plots of this nature enable gaze direction corrections for the refractive distortions of the pupil image with pupil image offset from the camera. However, because the pupil image is non-uniformly distorted by the corneal surface refraction with a bias toward the offset, the centroid of the ellipsoidal for the pupil image is biased toward the offset, and the estimate although improved, remains an outer bound to the gaze direction.

Figure 38:
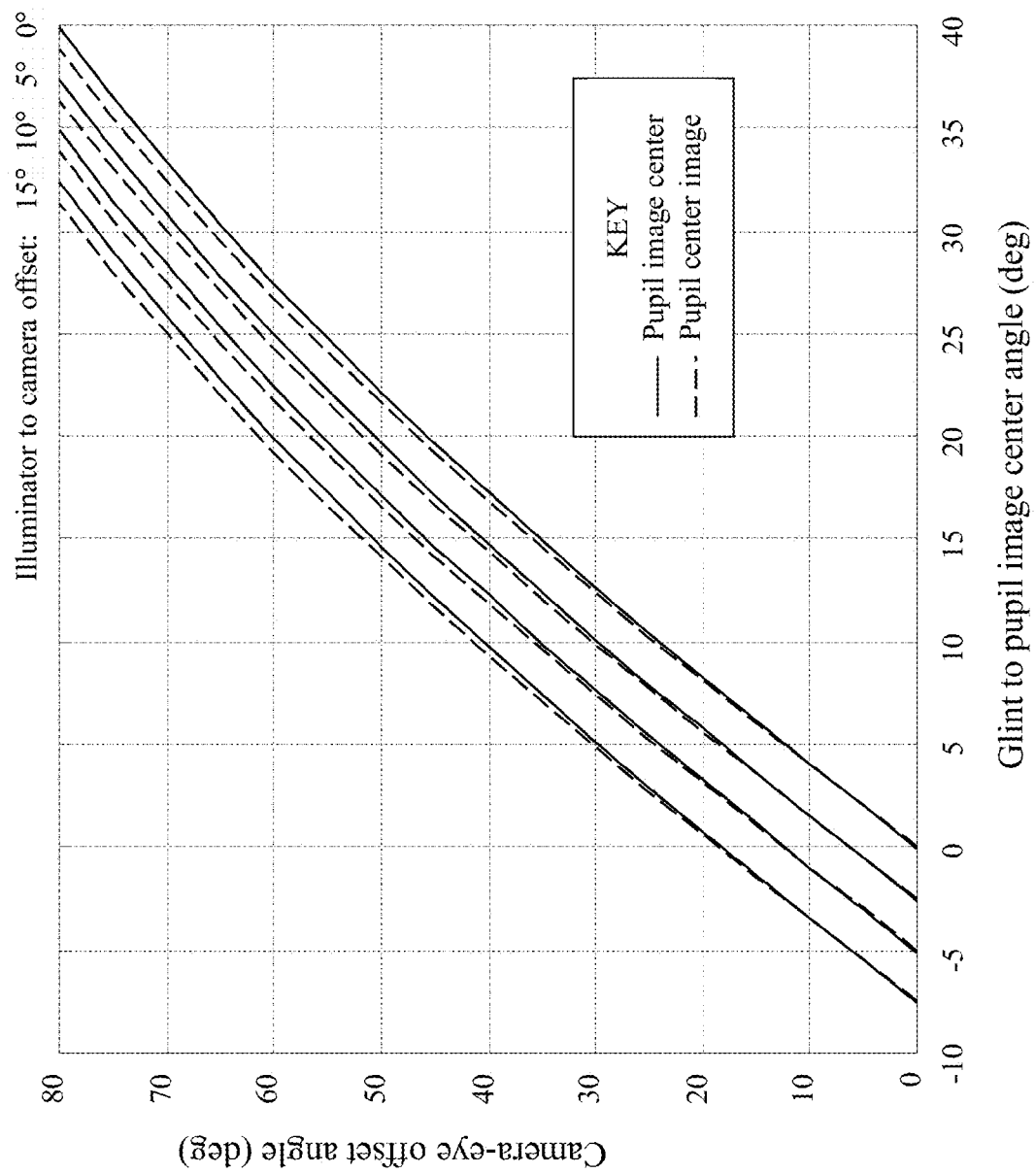
FIG. 38 is a graph showing the sight direction as a function of pupil-image center to glint offset for a single source collinearly fixed to the camera.

Another embodiment is triangulation with the offset of a glint point from the pupil-image center for an illuminator fixed to the camera. Here, the camera and illuminator are in a fixed relation by design, say, $\delta\theta_m = \theta_c - \theta_m$, and the separation angle $\Delta\theta_g$ between the pupil image center and glint may be used as a measure of the viewing offset from the camera, $\theta_c$. Note that the separation angle may be determined by $\Delta\theta_g = \arcsin(d/R)$, where d is the linear separation between the pupil image center and glint point in the image and R is commonly determined in calibration; for a simple perspective view of the pupil with a collinear illuminator, $\theta_c = 0.5 * \Delta\theta_g$, applicable to a spherical surface. FIG. 38 shows plots of the glint to pupil center separation angle $\Delta\theta_g$, versus the camera to eye offset angle $\theta_c$, for a single glint point as a function of the illuminator to camera offset, $\delta\theta_m$: 0-deg, 5-deg, 10-deg, and 15-degrees, where the glint separation is measured from the pupil image center (solid line) or the pupil center image point (broken line). While the plots are nearly linear out to about 20-degrees camera angle, the corresponding camera-eye angles are larger than those estimated by a perspective image process. We note that the plot may be used to determine the camera-to eye offset from the pupil-to glint angle given the angle between the illuminator and camera.

Plots such as FIGS. 37 and 38 for glint triangulation and FIG. 31 for pupil offset, provide corrections to sight estimations made from separate perspective views. Use of stereo images with the methods of glint triangulation and image pupil offset enables estimation by averaging of the results for the different images; however, the pupil image distortion from refraction is non-uniform increasing with camera offset and the averaging may be weighted by the single view correction factors from the figures. When used with the template matching method presented below, the separate image results for the image pupil offset and glint triangulation methods may be used as bounds on the template matching method calculations.

As has been mentioned in regard to FIG. 26, these further embodiments may be used as components for a hierarchical approach to line-of sight estimates from the image data of the distribution of glint points in the images, the pupil image ellipsoidal moments for the images, and the locations of eye template features in the camera coordinate system. The hierarchical process computes line-of sight estimates by triangulation from the distribution of glints about the pupil image center for the images; estimates the sight direction for all images from the pupil image offsets; uses the glint based gaze estimates as bounds on the pupil offset estimates; computes the sight estimates from template matching of the internal eye structure; and uses the glint based gaze and pupil offsets as bounds to the template estimates. Although the glint based gaze and pupil offset are not as accurate as the template method, they are more robust and this expanded process bounds computational deviations that may result from corrupted images caused by randomly occurring factors such as extraneous light sources that may lead to mismatching of the template features.

Figure 39:
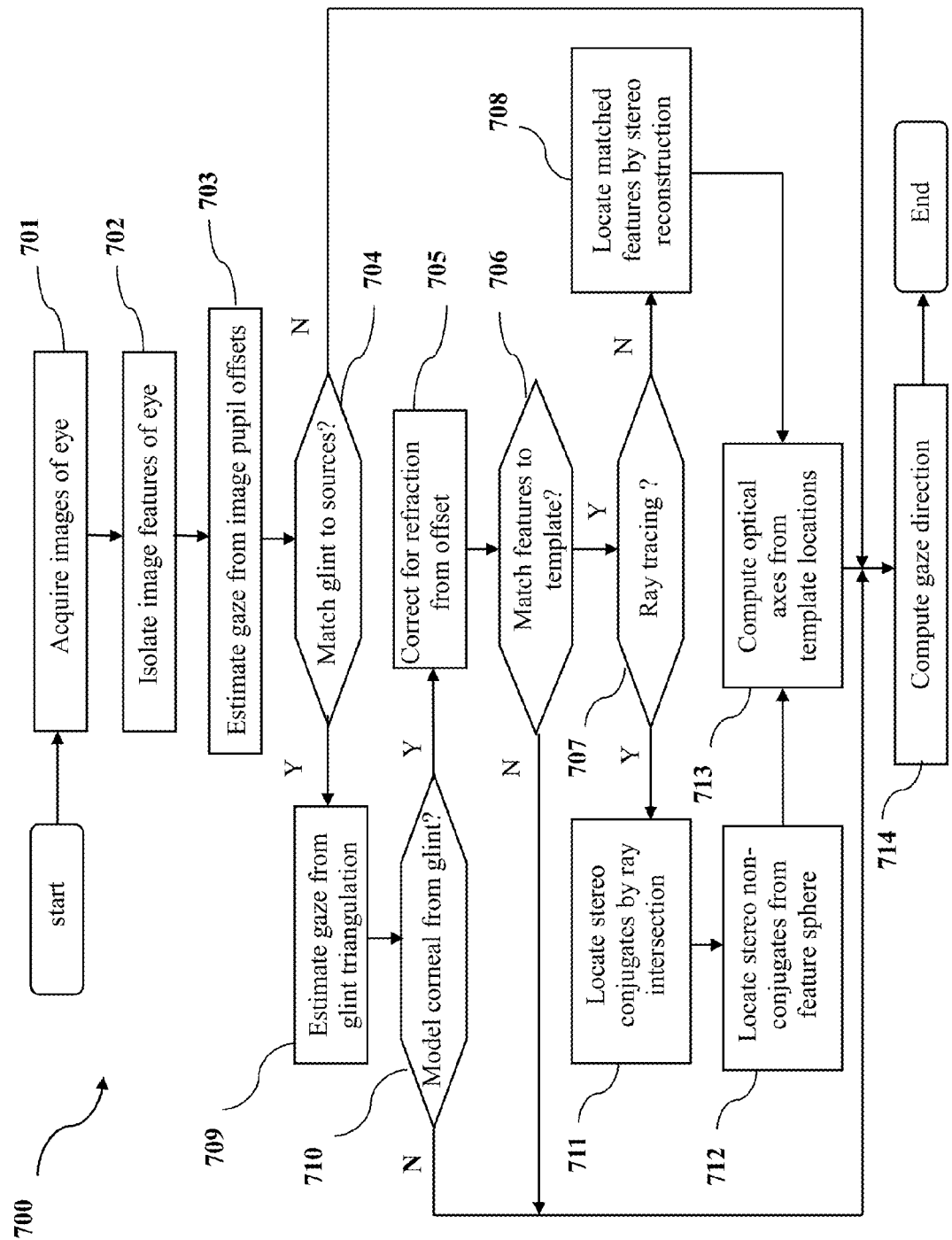
FIG. 39 is a flowchart showing methods for computing sight direction for different eye-tracker designs from the stereo images of the eye using the processes described in the specifications.

Of course in still further embodiments, these methods for computing line-of sight may be used in different combinations depending upon the eye-tracker design. FIG. 39 is a flowchart showing different choices 700 that are possible depending upon the design. At start, the tracker would acquire images 701 of the eye and isolate features 702 pertinent to the design methods. A basic design would be to estimate sight direction from the pupil image offsets 703 in the sense of FIG. 27. If the design supports matching glint points in the images to the light sources, then the sight may be estimated by glint triangulation in the sense of FIG. 32. The light sources would be mounted in a known relation to the sensors, for example, the sources and cameras may be mounted in fixed locations in the workspace separate from the user, or the sources and cameras may be head-mounted on the user, as several possible combinations. Furthermore, a design modeling the corneal 710 from, say, the glint distribution matched to the sources, allows the estimations to be corrected for the effects of corneal refraction on pupil image offset in the sense of FIG. 31. However, failing modeling of the user, the design may use a standard corneal model to correct for refraction. Furthermore, estimates from triangulation may be corrected in the sense of FIG. 37 or 38. If stereo images are collected, then the design may match isolated features to an eye template 707 established in calibration, in the sense of FIG. 18. If ray tracing is used to locate the matched template features 707, then the design may locate stereo conjugate features 711 by the intersection of back traced rays, and locate non-conjugate features 712 by the intersection of the corresponding back traced ray with the feature spheres; if not, stereo matched features may be located by stereo reconstruction 708 from images reconstructed using offset corrections. The optical and sight directions may then be computed 714 from the template feature locations in the sense of FIG. 25. While the methods of image pupil offset alone or in conjunction with glint triangulation provide an estimation of the principal optical axis, the template matching method is needed to fully specify the optical axes and therefore the torsional roll of the eye about the principal axis as well as the eye rotations of that axis. Use of stereo images with the methods of image pupil offset alone or glint triangulation enables estimation by weighted averaging of the results for the different images, while use of stereo images with the template matching method enables the refinement of three-dimensional modeling either through stereo reconstruction or ray-tracing. When used with the template matching method, the separate image results for the image pupil offset and glint triangulation methods may be used as bounds on the template matching method calculations.

Figure 40:
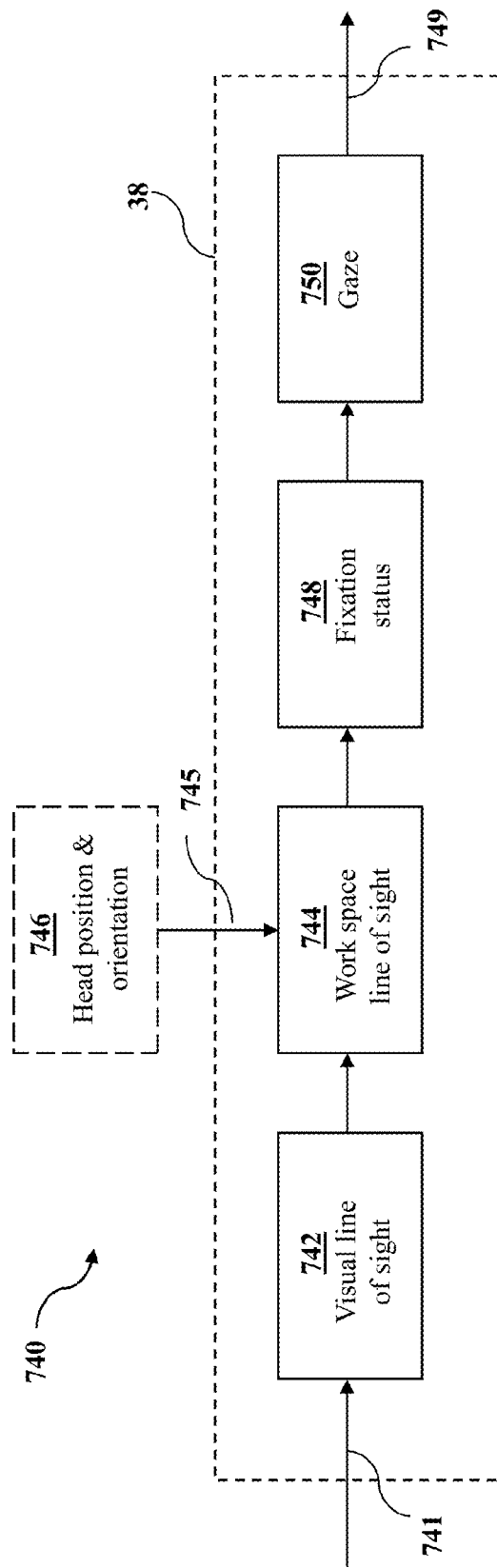
FIG. 40 is a block diagram showing the processes of the gaze processor.

FIG. 40 is a block diagram 740 showing the processes of the gaze processor 38 (FIG. 2) comprised of a process 742 with input 741 from the feature locator for computing the visual line of sight as described above, process 744 for computing the work space line of sight from the visual sight and input 745 from an apparatus 746 determining the user's head position and orientation in the workspace, process 748 for determining the visual fixation status, and process 750 for determining the visual gaze, with output 749 of the same to an application. The apparatus 746 has application to eye-tracker designs with head-mounted light sources and sensors for which the gaze is determined by both the visual line of sight as measured by the head mounted system relative to the head and the head movement in the workspace. For eye tracker systems mounted in the workspace separate from the head, the line of sight naturally incorporates both eye and head movements together in the measurements.

In some applications using a head-mounted system, the user may be viewing through the reflector/visor, an external real or virtual workspace which is independent of optical device; we may wish to know which elements of the visual workspace are being viewed. In this case, referring back to FIG. 40, the visual line of sight computed by routine 742, must be transformed to that for the external workspace. This is accomplished by first locating the headset in the workspace. A tracking system 746 is used to measure the position and orientation of the headset holding the video device. The tracking system may consist of a source, sensor, and electronics processor. The source is mounted in the user's workspace; the sensor is mounted on the headset. The system allows continual tracking of the six degrees of spatial freedom; the processing unit continually computes the position and orientation of the sensor relative to the source, and controls the transmission of the output data 745. Tracking systems are available employing different sources: infrared, ultrasonic, optical, and magnetic fields.

The computer routine 744 computes the user's viewing origin and direction in his visual workspace from the viewing point and axis given in the optical device coordinates and the position and orientation of the headset as measured by the tracking system 746. The viewed point in the user's visual workspace is then computed using computer graphics concepts and a computer memory data base listing the objects and their locations in the user's workspace. The routine 744 computes the point of intersection of the viewing direction with each workspace surface facing the user from the surface normal and the location of a vertex. The routine checks to ensure that the intersection point is within the edges containing the surface. The viewed point is the contained intersection point closest to the user's eye.

The positions and orientations of the surfaces of the objects in the user's visual workspace are listed in a digital memory computer data file by the directional cosines of the surface normal and the coordinates of the vertices. The surfaces of the objects are described by a piece-wise net of planar segments for computational purposes. Note that the objects being viewed for a virtual workspace are those generated by the drawing file for the display driver of video display; in this case, the digital memory computer data file is defined by the virtual workspace used to set up the display driver. Similarly, the position coordinates and directional cosines of the orientation of the tracking system source in the workspace are listed in the computer memory data file.

The computer routine 748 performs as an expert system, classifying the immediate visual state defined by the workspace viewing origin and direction, as fixation, saccade, pursuit or blink from an embedded expert knowledge base of these ocular states. The routine detects saccades and predicts fixation end points, as well as separates saccades from pursuit eye tracking of moving targets, and eye blinks. The routine uses an automatic fixation and saccade classification scheme operated in conjunction with a saccadic end point predictor. The classification scheme is a combination of these two methods: the position variance method and the velocity detection method, operated as parallel processing channels. The end point predictor is derived from a knowledge base on the relation between saccade peak velocity and amplitude of movement. The position variance method is based on the expert knowledge that a fixation is characterized by relative immobility with low variance in eye movement, while a saccade is distinguished by rapid change (high variance) in position. In this method, the means and variances are computed for a sliding window of time samples in eye position. The variance of the windowed samples for a fixation is lower than an empirically determined threshold level. The variance rises when a saccade occurs, reaches a peak and then subsides toward the fixation level again. The initiation and termination of a saccade is automatically detected by comparing the position variance to the threshold level determined in an initial calibration process. Furthermore, curve fitting to the variance function is used to make predictions about the future variance values and therefore the time and location of the next fixation. The method has a time lag attributable to the width of the sampling window.

The velocity detection method operates in parallel. In this method, the eye movement speed is computed from the windowed samples by first smoothing with a low-pass digital filter to remove noise, and then numerically differentiated. The computed speed is compared to an empirically determined threshold level separating saccadic movements from fixations. A speed above the threshold is classified as saccadic while that less than the threshold is classified as fixation. The position variance and velocity methods give similar results. These two methods are combined to obtain a more reliable saccade discriminator. The combined method can be based on either the agreement between the separate threshold outputs, or more elaborately, upon saccade state-probability estimates derived from the magnitudes of the position variance and speed measurements.

The saccadic end point predictor is activated once a saccade has been detected. This method predicting the end point of the saccadic movement from the peak velocity, discriminates between saccades and pursuit tracking. The predictor is based on the expert knowledge that the eye-movement velocity function during a saccade is nearly symmetrical about a peak velocity located approximately half-way to the next fixation. In detail, the saccadic velocity function rises above the threshold detection level, accelerates to a peak velocity about half-way to the next fixation, and then decelerates below the threshold at the fixation point. Although it has been reported in the literature that a sine wave is a good fit for the velocity function, the function is in fact, more or less symmetrical depending upon the magnitude of the peak velocity. In actuality, the saccadic amplitude is related to the maximum velocity by an exponential function using curve fitting constants. A look up table contains empirically determined correction factors needed to adjust for the asymmetry in the velocity function. The correction factors are derived in the calibration process. Therefore, the processor by detecting the peak of the saccadic velocity, uses the relation to the saccadic amplitude to predict the termination time and location of the next fixation. A classification as saccadic movement that does not satisfy the end point predictor is reclassified as pursuit movement; these movements are less than 30 degrees per second. Blinks correspond to cases where no reflection points are detected due to obscuration of the cornea by the eyelid.

Figure 41:
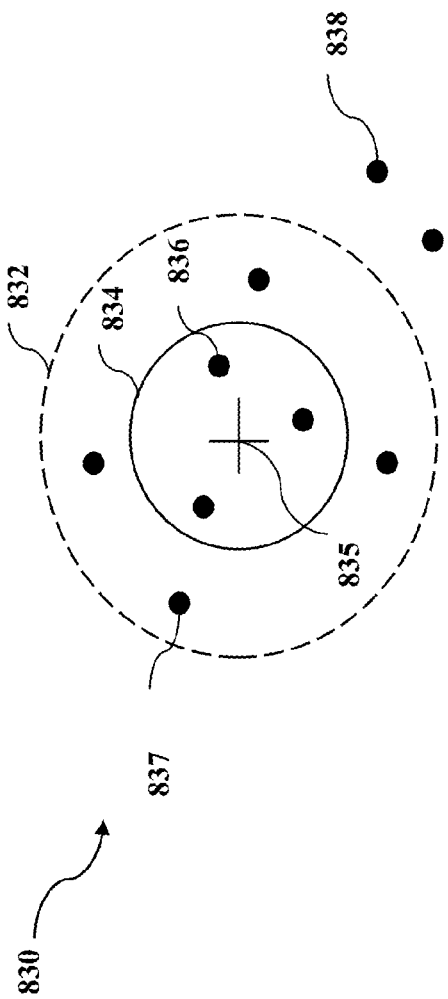
FIG. 41 is a schematic showing features for a method of computing eye gaze point from a sequence of eye fixations.

The user will tend to view a task related visual element with a sequence of fixations all in the same display area connected by small saccades. These fixations grouped together form a single gaze point of regard that more closely approximates the user's cognitive functioning. For this reason, the computer routine 750 groups the fixation data into task related visual gaze points. The routine uses a retrospective algorithm 830 the elements of which are shown in FIG. 41, to determine the start, continuation, and termination of each gaze point as follows:

(1) A 100 millisecond sequence of eye fixations 836 within 0.5 degrees 834 of each other defines the start of a gaze point; the gaze point center 835 is the mean of the eye fixations. The algorithm delay of 100 milliseconds is undetectable to the user.

(2) The gaze point is continued as long as eye fixations 837 remain within one degree 832 of the current gaze point center 835. The gaze dwell time is the sum of the 100 millisecond start time and the current continuation time.

(3) A 50 millisecond sequence of eye positions 838 that are beyond one degree of the current gaze point defines the termination of the present gaze. A blink up to 200 milliseconds is allowed without termination.

The routine 750 computes the gaze point as the visual viewing point of the eye as computed by routine 748 for pursuit tracking; initially pursuit tracking will consist of a saccade to acquire the target on the fovea followed by steady tracking A rate varying target will be tracked with saccadic updating in tracking rate.

The invention may have an embedded calibration process in a computer used as the controller 39 (FIG. 2) to determine the angular offset between the optical axes and the visual axis of sight, as well as the optical constants and parameters of a three dimensional model of the user's eye. Calibration occurs as the user tracks a series of markers presented at predetermined positions during which the computer samples the eye positions. The markers may be presented at a series of fixed positions or the markers may be presented dynamically in a moving pattern. With the static presentations, the user may be asked to fixate the marker and give a manual response (i.e., button push). The number of marker samples needed for calibration depends upon the number of light sensors (i.e., cameras) and light sources in the tracker design with fewer markers needed for designs with more sensors and sources. For example, a stereo-optic design with two sensors and two light sources may require no more than a single marker to determine the relation of the visual line of sight to the optical axes; the use of two markers allow optical constants to be determined as well. The accuracy is increased with more markers judiciously placed in the scene. In this process, a computer program calls for the sequential display of a series of cue markers for the user to look at. As each cue is displayed the program waits for the user's response and then collects the response data for that marker. The cue markers are placed in the visual scene so that the eye is in full view to the sensor array. This ensures that the optical axes may be derived from the source to sensor pairing table without reference to the eye's image. The invention is auto-calibrating, and the user can quickly and accurately go through the calibration procedure.

By correlating eye gaze position with line of sight, the program computes the constants for a three dimensional eye model from the user's viewing response data. The corneal radius of curvature and the locations of the pupil optical center and the corneal center are computed. The junctions for the retinal capillary network and the cusps on the iris are isolated, and the program computes a three dimension model for the locations of these key features. Finally, the origin and directional cosines of the viewing direction are computed in the coordinate system of the optical axes.

In this process, the computer of the invention has a digital output to the display driver of the calibration display, either that of the video display or an additional display upon which a calibration marker may be displayed within the field of view of the viewer. A display prompting routine called by the calibration program sends a digital instruction to the display driver, causing a calibration marker to be displayed at a predetermined location within the visual field of the viewer. Following the display instruction, a delay routine is called which after a period of time long enough for the viewer to fixate the target, releases an interrupt service routine from hibernation. The interrupt service routine in response to the clocked display field refresh pulse output from the display driver, calls in turn, upon the following routines.

A routine using a three dimensional model of corneal reflections, is called to compute the corneal center of each eye and the surface point locations of the reflections, from the source-to-sensor pairing table and embedded memory tables of the geometry's for the light source directions of the video driver and the sensor array. This is followed by a routine which smoothes the computed corneal reflections for each eye by clustering together surface points with nearly the same orientation relative to the corresponding corneal center. Another routine computes the optical origin and axis, and the median axes for the cornea of each eye from the corneal center and smoothed corneal reflection data. For the configuration with the calibration display unattached to the headset, a routine is called to read the position and orientation of the headset sensor. Finally, a routine is called to save this information along with the source-to-sensor pairing table, the image locations of the capillary junctions of the retinal fundus, and the locations of the sphincteral pattern cusps on the iris, for each calibration marker.

Once the calibration markers have been presented at separate locations, a routine is called to compute a set of constant parameters for each eye. These parameters relate the viewing origin and orientation to the optical origin and the optical and median axes, and are computed from the marker locations and when appropriate the headset positions and orientations. Another routine computes the interocular corneal center to pupil center distance from the pupil image centroid; this is a constant parameter for each eye. The distances from the corneal center to the capillary junctions of the retinal fundus and the sphincteral pattern cusps on the iris for each eye, are also computed.

Following the display of the calibration marker at all locations, the calibration program computes the best estimate of the optical constants. These are done from the recordings for the calibration markers and the embedded memory tables of the geometry for the light source directions of the video display 2 and the sensor array. Finally, a three dimensional model of the human eye is computed and saved in a memory file for reference by the computer program.

Figure 42:
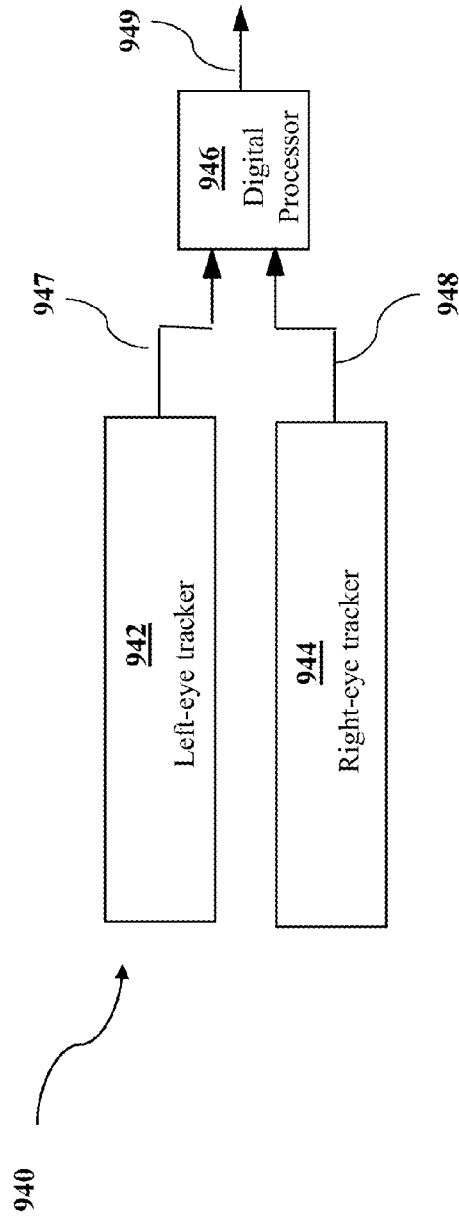
FIG. 42 is a schematic of a design using the instant invention for computing eye convergence point.

Irrespective of the particular configuration of the tracking system used to determine the optical and visual axes, data obtained from the tracking system can be further processed to make further determinations. For example referring to FIG. 42, if a separate tracking system is used for each eye of the user, the binocular convergence point of visual gaze may be determined. For a dual eyetracker configuration 940 composed of a left eye tracker 942 and right eye tracker 944, the routine 946 computes the convergence points 949 of the left 947 and right eye 948 gaze directions To accomplish this, the visual axes are used as inputs and their closest point of intersection is computed to determine the convergence point. The convergence points are the points of closest approach between the two gaze lines; the line segment connecting the two lines at these points is perpendicular to both lines.

Furthermore, as is described in U.S. Pat. No. 6,120,461, the output of the tracking system can be input into a separate digital computer or equivalent task-specific digital processor for control of display cues and other task relevant elements. In such a case, the digital computer can use the various visual parameters provided by the tracking system to compute the visual gaze point with regard to task workspace coordinates from an embedded knowledge of the workspace geometry and the head location and orientation in that space determined from a head position and orientation sensor. The computer can use those determined gaze points to determine control signals for the task-relevant elements including a display driver with output of display cue parameters. In such an implementation, an initial calibration process is performed under control of the digital computer to determine the relation between the optical parameters derived by the apparatus and the visual lines of sight. In one embodiment, these parameters comprise the image locations of the source specular points, and the apparent pupil centers and elliptical axes isolated for the images. In other embodiments, the parameters comprise the origins and directional cosines of the optical axes. In the calibration process, the digital computer receives as input the optical features (e.g., the origins and directional cosines of the optical axes of sight) in lieu of that for the visual lines of sight as the user looks at visual cues presented under computer control. The computer determines the relation between these features and the visual lines of sight and the relating values are stored in the digital processor of the eye-tracking system by the computer. This result may be in the form of an artificial neural network relating the optical features such as the source specular points and the apparent pupil centers and elliptical axes, or the origin and directional cosines of the optical line of sight, to the location and direction of the visual axis of the eye for each apparatus of the invention.

Figure 43:
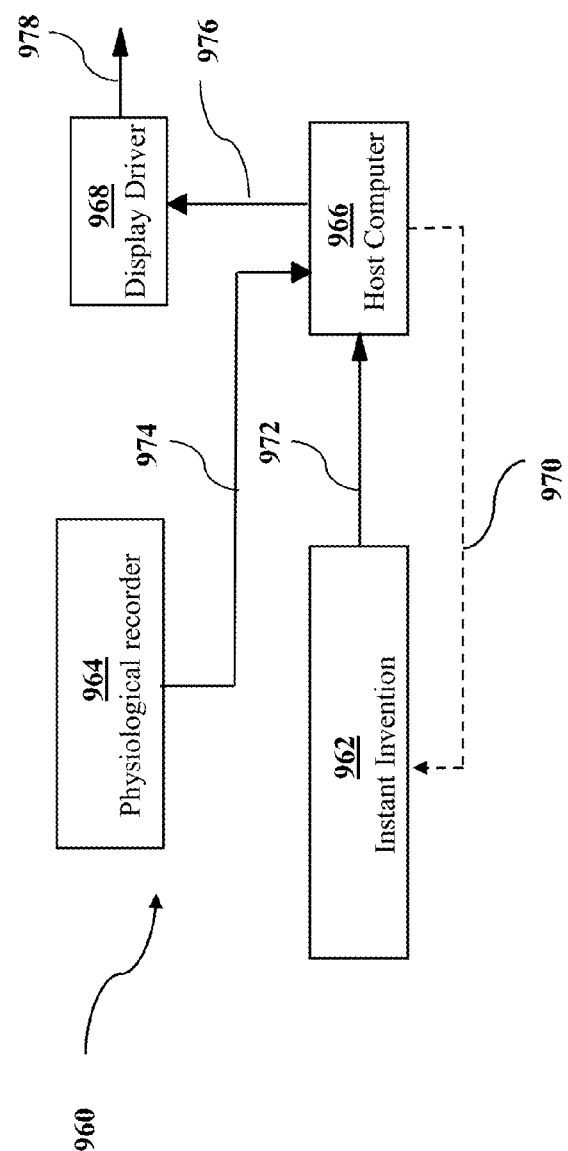
FIG. 43 is a schematic showing workspace application using the instant invention.

FIG. 43 is a schematic showing such application 960 of the invention to a computerized workstation. The invention 962 by design serves as a peripheral to the host computer 966 which controls via 976, the display driver 968 for task dedicated displays 978. The output 972 of the invention to the host computer, as called for in real time by the control line 970, may include: (1) the eye status flag, (2) the eye pupil size, (3) the gaze status flag, (4) the current gaze point location, (5) the gaze dwell time, (6) a task-interest flag, and (7) the head position and orientation from the output of routine 38 (FIG. 22). The eye status flag comprises the status as fixation, saccade, pursuit, or blink. The gaze status flag indicates either the start of a gaze, continuation, or termination. The continuation flag and gaze dwell time are updated continually. The gaze location may give the point of regard in both workspace coordinates and workspace surface by surface identifier and surface location. The gaze location is computed from the eye-gaze direction and the head position and orientation. The routine has an initial 100 millisecond delay in detecting the start of a gaze and a 50 millisecond in detecting the end. The gaze dwell time is an indication of the user's cognitive task related interest in the visual element being studied. The dwell times tend statistically to be on the average longer for elements of interest.

The task-interest flag is reset to "non-interest" when the dwell time is less than a lower threshold value determined in calibration, usually about 150 milliseconds. However, the flag is set to "interest" when the dwell time exceeds an upper bound, usually about 250 milliseconds. The gaze status flag indicates a "saccade" during the large saccades that occur between gazes and "failure" when the processor fails to determine an eye position for more than 200 milliseconds. A further embodiment of the invention is the simultaneous tracking of both eyes with a dual display and sensor set. This supports the computation of the binocular convergence point in the three dimensional workspace for either real or virtual stereographic viewing. The convergence point is defined as the workspace point where the viewing axes are closest. In this case, the above output is made for both eyes separately along with the convergence point in the workspace coordinates.

The host computer upon receiving a set task-interest flag compares the gaze point location to those listed for the visual display elements of display 978. Once a match is made, the host computer executes the appropriate task related routines updating the state of any controlled machinery in the workspace and correspondingly, that of the visual display elements as feedback to the user. However, in some cases, the selected decision may have critical implications for the task performance. An example is that of engaging hostile fire upon another vehicle in warfare. Note that the relation of gaze dwell time to task elements is a statistical process that may vary under stress as the task conditions change. For this reason, in the event of critical tasks, the host computer as an intermediate control step will highlight the matched display element with a change in color, brightness, or shape as feedback to the user. The appropriate control routines are then implemented if the user executes a manual action in confirmation of the choice selection. The highlighting for element is dropped if the confirmation is not received within a preset time-out period, say several seconds. The manual confirmation action may be a button push by the user, voice command via an automatic speech recognizer, or an extended gaze duration. Of course, the control routine executed along with the accompanying display update is determined by the display element selected and the host computer and associated display driver programs.

The eye status and pupil size are passed to the host computer for real-time human factors analysis; the gaze point and duration are all that is needed for specifying interest in a display element. However, there is evidence that pupil dilation and eye blinks are related to information processing stages and user's workload. These are factors which are important in controlling the rate and form of display element presentation by the host computer. For example, it has been shown that the pupil will dilate at the start of information processing reaching its maximum just before decision, and contract at the moment of decision making. The extent of the dilation is an inverse function of the intelligence of the viewer and direct function of the complexity of the problem to be solved. However, the pupil change is also a function of extraneous factors including ambient lighting and subject fatigue. For these reasons pupil dilation is a valid measure of the stages of information processing only in constant illumination displays for alert users.

Furthermore, blinks are reported to occur at transitions between stages of information processing. In particular, blinks appear to mark brief breaks that the brain takes at the end of each phase of a mental task, and in this way punctuate the sequence of mental events involved in acquiring and processing information. The occurrence of eye blinks may punctuate the appropriate moments to measure pupil dilation in information processing.

Another factor to consider is the level of workload which the user is experiencing. Eye blink rate has been shown to be non-linearity dependent on mental workload. Blink rate and duration are related to boredom, anxiety, and fatigue. Blink rate increases with boredom, anxiety, or other sources of physical or psychological stress. Fatigue increases blink duration. Attention to tasks demanding visual activity decreases the blink frequency. Head movements performed in conjunction with eye movements greater than 12-degrees, are an additional measure of workload. Additional measures of workload may be provided from physiological measures 964, say of electrocardiogram such as heart-rate variability output 974 to the applications computer.

For these reasons, the invention has potential applications in many fields. The invention is easily extended to the simultaneous tracking of both eyes allowing the measurement of the optical convergence point in the three dimensional workspace either real or virtual. For this reason, the invention has applications in the field of medicine diagnostics of neurological disorders by ocular functions such as the evaluation by eye movements of the severity of head trauma, and for this purpose may be part of desk mounted fixture or an addition to a computer screen used in diagnostics.

The invention has applications to gaze-contingency displays operated by ocular gaze point of regard and fixation duration, such as used for control of computerized machinery from video displays. Here, the invention determines the ocular fixation dwell time; this parameter may be used to preselect a display icon element. Further, the invention may be incorporated into panel mounted displays and head-free sensor arrays for similar purposes.

The invention may be used with head-mounted displays including retinal scanning displays such as those developed for virtual reality, stereographic displays, monocular or binocular vision helmet mounted displays, and night vision goggles used in piloted helicopters, vehicles, and teleoperated robotics control stations. The accuracy of the invention is independent of shifts of the helmet on the user's head due to the ability to compute an exact eye model from the locations of the light sources and the sensors which are fixed by the helmet-construction. Furthermore, the invention may be used with multiple camera systems located about the workspace in the vicinity of the user. In these configurations, the invention may be used to provide measurements of information processing and workload which are needed for the proper functioning of a host computer controlling display formats. An example is the automated cueing of the user of an electronics intelligent pilot-vehicle interface display.

Continuing, the invention may be incorporated into hand-held electronic devices such as cellular phones and data pads among others to track the user's interest in device video display icons.

Figure 44:
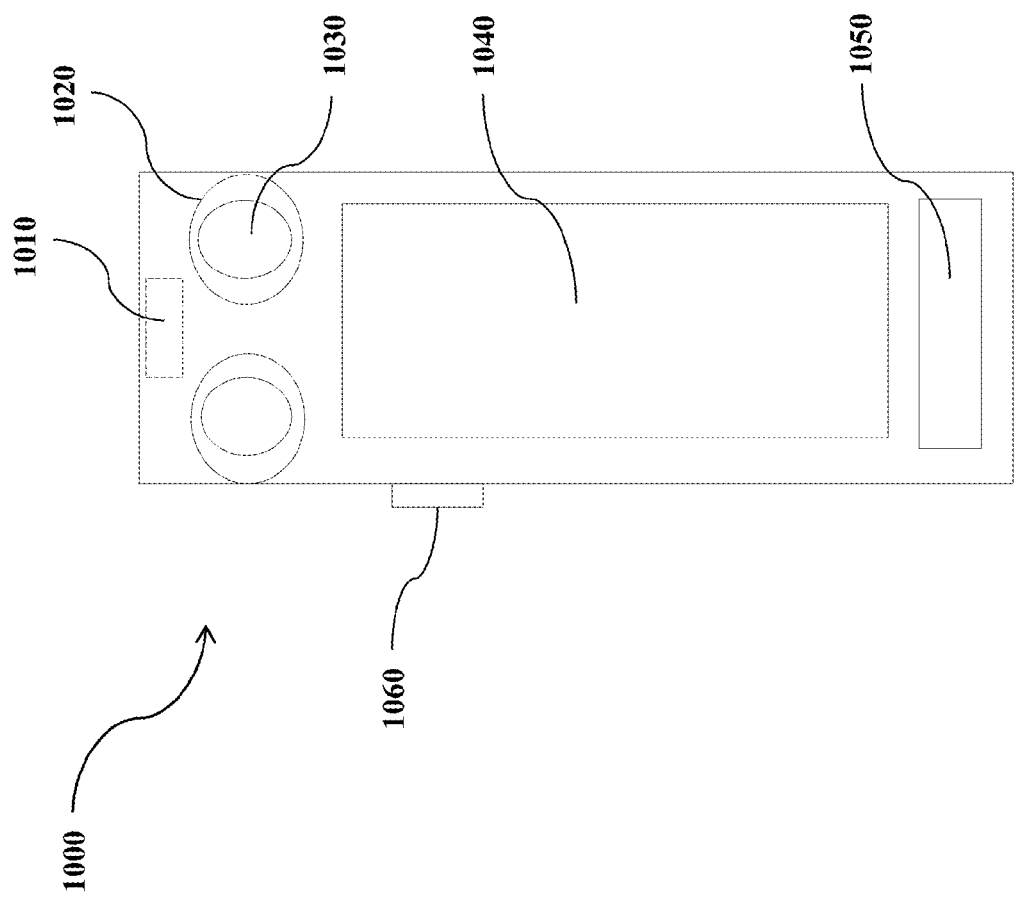
FIG. 44 is a schematic of hand-device with the instant invention.

FIG. 44 is a schematic of such a hand device 1000 as for example, the Samsung Galaxy Nexus or the Apple iPhone 4, where the schematic has a video display 1040, a built-in 3-axis gyroscope 1010, a manual switch 1060 and a keypad 1050, along with say Bluetooth/EDR Wireless connectivity. When paired with the accelerometer, the device is capable of motion sensing such as user acceleration, angular velocity, and rotation rate. Here, added is a dual light sensor system 1030 with an outer ring light array 1020 for illuminating and acquiring stereo images of the user's eye by the invention embedded in the device. In one embodiment, a device-mounted camera with a microlens array is used to acquire stereo views of the eye. The device mounted accelerometer may be used to locate the face and consequently the eye orbit in the camera view during hand movements. Added is software for isolating the image of the eye from that of the face scene in the stereo image, and for pairing the stereo images to the eye as input to the instant invention. The binocular convergence point of visual gaze may be determined from separate stereo images pairs for each eye. As well as isolating the image of the eye for determining eye-gaze, the software may be used to determine the user's interest in the tracked icons from facial expressions deduced from automated analysis of isolated facial features, and display icons may be changed automatically in response to the user's interest.

As can be appreciated from the foregoing disclosure, the described systems and methods enable computation of gaze with increased accuracy. The increased accuracy is due to an improvement in the ophthalmometric determination of the locations of the features of the inner structures of the eye, including the pupil center and the pigmentary cusp patterns on the sphincteral muscles of the iris. The improved determination is possible because, the structural features are located by the intersections of the multiple ray tracings from the opposing stereo images, a procedure which replaces the less accurate determination of a single back traced ray intersection with a corneal centered feature sphere derived in calibration for the single sensor design, the locations of the apparent images of the structure features used in the ray tracing are determined by the intercepts of the image projections with the corneal surface, a procedure replacing the less accurate derivation of the apparent image location by interpolating among multiple-source corneal reflections, and direct computational equation with the feature locations as predetermined variables replaces the model fitting used previously to determine the optical axes.

The aforementioned advantages are made possible by the use of a stereo reconstruction procedure using multiple light sensors with which the apparent images of the features are correlated across images. The accuracy of the calibration process is improved for the determination of the corneal centered feature spheres, which are used in gaze computations when only a single sensor image can be acquired such as for lateral vision. Because multiple light sensors are used in the procedure, relatively few, strategically placed light sources may be used instead of an extensive array of light sources as in prior systems and methods. Moreover, multiple sensor designs enable a wider coverage of the eye movement including extreme lateral angles, whereas present commercial designs are often limited in the extent of coverage to a central field of view. In contrast to existing designs, the disclosed system allows wider if not full coverage while taking advantage of the stereo image properties for increased accuracy.

Various computer logics have been described above. This logic can be stored on any computer-readable medium for use by or in connection with any computer-related system or method. In the context of this disclosure, a computer-readable medium is an electronic, magnetic, optical, or other physical device or means that contains or stores a computer program or routine for use by or in connection with a computer-related system or method. Logic can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

What is claimed is:

1. A system for tracking an eye, comprising:
an optical device with a light emitting source and an optical system, wherein the light source is configured for illuminating the eye and the optical system is configured for providing multiple-images of the eye;
an optoelectronic device for acquiring an image of the eye collected by the optical system;
an image processor for isolating reflections of source illumination in the image and for isolating features of the pupil and extra-pupillary eye structure in the image, wherein isolating features comprises determining the position of such in the image and categorizing as to structure type, where the features are at least those of a pupil;
a pupil-reconstructor for constructing a model of the pupil within the eye, wherein the model of the pupil is constructed from model parameters derived from pupil image features;
a feature-matcher for matching extra-pupillary image features to a common template located by the model of the pupil;
a feature-locater for locating matched features from multiple images in a coordinate system common to the optical device; and
a gaze processor for estimating the visual line-of sight for the eye in the said coordinate system;
wherein the multiple images are stereo-views about an optical axis of the system with centering on the eye-orbit.

2. The system of claim 1 wherein the optical system comprises a single-lens camera with separate light-collecting optics positioned to form stereo-pairs about said optical axis for the camera sensor.

3. The system of claim 1 wherein the optical system comprises a single-lens camera utilizing a concave mirror system for providing stereo views about said optical axis.

4. The system of claim 1 wherein the optical system comprises a single-lens camera with a lenticular array.

5. The system of claim 1, wherein the optical system comprises a single-lens stereo optics system utilizing one or more deformable segmented mirrors indexed between multiple positions for providing multiple views about said optical axis.

6. The mirror system of claim 5 wherein the mirrors are indexed by microelectro-mechanical actuators.

7. The system of claim 1, wherein the pupil-reconstructor is configured to:
constructa model of the cornea solid-body surface from the isolated reflections of source illumination;
determine a perimeter for a pupil image from isolated pupil image features;
locate a perimeter for the pupil within the eye from the perimeter for the pupil image using the model of the cornea; and
construct a model of the pupil within the eye from the pupil perimeter,
wherein said model construction of the pupil is derived from a fit of the pupil perimeter to the pupil modeled as located in a plane,
wherein the perimeter is used to locate and orient the pupil plane in the eye, and center and align the pupil model in the pupil plane of the eye, and
wherein said model parameters are relatable to pupil plane location, pupil plane orientation, pupil center in the plane.

8. The system of claim 7, wherein the pupil-reconstructor is configured to construct a model of the pupil within the eye from pupil perimeters for multiple images, wherein said model construction of the pupil is derived from a fit of the pupil perimeters to the pupil modeled as located in a plane.

9. The system of claim 1, wherein the feature-matcher is configured: to locate the image of the eye relative to a reference frame aligned with the pupil model, wherein the reference frame comprises a template of extra-pupillary eye features; determine the distribution of the isolated features in the image about the feature template of the pupil model reference frame; and match the isolated features to the elements of the template, where for multiple images, conjugate and non-conjugate pairs of mapped features are formed in stereo image pairs.

10. The system of claim 1, wherein the feature-locator is configured to locate features of the eye in the coordinate system of the means for acquiring images that correspond to the matched image features, where the cornea solid body surface is located in the said coordinate system; cornea surface points are located that correspond to the matched image features; and eye features are located that correspond to the cornea surface points; where for multiple images, conjugate paired features are located by the union of the locations of the eye feature for the separate images in stereo image pairs, and for non-conjugate paired features, the features are located for the separate images as single images by the eye feature location relative to a corresponding feature construct for the eye.

11. The system of claim 1, wherein the gaze processor is configured to determine a principal optical axis from the pupil model and orthogonal optical axes from the locations of the eye features relative to the pupil model, and a principal visual axis from the relation between the visual axis and the optical axes, where a bound is placed on the determination in a hierarchical layered manner by knowledge of source reflection points offsets from the pupil image centers, and from pupil image offsets in the sensor view.

12. The system of claim 1, wherein the image processor is configured to isolate the image of a face in an image collected by the optical system from the image surround, isolate the image of at least one eye in the face image, and isolate the eye-orbit in the eye image, for isolating features of the eye in the image, wherein the features are at least those of a pupil.

13. A method for tracking the eye, comprising:
illuminating the eye;
acquiring images, at the least a single image, of the eye;
isolating reflections of the means of illumination in an image;
isolating features of the pupil and extra-pupillary eye structure in the image, wherein isolating features comprises determining the position of such in the image and categorizing as to the nature, where the features are at least those of a pupil;
constructing a model of the pupil within the eye, wherein the model of the pupil is constructed from model parameters derived from pupil image features;
matching extra-pupillary image features to a common template located by the model of the pupil;
locating the matched features in a coordinate system common to the means of acquiring an image; and
determining the visual line-of sight for the eye in the said coordinate system.

14. The method of claim 13, wherein constructing a model of the pupil comprises:
constructing a model of the cornea solid-body surface from isolated reflections of source illumination;
determining a perimeter for a pupil image from isolated pupil-image features;
locating a perimeter for the pupil within the eye from the perimeter for the pupil image using the model of the cornea; and
constructing a model of the pupil within the eye from the pupil perimeter,
wherein said model construction of the pupil is derived from a fit of pupil perimeter to the pupil modeled as located in a plane,
wherein the perimeter is used to locate and orient the pupil plane in the eye, and center and align the pupil model in the pupil plane of the eye, and
wherein said model parameters are relatable to pupil plane location, pupil plane orientation, pupil center in the plane.

15. The method of claim 14, wherein constructing a model of the pupil comprises constructing a model of the pupil within the eye from pupil perimeters for multiple images, wherein said model construction of the pupil is derived from a fit of the pupil perimeters to the pupil modeled as located in a plane.

16. The method of claim 13, wherein matching features in images comprises: locating the image relative to a reference frame aligned with the pupil model, wherein the reference frame comprises a template of extra-pupillary structure features; determining the distribution of the isolated features in the image about the feature template of the pupil model reference frame; and matching the features to the elements of template; where for multiple images, conjugate and non-conjugate pairs of mapped features are formed in stereo image pairs.

17. The method of claim 16, where multiple images are acquired consecutively by an indexed means and motion stereo-optics is used for the determination of image element depth as an additional parameter for classification and template matching; wherein the determination comprises: tracking isolated feature elements across consecutive images as a function of the acquisition index, computing the apparent optical flow induced by the location displacement across consecutive images for tracked feature elements, and computing the apparent image depth of the features from the apparent optical flow using the varying viewpoint of the acquisition means as a basis; where the computed image depth is used an additional parameter for matching the elements to the feature template.

18. The method of claim 13, wherein locating the matched features in the coordinate system of the means for acquiring images comprises: locating the cornea solid body surface in the said coordinate system; locating cornea surface points that correspond to the matched image features; and locating eye features that correspond to the cornea surface points; where for a single image, the features are located by the eye feature location relative to a corresponding feature construct for the eye, and where for multiple images, conjugate paired features are located by the union of the locations of the eye feature for the separate images in stereo image pairs, and for non-conjugate paired features, the features are located for the separate images as single images by the eye feature location relative to a corresponding feature construct for the eye.

19. The method of claim 13, wherein determining the visual line-of sight comprises: determining a principal optical axis from the model of the pupil; determining orthogonal optical axes from the locations of the eye features relative to the pupil model; and determining a principal visual axis from a knowledge of the relation between the visual axis and the optical axes; where a bound is placed on the determination in a hierarchical layered manner by knowledge of source reflection points offsets from the pupil image centers, and from pupil image offsets in the sensor view.

20. A method for tracking the eye with a hand-holdable device, comprising:
- illuminating the face of a user;
- acquiring multiple images of the face;
- isolating an image of the face in an acquired image;
- isolating at least one eye in the face image;
- isolating the eye-orbit of the eye in the image;
- isolating an eye image centered on the eye-orbit;
- isolating reflections of the means of illumination in the eye image;
- isolating features of the pupil and extra-pupillary eye structure in the image, wherein isolating features comprises determining the position of such in the image and categorizing as to the nature, where the features are at least those of a pupil;
- constructing a model of the pupil within the eye, wherein the model of the pupil is constructed from model parameters derived from pupil image features;
- matching extra-pupillary image features to a common template located by the model of the pupil;
- locating the matched features in a coordinate system common to the means of acquiring images; and
- determining the visual line-of sight for the eye in the said coordinate system;
- wherein the multiple images are stereo-views about an optical axis of light collecting optics incorporated with the hand-holdable device.

* * * * *